(12) United States Patent
Wakabayashi et al.

(10) Patent No.: US 10,486,552 B2
(45) Date of Patent: Nov. 26, 2019

(54) WORK VEHICLE

(71) Applicant: Kubota Corporation, Osaka-shi (JP)

(72) Inventors: Katsuhiro Wakabayashi, Sakai (JP); Kodai Tateishi, Sakai (JP); Yoshimi Hirooka, Sakai (JP); Kohta Nakao, Sakai (JP); Tatsuya Nagatomi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/871,579

(22) Filed: Jan. 15, 2018

(65) Prior Publication Data

US 2018/0134179 A1    May 17, 2018

Related U.S. Application Data

(62) Division of application No. 15/164,940, filed on May 26, 2016, now Pat. No. 9,902,292.

(30) Foreign Application Priority Data

Aug. 3, 2015  (JP) .................................. 2015-153541
Aug. 3, 2015  (JP) .................................. 2015-153542
Aug. 3, 2015  (JP) .................................. 2015-153543
Aug. 3, 2015  (JP) .................................. 2015-153544
Oct. 29, 2015 (JP) .................................. 2015-213094

(51) Int. Cl.
*B60N 2/30*   (2006.01)
*B60N 2/005*  (2006.01)
(Continued)

(52) U.S. Cl.
CPC ......... *B60N 2/005* (2013.01); *B60H 1/00285* (2013.01); *B60H 1/16* (2013.01);
(Continued)

(58) Field of Classification Search
CPC ...... B60N 2/005; B60N 2/305; B60N 2/3031; B60N 2/68; B60H 1/00285; B60H 1/16; B60P 3/423; B60P 1/04; B60K 2005/003; B60K 11/04; B60K 11/06; B60K 13/04; B60Y 2200/20
(Continued)

(56) References Cited

U.S. PATENT DOCUMENTS 7,578,544 B1 * 8/2009 Shimamura ............ B60N 2/305
                                                           296/183.2
7,581,780 B2   9/2009 Shimamura et al.
(Continued)

FOREIGN PATENT DOCUMENTS

JP        6268127 A    3/1987
JP       08268336 A   10/1996
(Continued)

*Primary Examiner* — John D Walters
(74) *Attorney, Agent, or Firm* — The Webb Law Firm

(57) ABSTRACT

A work vehicle provided with a boarding section and an engine is disclosed. The boarding section is provided with a seat that allows an occupant to be seated thereon. The engine is located below the seat. A separator is provided to separate a foot space for an occupant and the engine from each other. The foot space is formed forward of the engine. The separator is provided with a radiator part formed therein. The radiator part is configured to radiate heat.

9 Claims, 37 Drawing Sheets

(51) Int. Cl.
- *B60K 13/04* (2006.01)
- *B60K 11/06* (2006.01)
- *B60H 1/00* (2006.01)
- *B60H 1/16* (2006.01)
- *B60N 2/68* (2006.01)
- *B60P 3/42* (2006.01)
- *B60K 11/04* (2006.01)
- *B60P 1/04* (2006.01)
- *B60K 5/00* (2006.01)

(52) U.S. Cl.
CPC .............. *B60K 11/04* (2013.01); *B60K 11/06* (2013.01); *B60K 13/04* (2013.01); *B60N 2/305* (2013.01); *B60N 2/3031* (2013.01); *B60N 2/68* (2013.01); *B60P 3/423* (2013.01); *B60K 2005/003* (2013.01); *B60P 1/04* (2013.01); *B60Y 2200/20* (2013.01)

(58) Field of Classification Search
USPC .......................................................... 180/309
See application file for complete search history.

(56) References Cited

U.S. PATENT DOCUMENTS

| | | | |
|---|---|---|---|
| 7,938,481 B2 | 5/2011 | Kobayashi et al. | |
| 8,336,656 B2 | 12/2012 | Shiratori et al. | |
| 8,353,534 B2 * | 1/2013 | Arnold | B60N 2/3013 280/748 |
| 8,376,441 B2 | 2/2013 | Nakamura et al. | |
| 8,414,082 B2 | 4/2013 | Nakamura et al. | |
| 8,556,324 B1 | 10/2013 | Yamamoto et al. | |
| 8,690,217 B2 * | 4/2014 | Yamamoto | B62D 33/0273 296/24.43 |
| 8,752,878 B2 * | 6/2014 | Yamamoto | B62D 33/0273 296/146.1 |
| 8,960,805 B2 | 2/2015 | Nakamura et al. | |
| 9,056,576 B2 * | 6/2015 | Yamamoto | B60P 3/423 |
| 9,366,008 B2 | 6/2016 | Kokuryou et al. | |
| 2007/0045016 A1 | 3/2007 | Nozaki | |
| 2009/0195049 A1 | 8/2009 | Shimamura et al. | |
| 2011/0132678 A1 | 6/2011 | Nakamura et al. | |
| 2011/0240393 A1 | 10/2011 | Hurd et al. | |
| 2013/0168994 A1 | 7/2013 | Yamamoto et al. | |
| 2014/0034409 A1 | 2/2014 | Nakamura et al. | |
| 2015/0084321 A1 | 3/2015 | Hirooka | |
| 2015/0252716 A1 | 9/2015 | Tanno et al. | |

FOREIGN PATENT DOCUMENTS

| | | |
|---|---|---|
| JP | 10141157 A | 5/1998 |
| JP | 2000179538 A | 6/2000 |
| JP | 2001315535 A | 11/2001 |
| JP | 200762709 A | 3/2007 |
| JP | 200956967 A | 3/2009 |
| JP | 2009179253 A | 8/2009 |
| JP | 201030363 A | 2/2010 |
| JP | 2010215165 A | 9/2010 |
| JP | 2011007309 A | 1/2011 |
| JP | 2011116318 A | 6/2011 |
| JP | 2012144242 A | 8/2012 |
| JP | 2014189066 A | 6/2014 |
| JP | 2014133517 A | 7/2014 |
| JP | 2014227076 A | 12/2014 |
| JP | 201566992 A | 4/2015 |

* cited by examiner

WORK VEHICLE

CROSS-REFERENCE TO RELATED APPLICATIONS

This application is a divisional application of U.S. patent application Ser. No. 15/164,940, filed May 26, 2016, which claims priority to Japanese Patent Application Nos. 2015-153541, 2015-153542, 2015-153543, 2015-153544 all filed Aug. 3, 2015, and 2015-213094 filed Oct. 29, 2015, the disclosures of which are hereby incorporated in their entireties by reference.

BACKGROUND OF THE INVENTION

1. Field of the Invention

The present invention relates to a work vehicle.

2. Description of the Related Art (1) First Related Art

One example of a conventional work vehicle is disclosed in JP 2009-056967 A. This work vehicle is provided with: a boarding section provided with a seat that allows an occupant to be seated thereon; and an engine that is located below the seat. This work vehicle is further provided with: a separator that is located below the seat within the boarding section and separates a foot space for the occupant and the engine from each other, the foot space being formed forward of the engine.

However, since the engine is located in the vicinity of the seat, heat from the engine is likely to be transmitted to the foot space via the separator, and there is the risk of heat from the engine bringing discomfort to the occupant seated on the seat.

In light of the above-described situation, there is a demand for providing a work vehicle in which heat from the engine is prevented from bringing discomfort to an occupant.

(2) Second Related Art

Another example of a conventional work vehicle is disclosed in JP 4981762 B2 (JP 2010-030363 A). This work vehicle is provided with: a boarding section having front seats that include a driver's seat, and a rear seat provided rearward of the front seats; and an engine provided below the rear seat.

However, since the engine is provided below the rear seat, heat from the engine is likely to reach the rear seat side. Therefore, it is conceivable to provide a separator that separates the rear seat and the engine from each other. However, simply providing the separator hinders access to the engine side, and makes it difficult to perform inspection work on the engine or the like.

In light of such problems, there is a demand for providing a work vehicle in which heat from the engine is prevented from reaching the rear seat side, and in which it is easy to perform inspection work on the engine or the like.

(3) Third Related Art

Another example of a conventional work vehicle is disclosed in JP 2010-215165 A. In this work vehicle, an engine is located in a rear part of a travelling vehicle body, and electrical components (a battery box) is located in a front part of the travelling vehicle body.

However, since the electrical components are separated from the engine, the wiring length of a harness connected to the electrical components is too long, and there are problems such as an increase in cost and the complexity when handling the harness. Therefore, it is desirable that the electrical components are located in the vicinity of the engine. However, if the electrical components are located in the vicinity of the engine, there is the risk of the electrical components having a short lifespan due to the influence of heat from the engine.

In light of such problems, there is a demand for providing a work vehicle in which, despite electrical components being located in the vicinity of an engine, heat from the engine is prevented from affecting the electrical components.

(4) Fourth Related Art

One example of a conventional vehicle is disclosed in JP 2014-227076 A. This vehicle is provided with a foldable seat configured such that a sitting section having a seat surface is switchable to a seating position in which the seat surface faces upward, and to a non-use position in which the seat surface stands up and faces forward. Also, a supporting frame provided to span left and right rear fenders is provided with a support bracket that supports a driver's seat, and a fixed end of a seat belt is joined and fixed to the supporting frame.

In a vehicle having the above-described conventional structure, the fixed end of the seat belt is fixed to the supporting frame for supporting the seat. Therefore, the vehicle is useful in the point that even if the seat is large and is of a movable type that allows for positional switching, an end portion of the seat belt can be fixed at a certain position irrespective of the positional switching of the seat.

However, in a vehicle having this structure, the supporting frame is required to have a robust structure in order to simultaneously fulfil the purpose of supporting the seat and the purpose of fixing the seat belt, and there is room for improvement in the point that the device is likely to be large in size, for example.

In other words, there is a demand for a configuration in which the seat belt used for the seat that allows positional switching can be fixed to a certain position irrespective of the positional switching of the seat, and in which an area to which an end portion of the seat belt is fixed is not required to be improved in regards to strength.

(5) Fifth Related Art

One example of a conventional vehicle is disclosed in JP 2009-179253 A. In this vehicle, a load carrying platform is disposed on a travelling vehicle body, front lateral plates of the load carrying platform are engageable with a front plate and are joined to and supported by rear lateral plates so as to be swingable about a swing axis extending in a direction that intersects a load mounting surface, and the load carrying platform is configured such that the front-rear length thereof is changeable to the length when the load carrying platform is in the expanded position where the front lateral plates extend along the direction in which the rear lateral plates extend, and to the length when the load carrying platform is in the shortened position where the front lateral plates are bent and intersect the rear lateral plates. In this vehicle, fulcrum pins are inserted through brackets that are fixed to the rear surfaces of the front lateral plates of the load carrying platform, and frames that are fixed to the front surfaces of the rear lateral plates of the load carrying platform, and the front lateral plates are thus supported so as to be swingable in the left-right direction about an axis in the top-bottom direction, relative to the rear lateral plates.

A vehicle having the above-described conventional structure is useful in the point that the front-rear length of the load carrying platform can be easily changed by changing the position of the front lateral plates.

In such a vehicle, the suspension springs for the rear wheels are typically set to be relatively stiff so that the suspension springs for the rear wheels can maintain an appropriate shock-absorbing function even when a heavy object is mounted on the load carrying platform. Therefore, when the load carrying platform is empty, the load mounting surface is inclined such that the front part thereof is slightly lower, and the axes of the fulcrum pins extending in the top-bottom direction, with which the front lateral plates and the rear lateral plates are pivotally joined to each other, are slightly inclined forward.

Consequently, for example when the position of the load carrying platform, which is currently in the expanded position where the front lateral plates extend along the direction in which the rear lateral plates extend, is changed to the shortened position where the front lateral plates are bent and intersect the rear lateral plates, the following problems might arise. That is, when an operator first brings one of the front lateral plates in the left-right direction of the load carrying platform into the position in which the one of the front lateral plates is bent and intersects the rear lateral plates, and then turns around the rear side of the load carrying platform and bends the other of the front lateral plates in the same manner, the one of the front lateral plates that has been first brought into the shortened position may restore the original expanded position due to its own weight.

In order to avoid such a problem, it is necessary to maintain the position of the front lateral plate, which has been brought into the shortened position, by placing a weight for preventing restoration, or to maintain the position with the aid of an assistant operator. This vehicle requires troublesome work, and there is room for improvement in this regard.

In other words, there is a demand for a vehicle that provides improved efficiency when the length of the load carrying platform is changed, by making it easier to maintain the position of the front lateral plate when the front-rear length of the load carrying platform is changed by changing the position of the front lateral plate.

SUMMARY OF THE INVENTION (1) In view of First Related Art, the following are provided.
A work vehicle comprising:
a boarding section provided with a seat that allows an occupant to be seated thereon;
an engine located below the seat; and
a separator that separates a foot space for an occupant and the engine from each other, the foot space being formed forward of the engine, the separator being provided with a radiator part formed therein, the radiator part being configured to radiate heat.

With the above-described configuration, although heat from the engine is transmitted to the separator located on the foot side of an occupant seated on the seat, the separator is provided with the radiator part formed therein. Therefore, heat from the separator is efficiently radiated from the radiator part. Therefore, even if the occupant touches the separator with a part of his/her body (e.g., a calf part), it is unlikely that heat from the engine brings discomfort to the occupant because the temperature of the separator is low due to thermal radiation by the radiator part.

One preferable embodiment provides the work vehicle further comprising: a cooling fan provided between the engine and the separator, and configured to be driven by power from the engine.

With this configuration, wind generated by the cooling fan prevents heat from the engine from transmitting to the separator, and it is also possible to preferably suppress a rise in the temperature of the separator because wind generated by the cooling fan strikes and cools the separator.

In one preferable embodiment, the radiator part is configured with a plurality of protruding members formed on a surface of the separator on the foot space's side.

With this configuration, the radiator part is configured with a plurality of protruding members with which the surface of the separator on the foot space's side is formed. Therefore, it is possible to efficiently radiate heat using the heat radiator part having an enlarged surface area. Also, the contact area of such a heat radiator part is small, and even if the occupant touches the heat radiator part with a part of his/her body (e.g., a calf part), discomfort brought to the occupant is reduced compared to when the occupant touches a flat surface.

In one preferable embodiment, the radiator part is located forward of a front end portion of a seat part of the seat.

With this configuration, the radiator part is located forward of the front end portion of the seat part of the seat in the front-rear direction of the vehicle body. Therefore, it is possible to increase the distance between the engine and the radiator part. On the other hand, a calf part or the like of the occupant seated on the seat is located at a position near the radiator part. However, the radiator part always radiates heat, and therefore, even if the occupant seated on the seat touches the radiator part with a part of his/her body (e.g., a calf part), discomfort brought to the occupant is reduced.

In one preferable embodiment,
the seat is provided as a front seat and a rear seat,
the front seat includes a driver's seat, and
the foot space is formed for the rear seat, and the separator is provided between the foot space and the engine.

With this configuration, the front seat and the rear seat are arranged within the boarding section in the front-rear direction. Therefore, in order to compactly arrange the engine, the engine is located below the rear seat. It is possible to reduce discomfort brought to an occupant seated on the rear seat by providing the separator, in which the radiator part is formed, between the foot space for the rear seat and the engine.

In one preferable embodiment,
the rear seat is configured to be changeable to an in-use state in which the rear seat allows an occupant to be seated thereon and a retracted state in which the rear seat does not allow an occupant to be seated thereon,
a load carrying platform is provided rearward of the boarding section,
the load carrying platform is configured to be changeable to a shortened state and an extended state in which the load carrying platform is extended further forward than in the shortened state,
when the rear seat is in the in-use state and the load carrying platform is in the shortened state, the rear seat is located immediately above the engine, and
when the rear seat is in the retracted state and the load carrying platform is in the extended state, the load carrying platform is located immediately above the engine.

With this configuration, the rear seat and the load carrying platform are each configured to allow state switching. When the rear seat is in the in-use state and the load carrying platform is in the shortened state (the two-row seat state), the rear seat is located immediately above the engine. When the rear seat is in the retracted state and the load carrying platform is in the extended state (the one-row seat state), the load carrying platform is located immediately above the engine.

(2) In view of Second Related Art, the following are provided.

A work vehicle comprising:

a boarding section provided with a front seat and a rear seat, the front seat including a driver's seat;

an engine provided below the rear seat;

a separator that is provided below the rear seat and above the engine, the separator being provided with an inspection hole; and an inspection cover configured to be switchable to a closing state in which the inspection cover closes the inspection hole and an opening state in which the inspection cover opens the inspection hole.

With the configuration above, the engine is located below the rear seat provided rearward of the front seat, and the rear seat and the engine is separated from each other by the separator. The separator is provided with an inspection hole, and the inspection hole can be closed or opened using the inspection cover. Usually, the inspection cover is in the closing state, and the engine and the rear seat are isolated from each other by the separator including the inspection cover. Thus, heat from the engine is prevented from reaching the rear seat side. On the other hand, in the case of maintenance for example, the rear seat is moved and the inspection cover is brought into the open state, and thus the inspection hole is exposed. Consequently, it becomes easy to access the engine side via the inspection hole, and it becomes easy to perform inspection work on the engine or the like.

Therefore, according to one aspect of the present invention, it is possible to prevent heat from the engine from reaching the rear seat side, and it is easy to perform inspection work on the engine or the like.

In one preferable embodiment, the rear seat is configured to be changeable to an in-use state in which the rear seat allows an occupant to be seated thereon and a retracted state in which the rear seat does not allow an occupant to be seated thereon, a load carrying platform is provided rearward of the boarding section, the load carrying platform is configured to be changeable to a shortened state and an extended state in which the load carrying platform is extended further forward than in the shortened state, when the rear seat is in the in-use state and the load carrying platform is in the shortened state, the rear seat is located immediately above the engine, and when the rear seat is in the retracted state and the load carrying platform is in the extended state, the load carrying platform is located immediately above the engine, and when the rear seat is in the retracted state and the load carrying platform is in the shortened state, the inspection cover is exposed.

With this configuration, the rear seat and the load carrying platform are each configured to allow state changing. When the rear seat is in the in-use state and the load carrying platform is in the shortened state (the two-row seat state), or when the rear seat is in the retracted state and the load carrying platform is in the extended state (the one-row seat state), the rear seat or the load carrying platform is located immediately above the engine. On the other hand, when the rear seat is in the retracted state and the load carrying platform is in the shortened state, the inspection cover that closes the inspection hole is exposed, and it is easy to perform inspection work on the engine or the like via the inspection hole by attaching or detaching the inspection cover.

One preferable embodiment provides the work vehicle further comprising:

a seat belt device for an occupant seated on the rear seat, the seat belt device including: a belt body; a belt reel configured to be able to feed and wind the belt body; a hook part attached to the belt body; and a belt anchor configured to be engageable with the hook part and to be swingable about a lateral swing shaft, wherein the rear seat is configured to be changeable to an in-use state in which the rear seat allows an occupant to be seated thereon and a retracted state in which the rear seat does not allow an occupant to be seated thereon, and a recessed part that is configured to house the belt anchor when the rear seat is in the retracted state is formed in the inspection cover.

With this configuration, when the rear seat is in the retracted state, the belt anchor of the seat belt device can be embedded into the recessed part formed in the inspection cover. Therefore, the load carrying platform and the belt anchor do not interfere with each other even when the load carrying platform is in the extended state, and it is possible to arrange the belt anchor in a compact state.

In one preferable embodiment, a rear part of the inspection cover is provided with a rear part cover that is flexible, the recessed part is formed to span the inspection cover and the rear part cover, the lateral swing shaft is located below the rear part cover, and the belt anchor is located within the recessed part, in a state of penetrating through the rear part cover.

With this configuration, the belt anchor of the seat belt device is located within the recessed part formed to span the inspection cover and the rear part cover, so as to penetrate the rear part cover that is flexible. Therefore, the rear part cover deforms when the belt anchor swings about the swing axis, and the belt anchor can be operated to swing without hindrance. Also, since such a rear part cover is provided, it is possible to improve the effect of separation achieved by the separator.

In one preferable embodiment, the inspection cover is provided with a grip for attaching and detaching the inspection cover.

With this configuration, it is possible to easily attach and detach the inspection cover to and from the separator by operating the grip for attaching and detaching the inspection cover.

(3) In view of Third Related Art, the following are provided.

A work vehicle comprising:

an engine;

an electrical component located in a vicinity of the engine; and an isolation part configured to isolate the engine and the electrical component from each other.

With the configuration above, the electrical component is located in the vicinity of the engine. Therefore, it is possible to reduce the wiring length of the harness connected to the electrical component, and it is possible to reduce cost, and reduce complexity when handling the harness. In addition, since the engine and the electrical component are isolated from each other by the isolation part, radiant heat and convection heat from the engine is blocked by the isolation part, and it is thus possible to reduce the influence of heat from the engine upon the electrical component.

One preferable embodiment provides the work vehicle further comprising:

an exhaust manifold provided beside the engine and configured to connect an exhaust and the engine, the exhaust discharging gas from the engine, the isolation part isolating the exhaust manifold and the electrical component from each other.

With this configuration, the exhaust manifold located beside the engine has a high temperature due to gas from the engine flowing through the inside of the exhaust manifold. However, the exhaust manifold having a high temperature and the electrical component are isolated from each other by the isolation part, the insulation part can block radiant heat and convection heat from the exhaust manifold, and reduce the influence of the heat from the exhaust manifold upon the electrical component.

One preferable embodiment provides the work vehicle further comprising:

a cooling fan provided on a front end portion of the engine, and configured to be driven by power from the engine, wherein a front end portion of the isolation part is located rearward of the cooling fan, and a front end portion of the electrical component is located rearward of the front end portion of the isolation part.

With this configuration, wind generated by the cooling fan is divided into a component that cools the engine and a component that flows along the front end side of the isolation part toward the electrical component, by the isolation part at the boundary. Consequently, it is possible to cool the electrical component in a preferable manner using wind generated by the cooling fan and flowing toward the electrical component.

One preferable embodiment provides the work vehicle further comprising:

a rear wind guide part provided to be continuous with a rear end portion of the isolation part, and to extend in a direction away from the engine.

With this configuration, a component of wind generated by the cooling fan, which flows toward the electrical component, strikes the rear wind guide part and bounces back after cooling the electrical component, and then stirs the surrounding air. Consequently, it is possible to efficiently cool the electrical component.

One preferable embodiment provides the work vehicle further comprising:

a framework on which the engine is mounted, the framework including a front-rear frame located on a lateral outer side of the engine, wherein a bracket is attached to the front-rear frame, the bracket extending in a direction away from the engine, and the electrical component is attached to an extended end portion of the bracket.

With this configuration, the electrical component is supported by the front-rear frame of the framework, with the bracket therebetween. The framework is configured to have a frame shape and be mounted with the engine. The electrical component is attached to an end portion of the bracket located in the direction away from the engine. Therefore, the electrical component can be located at a position sufficiently apart from the engine, and it is possible to suppress the influence of heat from the engine upon the electrical component.

In one preferable embodiment, the electrical component includes a relay box and a fuse box, and the relay box and the fuse box are arranged adjacent to each other.

With this configuration, the relay box and the fuse box are centralized, and it is possible to compactly arrange the relay box and the fuse box, avoiding the influence of heat from the engine.

(4) In view of Fourth Related Art, the following are provided.

A vehicle comprising:

a vehicle body frame;

a seat mounted on the vehicle body frame, the seat being provided with a sitting section, and the seat being configured to be of a foldable type and switchable to a seating position in which a seat surface of the sitting section faces upward, and to a non-use position in which the seat surface stands up and faces forward;

a seat attachment frame that is provided so as to be changeable in a position relative to the vehicle body frame, the sitting section being supported by the seat attachment frame, and the sitting section being switched to the seating position and the non-use position as a consequence of the seat attachment frame being changed in the position thereof relative to the vehicle body frame;

a seat belt device for an occupant seated on the sitting section; and a belt end portion fixture configured to fix a seat belt end portion of the seat belt device, the belt end portion fixture being installed to the vehicle body frame.

With the configuration above, the belt end portion fixture of the seat belt device is not fixed to the seat attachment frame, which changes its position when the sitting section changes its position, but is fixed to the vehicle body, which does not change its position or location when the sitting section changes its position. In addition the vehicle body frame is inherently configured to have high strength.

Therefore, the belt end portion fixture does not move in response to the position of the sitting section being switched. Also, the position to which the belt end portion fixture is attached is not on the seat attachment frame, but on the vehicle body frame, which inherently has high strength. Therefore, there is no particular need for a reinforcement structure even though the belt end portion fixture is attached, and it is possible to realize a simple configuration without increasing the overall size.

In one preferable embodiment, the seat is a rear seat located rearward of a front seat, the rear seat is provided with a backrest section, and the rear seat is configured to be movable to a rear side of the front seat with the sitting section being brought into a standing position, and is configured to be movable to the rear side of the front seat with the backrest section remaining in a standing position.

With this configuration, it is possible to handily use the belt end portion fixture as a belt end portion fixture for the rear seat, which is moved to the rear side of the front seat with both the sitting section and the backrest section being in the standing position.

In other words, even if the sitting section and the backrest section are brought into the standing position and are moved to the rear side of the front seat, the belt end portion fixture remains at a fixing position on the vehicle body frame, and it is easy to use the belt end portion fixture irrespective of the positional change of the rear seat.

In one preferable embodiment, the belt end portion fixture is provided with a seat belt anchor that is fixed to the vehicle body frame, a buckle that is engageable with the seat belt end portion, and a joint member that joins the buckle to the seat belt anchor and supports the buckle, and the belt end portion fixture is configured to be changeable to a standing and joining position in which the buckle is located forward of and higher than the seat belt anchor, and to a laid and retracted position in which the buckle is located at a lower position compared to when the belt end portion fixture is in the standing and joining position, as a consequence of the joint member swinging about a lateral axis that passes through the seat belt anchor.

With this configuration, the buckle is supported relative to the seat belt anchor using the joint member, and the belt end portion fixture itself is configured to be swingable to stand up or lie down about the lateral axis. Consequently, the belt end portion fixture can be raised when the rear seat is in the in-use state, and can be laid and stored when the rear seat is not used and is in the retracted state. Therefore, it is easy to switch the usage mode of the belt end portion fixture.

In one preferable embodiment, the vehicle body frame is provided with a covering member that is located at a position lower than a lower surface of the seat attachment frame, and a recessed part that allows the belt end portion fixture in the laid and retracted position to be embedded therein is formed in an upper surface of the covering member.

With this configuration, the recessed part is present in the upper surface of the covering member, into which the belt end portion fixture in the laid and retracted position can be embedded. Thus, when the sitting section is in the non-use position, the belt end portion fixture is changeable to the laid and retracted position, and the recessed part is present. Therefore, the belt end portion fixture can be retracted in the state of being embedded into the recessed part, without interfering with other devices located above the recessed part.

In one preferable embodiment, a load carrying platform is mounted on a rear part of the vehicle body frame, and the load carrying platform is configured to be changeable to a rear-side mounting state in which a front end portion thereof is located rearward of the recessed part in a front-rear direction of the vehicle body, and to a front-side mounting state in which the front end portion is located forward of the recessed part and a bottom surface of the load carrying platform is located to cover an upper side of the recessed part.

With this configuration, the position of the front end portion of the load carrying platform is changeable to the front-side mounting state and the rear-side mounting state. Therefore, the load carrying platform can be brought into the state in which the bottom surface of the load carrying platform covers the upper side of the recessed part, and into the state in which the bottom surface of the load carrying platform is displaced rearward from the recessed part. Consequently, when the belt end portion fixture is not used and is in the laid and retracted position, the upper side of the recessed part can be covered by the load carrying platform, and regarding the switching to the standing and joining position in which the belt end portion fixture is used, the belt end portion fixture can be easily brought out from the recessed part with the load carrying platform being removed from the recessed part.

(5) In view of Fifth Related Art, the following are provided.

A vehicle comprising:

a travelling vehicle body;

a load carrying platform provided for the travelling vehicle body, and including:

a bottom plate provided with a load mounting surface;

a front plate that is provided to stand on a front end portion of the bottom plate along a direction that intersects the load mounting surface;

a rear plate that is provided to stand on a rear end portion of the bottom plate along a direction that intersects the load mounting surface; and a pair of left and right lateral plates that are respectively provided to stand on left and right side portions of the bottom plate along a direction that intersects the load mounting surface, the load carrying platform being formed with the front plate, the rear plate, and the pair of left and right lateral plates so as to have a rectangular box shape that opens upward, wherein each of the left and right lateral plates is provided with a front lateral plate and a rear lateral plate, the front lateral plate is joined to and supported by the rear lateral plate so as to be engageable with the front plate and swingable about a swing axis that extends along a direction that intersects the load mounting surface, the front lateral plate has an expanded position in which the front lateral plate extends along a direction in which the rear lateral plate extends, and a shortened position in which the front lateral plate intersects the rear lateral plate, and a front-rear length of the load carrying platform is changeable as a consequence of the front lateral plate changing to the expanded position and to the shortened position, and a swing resistance mechanism configured to restrict the front lateral plate, unjoined from the front plate, from swinging due to a weight thereof, is provided at a position where the front lateral plate and the rear lateral plate are joined to each other.

According to this aspect of the present invention, a swing resistance mechanism configured to apply a sufficient light load to restrict the front lateral plate, unjoined from the front plate, from swinging due to the weight thereof, is provided at a position where the front lateral plate and the rear lateral plate are joined to each other. Therefore, the swing resistance mechanism is given a light swing resistance against the swinging of the front lateral plate.

With this configuration, even when the front lateral plate on one side, which has been unjoined from the front plate, is operated to swing to the shortened position, the position of the front lateral plate after being operated to swing is maintained. Therefore, it is possible to avoid a problem in which the front lateral plate on one side swings to the expanded position while the operator moves to the other front lateral plate and operates the other front lateral plate to swing to the shortened position. Thus, it is easy to efficiently perform the operation to change the position of the front lateral plate.

In one preferable embodiment, a hinge joint is provided at a position where a rear end portion of the front lateral plate and a front end portion of the rear lateral plate face each other, the hinge joint being configured to join the rear end portion and the front end portion to each other such that the rear end portion and the front end portion are swingable about the swing axis, and the swing resistance mechanism is provided at the hinge joint.

With this configuration, the swing resistance mechanism is built into the hinge joint, using the hinge joint that joins the rear end portion of the front lateral plate and the front end portion of the rear lateral plate to each other. Therefore, it is easy to achieve the swing resistance mechanism with a compact configuration.

In one preferable embodiment, the hinge joint is provided at a plurality of positions along a top-bottom direction, each hinge joint is provided with: hinge protrusion pieces that are respectively provided at the rear end portion of the front lateral plate and the front end portion of the rear lateral plate; and a fulcrum pin that penetrates through the hinge protrusion pieces, the hinge joint at an uppermost position is provided with a bolt nut that serves as the fulcrum pin and that is configured to fasten the hinge protrusion pieces in a fastening direction, and the hinge joint at the uppermost position is provided with a friction member that serves as the swing resistance mechanism and that is configured to increase friction resistance thereof by elastically deforming in response to the bolt nut being fastened.

With this configuration, the bolt nut is used as the fulcrum pin of the hinge joint. Using a friction member that is configured to provide friction resistance by elastically deforming in response to the bolt nut being fastened, it is easy to realize a swing resistance mechanism having a simple and compact configuration.

Also, the bolt nut that can fasten the friction member is located at the uppermost hinge joint among the plurality of hinge joint, and it is easy to operate the bolt nut.

In one preferable embodiment, the friction member is provided with a disc spring inserted between the bolt nut and the hinge protrusion pieces.

With this configuration, the swing resistance mechanism for the front lateral plate can be achieved by using the disc spring used as a bolt stopper structure. Therefore, it is possible to achieve the swing resistance mechanism having an even simpler and compact configuration.

In one preferable embodiment, a limiting stopper configured to restrict the front lateral plate from swinging rearward by more than a predetermined amount is provided at the front end portion of the rear lateral plate.

With this configuration, the limiting stopper configured to restrict the front lateral plate from swinging rearward by more than a predetermined amount is provided. Therefore, it is easy to further efficiently change the position of the load carrying platform to the shortened position. Specifically, if a restriction point, at which the limiting stopper restricts the front lateral plate from swinging further rearward, is set to be a point at the time the front lateral plate is in the shortened position, it is easy for the operator to maintain both front lateral plates in the shortened position by operating the front lateral plate on one side to swing to the restriction point, maintaining the front lateral plate at the point, moving to the other side, and then operating the front lateral plate on the other side to swing to the restriction point. Consequently, it is easy to more efficiently perform the operation to change the front-rear length of the load carrying platform by changing the position of the front lateral plates.

Other features and advantageous effects achieved thereby will become apparent from reading the following description with reference to the accompanying drawings.

DESCRIPTION OF THE PREFERRED EMBODIMENTS

First Embodiment

Figure 1:
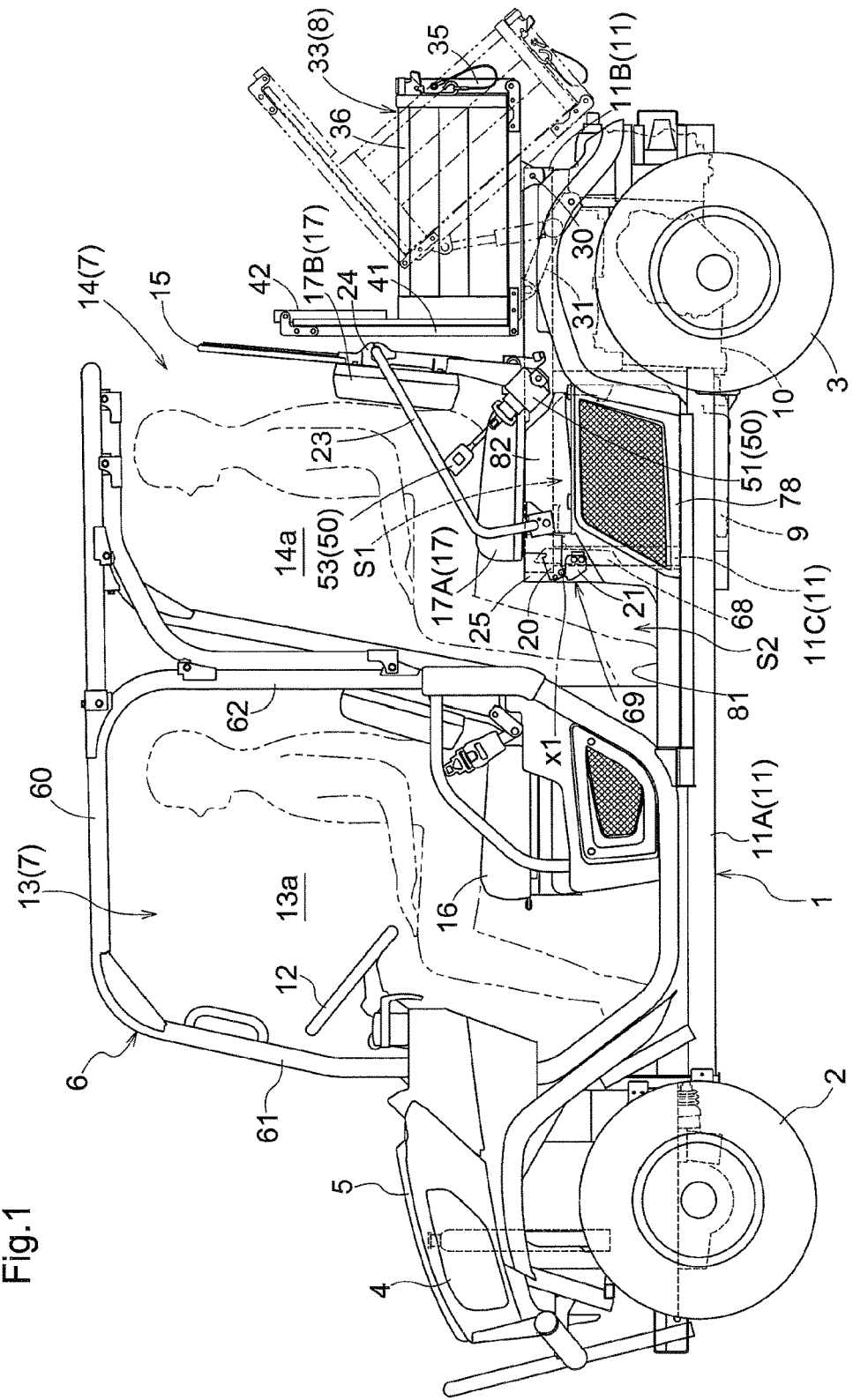
FIG. 1 is an overall side view of a utility vehicle according to a first embodiment when a rear seat is in an in-use state and a load carrying platform is in a shortened state.

The following describes a first embodiment with reference to FIGS. 1 to 14.

Note that the "front-rear direction" and the "left-right direction" in the present embodiment are as follows unless otherwise specified. That is, "front" indicates the forward travelling direction (see an arrow F in FIG. 4) of a utility vehicle (an example of a work vehicle) to which the present invention is applied, "rear" indicates the rearward travelling direction (see an arrow B in FIG. 4) of the utility vehicle, "right" indicates the direction corresponding to the right side of the utility vehicle when the utility vehicle faces forward in terms of the above-described front-rear direction (see an arrow R in FIG. 4), and "left" indicates the direction corresponding to the left side of the utility vehicle under the same condition (see an arrow L in FIG. 4).

Overall Configuration

As shown in FIGS. 1 to 4, a travelling vehicle body of the utility vehicle provided with: left and right front wheels 2 that are steerable and are supported by a front part of a vehicle body frame 1; and left and right rear wheels 3 that are not steerable and are supported by a rear part of the vehicle body frame 1. In other words, the travelling vehicle body of the utility vehicle is a four-wheel drive vehicle that travels with four wheels.

A front end portion of the travelling vehicle body is provided with a front cover 5 on which a pair of left and right headlights 4 are formed. A portion of the travelling vehicle body located rearward of the front cover 5 is provided with a boarding section 7 that is provided with a roll over protection structure (ROPS) 6. A portion located rearward of the boarding section 7 is provided with a load carrying platform 8 on which a load can be mounted and that is able to perform a dumping operation.

Figure 2:
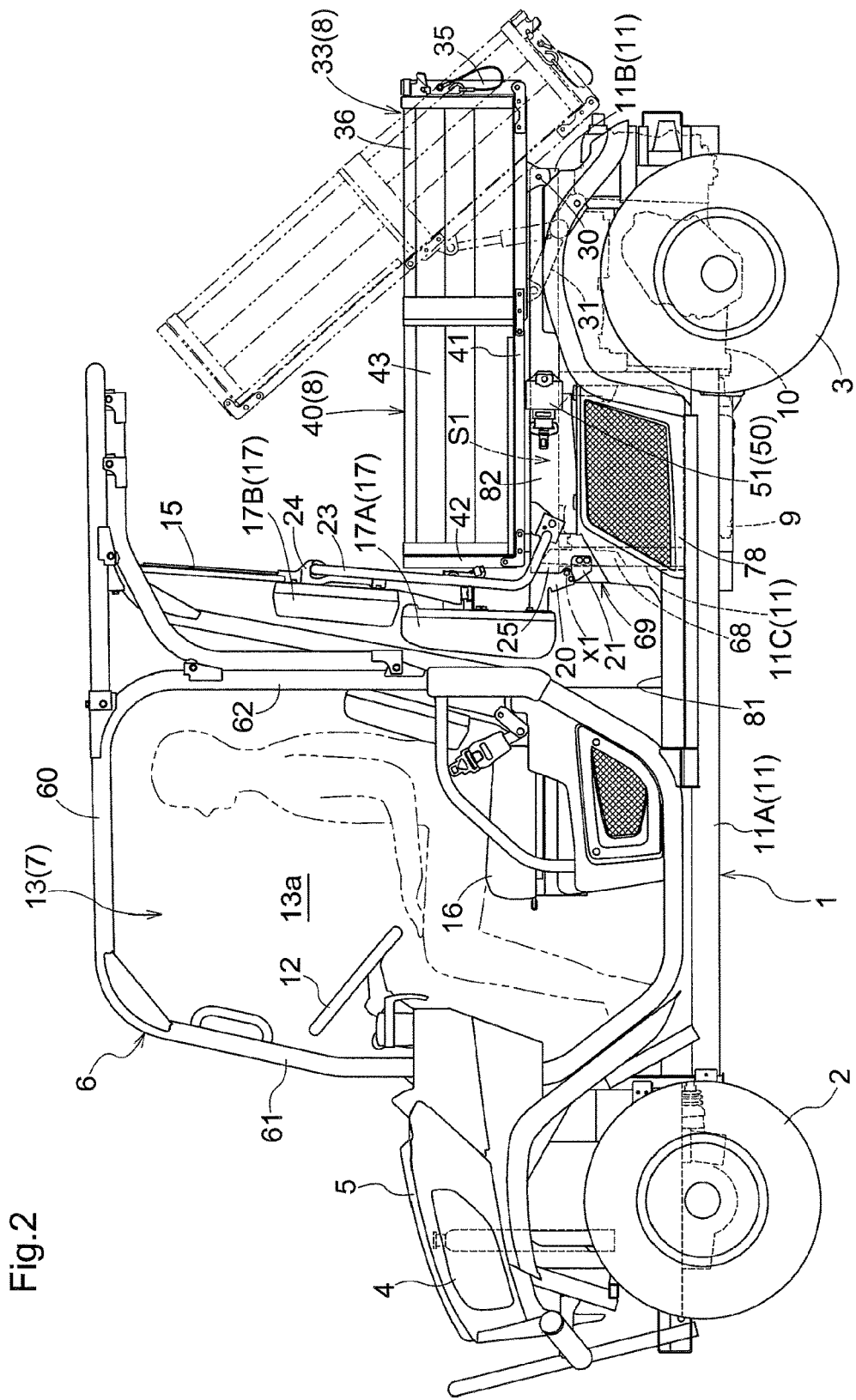
FIG. 2 is an overall side view of the utility vehicle according to the first embodiment when the rear seat is in a retracted state and the load carrying platform is in an extended state.
Figure 3:
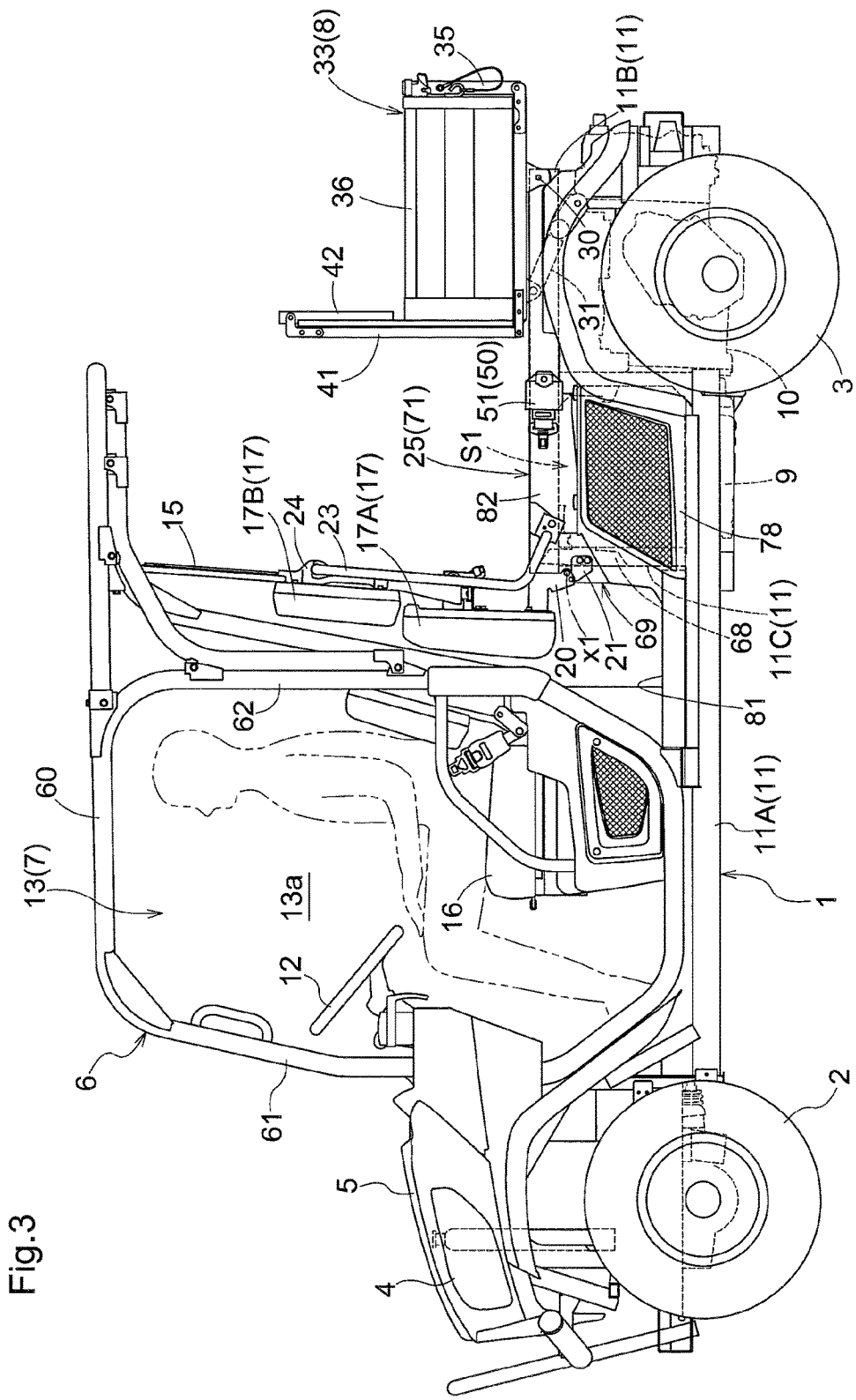
FIG. 3 is an overall side view of the utility vehicle according to the first embodiment when the rear seat is in the retracted state and the load carrying platform is in the shortened state.

As shown in FIGS. 1 to 3, the vehicle body frame 1 of the travelling vehicle body is provided with a pair of left and right main frames 11 (examples of frameworks) that are elongated in the front-rear direction. The main frames 11 are configured to have a frame shape and are mounted with and support an engine 9, a travelling transmission 10 and so on. In the main frames 11, front frame parts 11A that are supported by the front wheels 2 are formed at a lower level, and rear frame parts 11B (examples of front-rear frames) that are supported by the rear wheels 3 are formed at a higher level. The rear frame parts 11B are located outside the engine 9, and extend in the front-rear direction. In the main frames 11, rising frame parts 11C are provided at intermediate positions. The rising frame parts 11C connect rear end portions of the front frame parts 11A, which are located at the lower level, and front end portions of the rear frame parts 11B, which are located at the higher level. The main frames 11 are formed to have a stepped shape provided with the front frame parts 11A, the rear frame parts 11B, and the rising frame parts 11C.

The engine 9 is located within a space that is formed below the rear frame parts 11B, rearward of the rising frame parts 11C. Drive force output by the engine 9 is input to a travelling transmission 10, and drive force that has been subjected to transmission shift is transmitted to the front wheels 2 and the rear wheels 3.

Boarding Section

Figure 4:
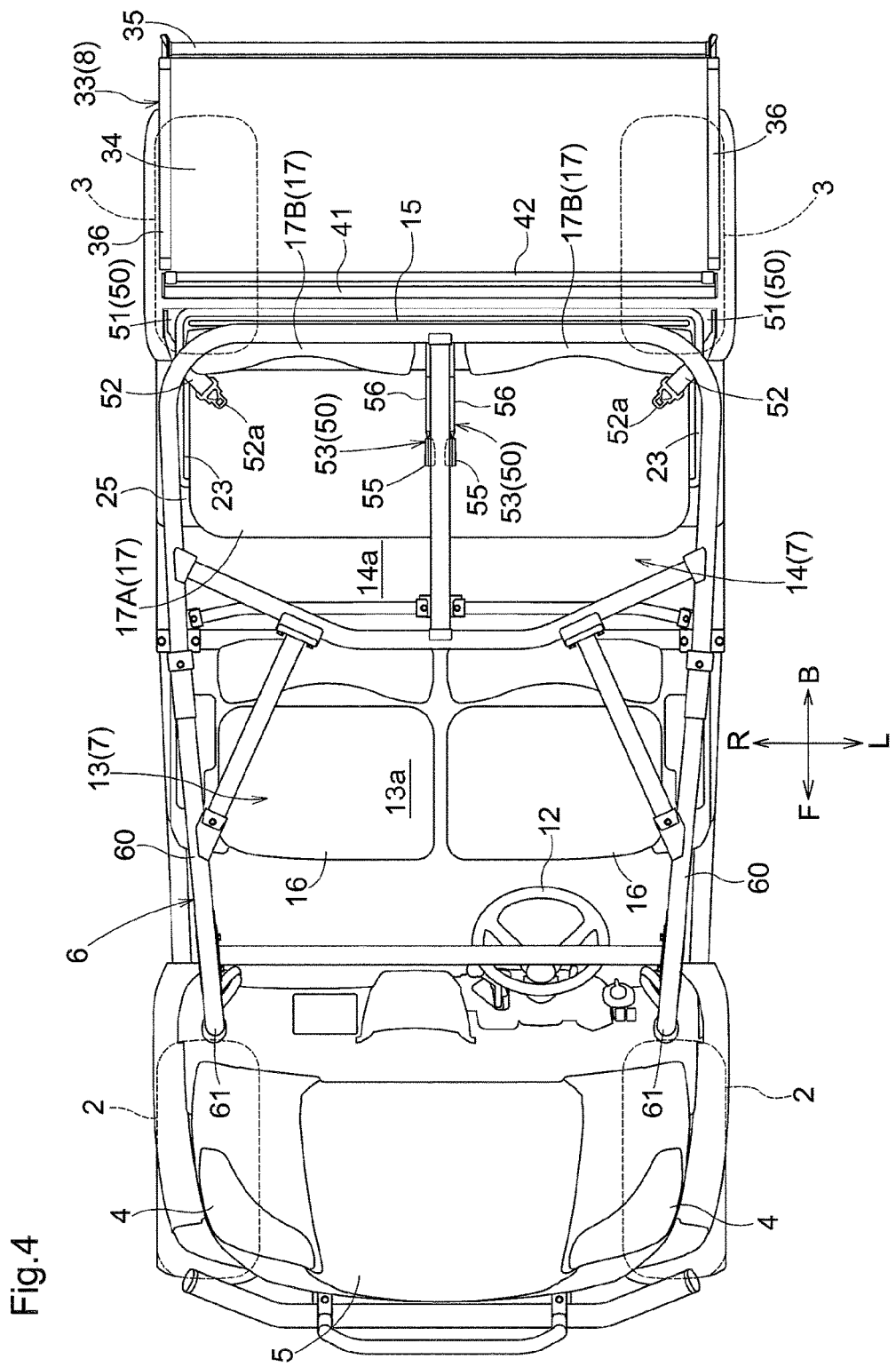
FIG. 4 is a plan view of the utility vehicle according to the first embodiment when the rear seat is in the in-use state and the load carrying platform is in the shortened state.

The boarding section 7 is provided in an intermediate portion of the travelling vehicle body in the front-rear direction. The boarding section 7 is provided with: front seats 16 that include a driver's seat and allow an occupant to be seated thereon; and a rear seat 17 that is provided rearward of the front seats 16 and allows an occupant to be seated thereon. The engine 9 is located below the front seats 16 and the rear seat 17. The boarding section 7 is configured such that the state thereof is changeable to a two-row seat state that allows an occupant to be seated on the front seats 16 and the rear seat 17 (corresponding to the "seat") as shown in FIGS. 1 and 4 and to a one-row seat state that allows an occupant to be seated on the front seats 16 but does not allow an occupant to be seated on the rear seat 17 as shown in FIG. 2. When the rear seat 17 is in the in-use state, the engine 9 is located immediately below a seat part 17A of the rear seat 17.

As shown in FIG. 1, the positions of the rising frame parts 11C of the main frames 11 in the front-rear direction are set relative to the front frame parts 11A and the rear frame parts 11B so as to be located near a front end portion of the rear seat 17 in the in-use state.

Therefore, as shown in FIGS. 1 and 4, when the boarding section 7 is in the two-row seat state, the laterally elongated seat part 17A of the rear seat 17 is mounted on the rear frame parts 11B that are located at the higher level rearward of the rising frame parts 11C of the main frames 11. More specifically, when the rear seat 17 is in the in-use state and the load carrying platform 8 is in a shortened state, the seat part 17A of the rear seat 17 is located immediately above the engine 9. On the other hand, as shown in FIG. 2, when the boarding section 7 is in the one-row seat state, the seat part 17A of the rear seat 17 is brought into the state of being folded forward (a retracted state). More specifically, when the rear seat 17 is in the retracted state, and the load carrying platform 8 is in an extended state, a front part of the load carrying platform 8 is located immediately above the engine 9.

As shown in FIGS. 1 to 4, the boarding section 7 is provided with the ROPS 6. The ROPS 6 is disposed on a front part of the boarding section 7. A front boarding section 13 having a front boarding section space 13a, and a rear boarding section 14 having a rear boarding section space 14a, are provided within a space surrounded by the ROPS 6.

As shown in FIGS. 1 and 2, the ROPS 6 is provided with: upper frames 60 that are located above the front boarding section space 13a and the rear boarding section space 14a and extend along the front-rear direction of the vehicle body; a pair of left and right front supporting posts 61 that are located forward of the front boarding section space 13a, respectively on both lateral outer sides of the vehicle body, and that extend in the top-bottom direction; and a pair of left and right rear supporting posts 62 that are located between the front boarding section 13 and the rear boarding section 14, respectively on both lateral outer sides of the vehicle body, and that extend in the top-bottom direction of the vehicle body. The upper frames 60 protrude further rearward than the rear supporting posts 62 at the same level as the rear supporting posts 62.

As shown in FIGS. 1 to 4, the front seats 16 are respectively provided on the left and right sides within the front boarding section space 13a of the front boarding section 13, so that two people can be seated in the front boarding section 13. The left and right front seats 16 are configured to be separately slidable in the front-rear direction using guide rails, which are not shown in the drawings. A steering wheel 12 is provided forward of the front seat 16 that is located in the left area out of the left and right front seats 16, and the left front seat 16 serves as the driver's seat.

As shown in FIGS. 1 to 4, the rear boarding section 14 is provided with the rear seat 17 on which occupants can be seated. The seat part 17A of the rear seat 17 is a laterally elongated seat on which two people can be seated. Specifically, two or three people can be seated in the rear boarding section 14. The rear seat 17 is configured such that the state thereof can be changed to the in-use state in which an occupant can be seated on the rear seat 17 (the two-dot chain line shown in FIG. 5, FIG. 1 and FIG. 4) and the retracted state in which an occupant cannot be seated on the rear seat 17 (the solid line in FIG. 5, FIG. 2 and FIG. 3).

Figure 5:
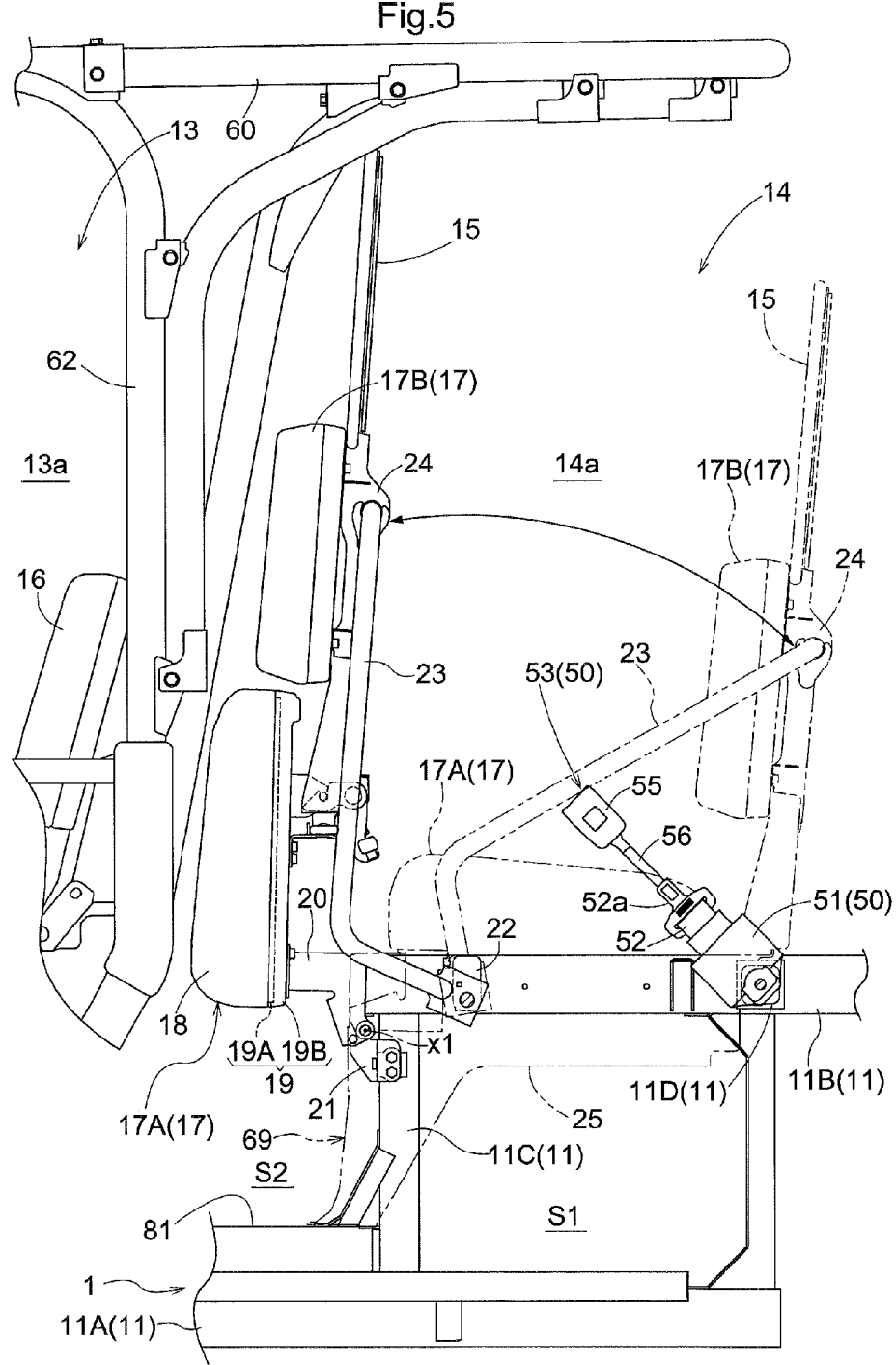
FIG. 5 is a side view showing the changing of the state of the rear seat according to the first embodiment.

As shown in FIGS. 4, 5 and so on, the rear seat 17 is provided with the laterally elongated seat part 17A and two backrest sections 17B. The seat part 17A is provided with: a cushion layer 18 that serves as an elastic seat surface; a seat attachment frame 19 that supports the cushion layer 18 and a metal fitting 20 for joining the seat attachment frame 19 to the main frames 11. The seat attachment frame 19 is configured by combining: a supporting frame 19A that is grid-shaped and supports the cushion layer 18 from below; and a bottom plate 19B that is plate-shaped having holes and holds the supporting frame 19A from further below.

The metal fitting 20 is pivotally joined to a metal supporting fitting 21 that is fixed to the rising frame parts 11C of the main frames 11 so that the metal fitting 20 is swingable in the top-bottom direction about a lateral axis x1 that extends in the left-right direction. Therefore, the seat attachment frame 19 whose front end portion is joined to the metal fitting 20 is rotated about the lateral axis x1, and the rear seat 17 is thus switched to the in-use state and the retracted state.

The backrest sections 17B of the rear seat 17 are joined to upper end portions of a pair of left and right link members 23 that are respectively located on the two sides of the rear seat 17 in the lateral direction. The respective lower end portions of the pair of left and right link members 23 are rotatably supported by attachment parts 22 that are integrated with the rear frame parts 11B below the seat part 17A. The respective upper end portions of the pair of left and right link members 23 are relatively rotatably joined to attachment members 24 that are provided on the rear side of the backrest sections 17B.

The pair of left and right link members 23 are located so as to be inclined downward in a direction from the rear side to the front side when the rear seat 17 is in the in-use state, and serve as armrests or handrails. A lower end portion of a panel member 15 is joined to the attachment members 24 that are provided on the rear side of the backrest sections 17B. Although not shown in the drawings, the panel member 15 is provided with: a separator frame that is manufactured by joining a frame body that extends in the lateral direction of the vehicle body and a frame body that extends in the top-bottom direction of the vehicle body; and a netted member that is stretched over the separator frame.

Load Carrying Platform

The load carrying platform 8 is configured such that the state thereof can be changed to the shortened state shown in FIGS. 1 and 3 and the extended state shown in FIGS. 2 and 4 in which the load carrying platform 8 is extend further forward than in the shortened state. The panel member 15 that separates the boarding section 7 and the load carrying platform 8 from each other is provided between the boarding section 7 and the load carrying platform 8. The panel member 15 is supported by the backrest sections 17B of the rear seat 17.

As shown in FIG. 1, the load carrying platform 8 is supported by the vehicle body with a dump fulcrum shaft 30 therebetween such that the load carrying platform 8 is swingable in the top-bottom direction. The dump fulcrum shaft 30 is located on the rear end side and extends in the lateral direction of the vehicle body. The load carrying platform 8 is able to be operated to be raised and lowered by an up/down cylinder 31 that is attached so as to span the lower surface of the load carrying platform 8 and the vehicle body frame 1, so that the load carrying platform 8 is switchable between a loading position in which the load carrying platform 8 is horizontally or substantially horizontally located on the travelling vehicle body and a dumping position in which a front end portion side of the load carrying platform 8 is raised high above the vehicle body.

Figure 6:
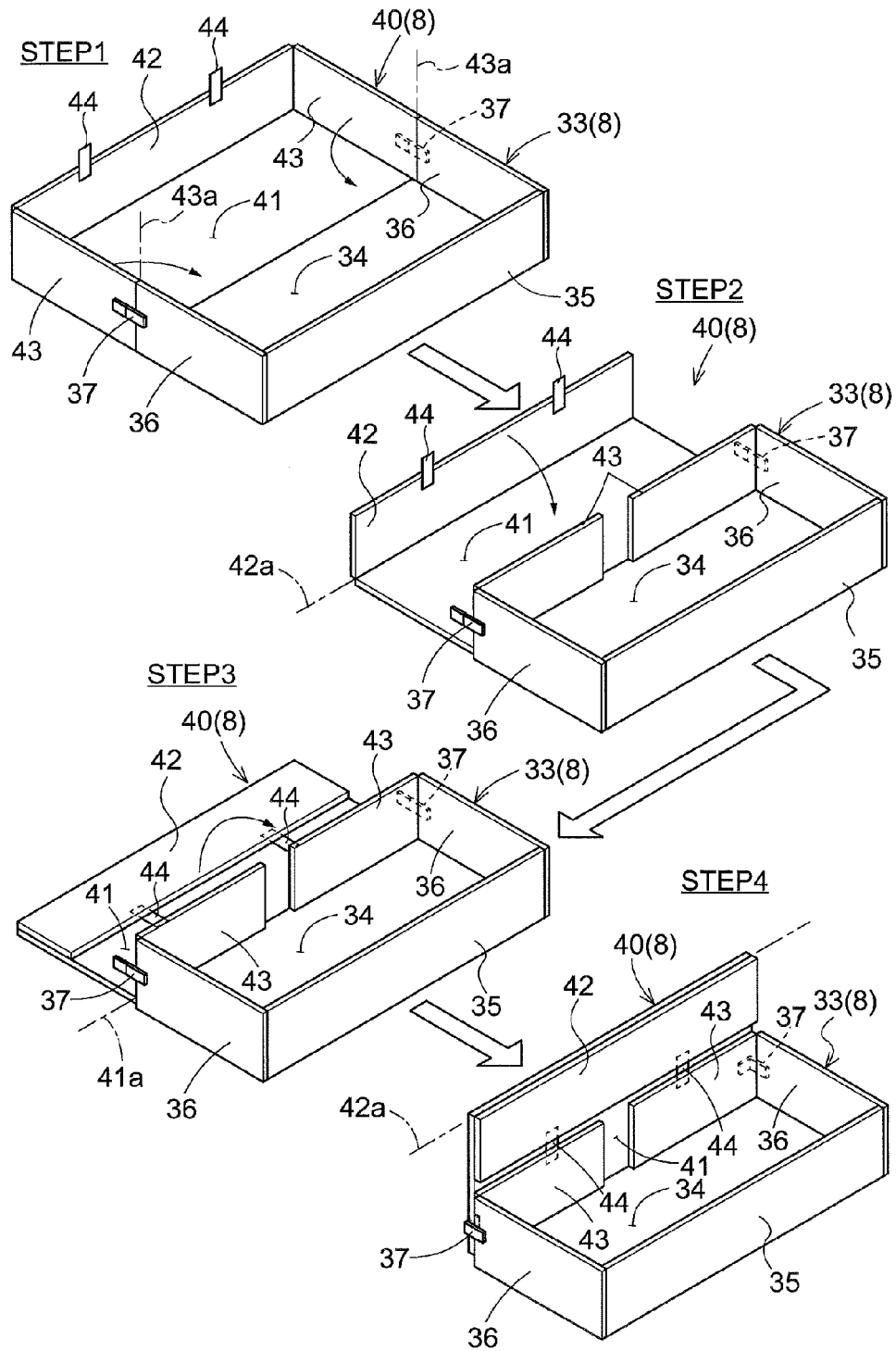
FIG. 6 is a perspective view showing the changing of the state of the load carrying platform according to the first embodiment.

As shown in FIG. 6, the load carrying platform 8 is provided with: a load carrying platform main body 33 having a bottom plate 34 that has a lower surface to which the up/down cylinder 31 is joined; and an extension load carrying platform part 40 having an extension bottom plate 41 whose rear end portion is joined to a front end portion of the bottom plate 34. In addition to the bottom plate 34, the load carrying platform main body 33 is also provided with: a rear plate 35 that is joined to a rear end portion of the bottom plate 34; and lateral plates 36 that are respectively joined to side portions of the bottom plate 34.

As shown in FIG. 6, in addition to the extension bottom plate 41, the extension load carrying platform part 40 is also provided with a front plate 42 that is joined to a front end portion of the extension bottom plate 41 and that swings about an axis 42a extending in the left-right direction so as to stand up or lie down. The respective front end portions of the left and right lateral plates 36 of the load carrying platform main body 33 are provided with extension lateral plates 43 that are joined so as to swing in the lateral direction of the load carrying platform about axes 43a extending in the top-bottom direction. Furthermore, the extension bottom plate 41 is configured to swing about an axis 41a extending in the left-right direction so as to stand up or lie down relative to the bottom plate 34 of the load carrying platform main body 33. Thus, the extension load carrying platform part 40 is configured to be switchable to a folded state shown in FIGS. 1 and 4 and an expanded state shown in FIG. 2.

The extension load carrying platform part 40 shown in STEP 1 in FIG. 6 is the extension load carrying platform part in the expanded state. The extension load carrying platform part 40 shown in STEP 4 in FIG. 6 is the extension load carrying platform part in the folded state.

When the state of the load carrying platform 8 is to be changed from the extended state to the shortened state, the left and right extension lateral plates 43 are operated to swing toward the inside of the load carrying platform as shown in STEP 2 in FIG. 6 so that the extension lateral plates 43 are in the folded position in which the extension lateral plates 43 extend along the front edge of the bottom plate 34. Note that the swinging of the left and right extension lateral plates 43 is restricted by restriction members, which are not shown in the drawings, when the extension lateral plates 43 form a right angle or a substantially right angle relative to the lateral plates 36.

Next, as shown in STEP 3 in FIG. 6, the front plate 42 is operated to swing toward the upper surface of the extension bottom plate 41 and to lie down, and thus the front plate 42 is brought into the folded position in which the front plate 42 is laid on the upper surface of the extension bottom plate 41.

Next, as shown in STEP 4 in FIG. 6, the extension bottom plate 41 is operated to swing toward the extension lateral plates 43 in the folded position, and to stand up, and the extension bottom plate 41 is brought into the folded position in which the extension bottom plate 41 is laid on the outer surface of the extension lateral plates 43. The extension load carrying platform part 40 is thus brought into the folded state.

When the extension load carrying platform part 40 is brought into the folded state, the load carrying platform 8 is brought into the shortened state in which the load carrying platform 8 has a shortened front-rear length due to the extension load carrying platform part 40 being folded. The folded state in which the left and right extension lateral plates 43 are located further inside the load carrying platform than the extension bottom plate 41 is adopted as the folded state of the extension load carrying platform part 40. Therefore, compared to when the folded state in which the left and right extension lateral plates 43 are located outside the extension bottom plate 41 is adopted, the front-rear length of the load carrying platform 8 in the shortened state can be reduced by the plate thickness of the extension lateral plates 43.

Note that, in the present embodiment, as shown in FIG. 6, the load carrying platform 8 is provided with left and right lock mechanism 37 that fix the extension bottom plate 41 and the left and right lateral plates 36 to each other when the load carrying platform 8 is in the folded state. Also, restriction members 44 are provided on the upper end of the front plate 42. Due to the presence of these restriction members 44, the front plate 42 is restricted from rotating upward about the axis 42a. Specifically, when the front plate 42 is about to rotate upward about the axis 42a, the restriction members 44 come into contact with the front plate 42, and thus the position of the front plate 42 is maintained. With this configuration, due to the lock mechanisms 37 being provided between the extension bottom plate 41 and the left and right lateral plates 36, it is possible to maintain the position of the front plate 42 with a simple configuration, without providing a complicated lock mechanism for maintaining the position of the front plate 42.

As shown in FIGS. 1 and 4, when the load carrying platform 8 is brought into the shortened state, the front end portion thereof is located rearward of the rear boarding section space 14a and the front-rear length is shortened, and thus the utility vehicle can be brought into the two-row seat state.

When the state of the load carrying platform 8 is to be changed from the shortened state to the extended state, as shown in STEP 3 in FIG. 6, the extension bottom plate 41 is operated to swing forward and lie down so that the extension bottom plate 41 is brought into the expanded position in which the extension bottom plate 41 is flush with or substantially flush with the bottom plate 34.

Next, as shown in STEP 2 in FIG. 6, the front plate 42 is operated to swing to stand up, and is thus brought into the expanded position in which the front plate 42 stands on the front end portion of the extension bottom plate 41.

Next, as shown in STEP 1 in FIG. 6, the left and right extension lateral plates 43 are operated to swing toward the outside of the load carrying platform, and the extension load carrying platform part 40 is thus brought into the expanded position in which the left and right extension lateral plates 43 are flush with or substantially flush with the lateral plates 36. Consequently, the extension load carrying platform part 40 is brought into the expanded state. In this way, as a consequence of the extension load carrying platform part 40 being brought into the expanded state, the load carrying platform 8 is brought into the extended state in which the front-rear length is expanded.

As shown in FIG. 2, the front end portion of the load carrying platform 8 brought into the extended state enters the rear boarding section space 14a due to the front-rear length having been extended. Here, in order to allow the front end portion of the load carrying platform 8 to enter the rear boarding section space 14a, the rear seat 17 has been brought into the retracted state, and the panel member 15 has been moved to a front separation position for realizing the one-row seat state. The front end portion of the load carrying platform 8 enters a seat space within the rear boarding section space 14a (where the rear seat 17 in the in-use state was present), which is now empty due to the rear seat 17 having been brought into the retracted state. When the backrest sections 17B are in the retracted position, the link members 23 are each in an L-shaped position in side view, in which first parts of the link members 23 extend forward from the vehicle body and second parts of the link members 23 extend upward from front end portions of the first parts. Then, the front end portion of the load carrying platform 8 enters an L-shaped space formed by the first parts and the second parts of the left and right link members 23. In this way, even if the width of the load carrying platform 8 is larger than the width of the link members 23, the total length of the vehicle body can be reduced by moving the load carrying platform 8 forward.

Seat Belt Devices

Figure 8:
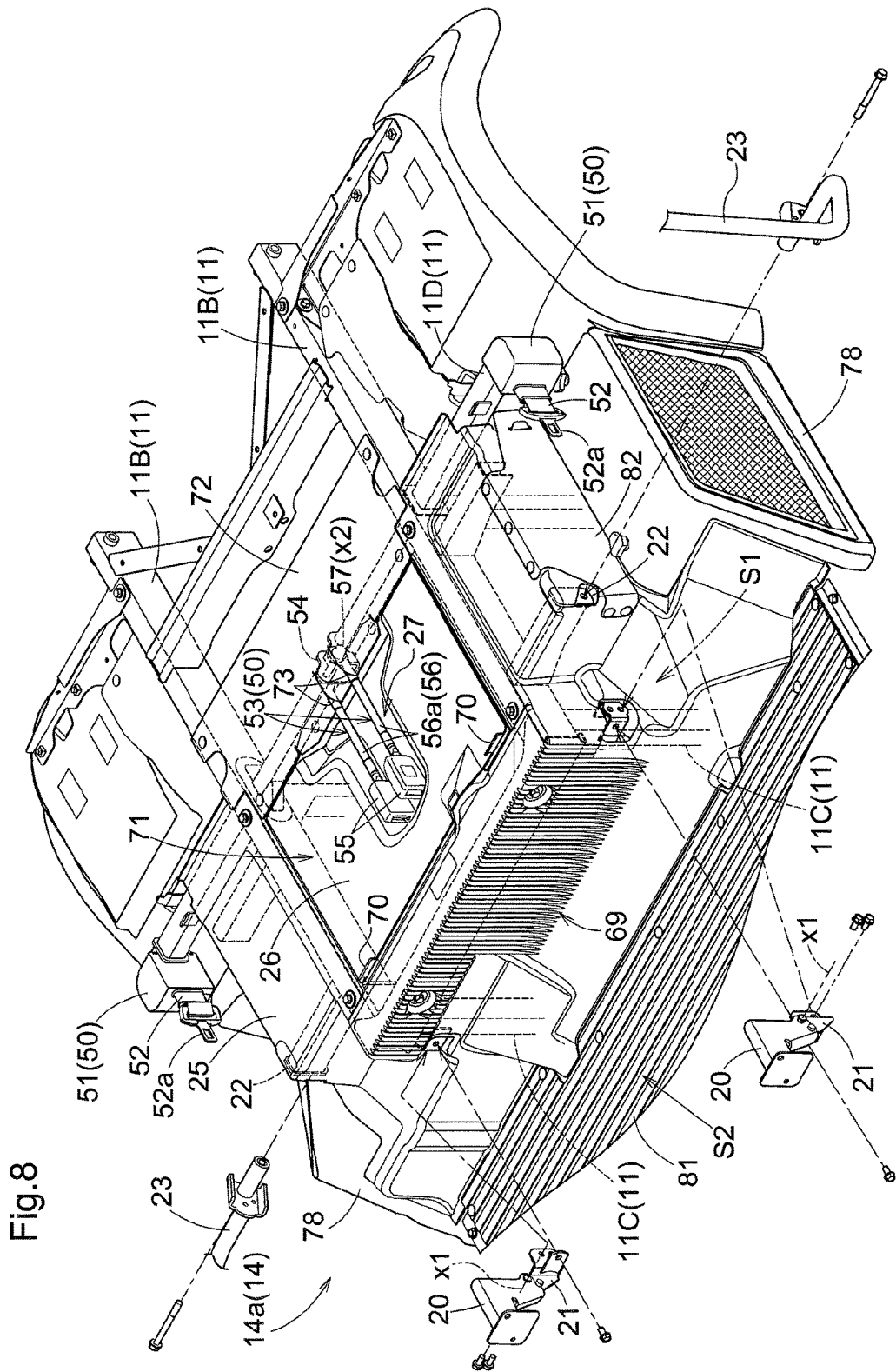
FIG. 8 is a perspective view showing a rear part of the travelling vehicle body according to the first embodiment.
Figure 9:
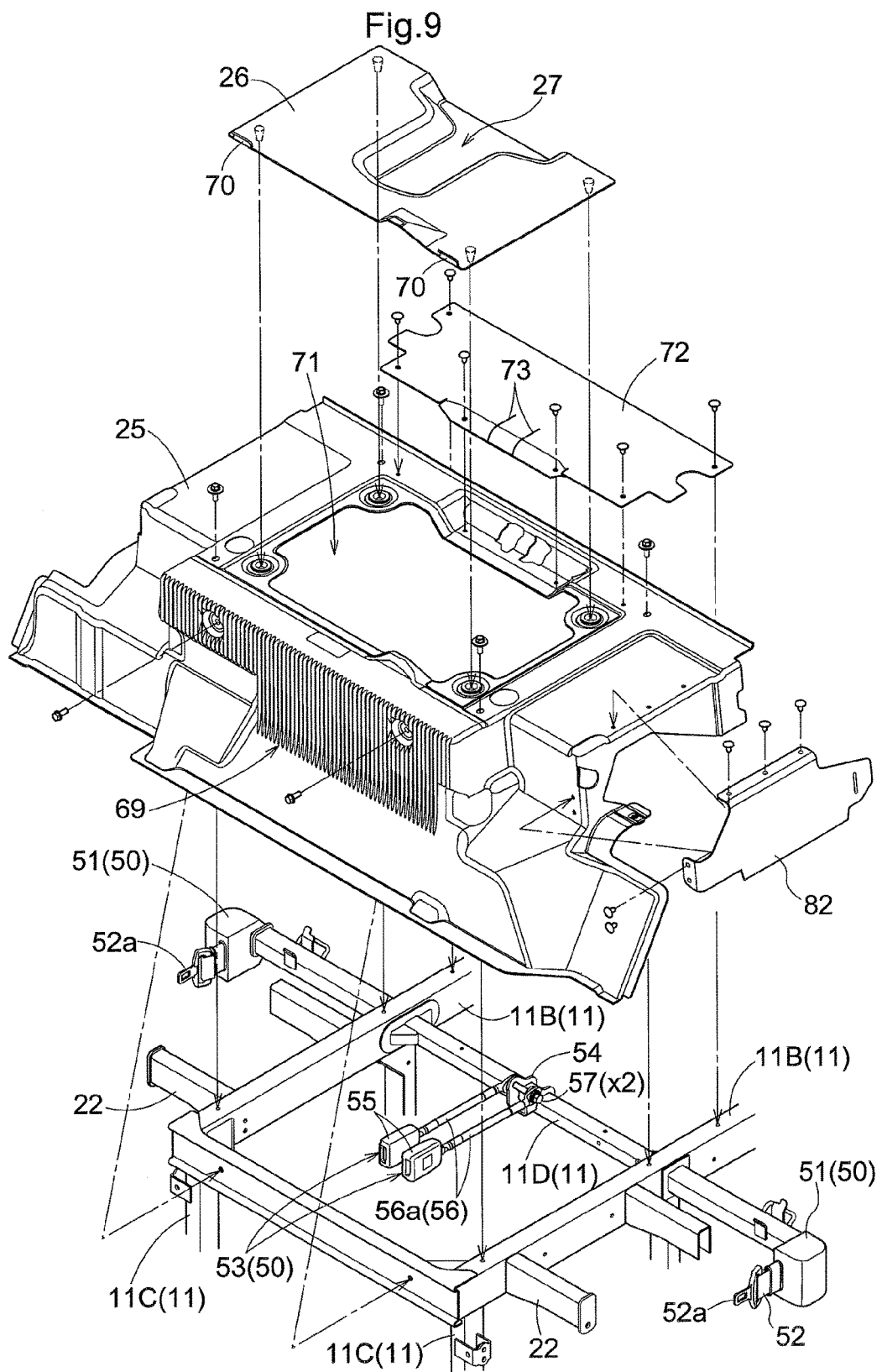
FIG. 9 is an exploded perspective view showing an area around an inspection cover and a rear part cover according to the first embodiment.
Figure 11:
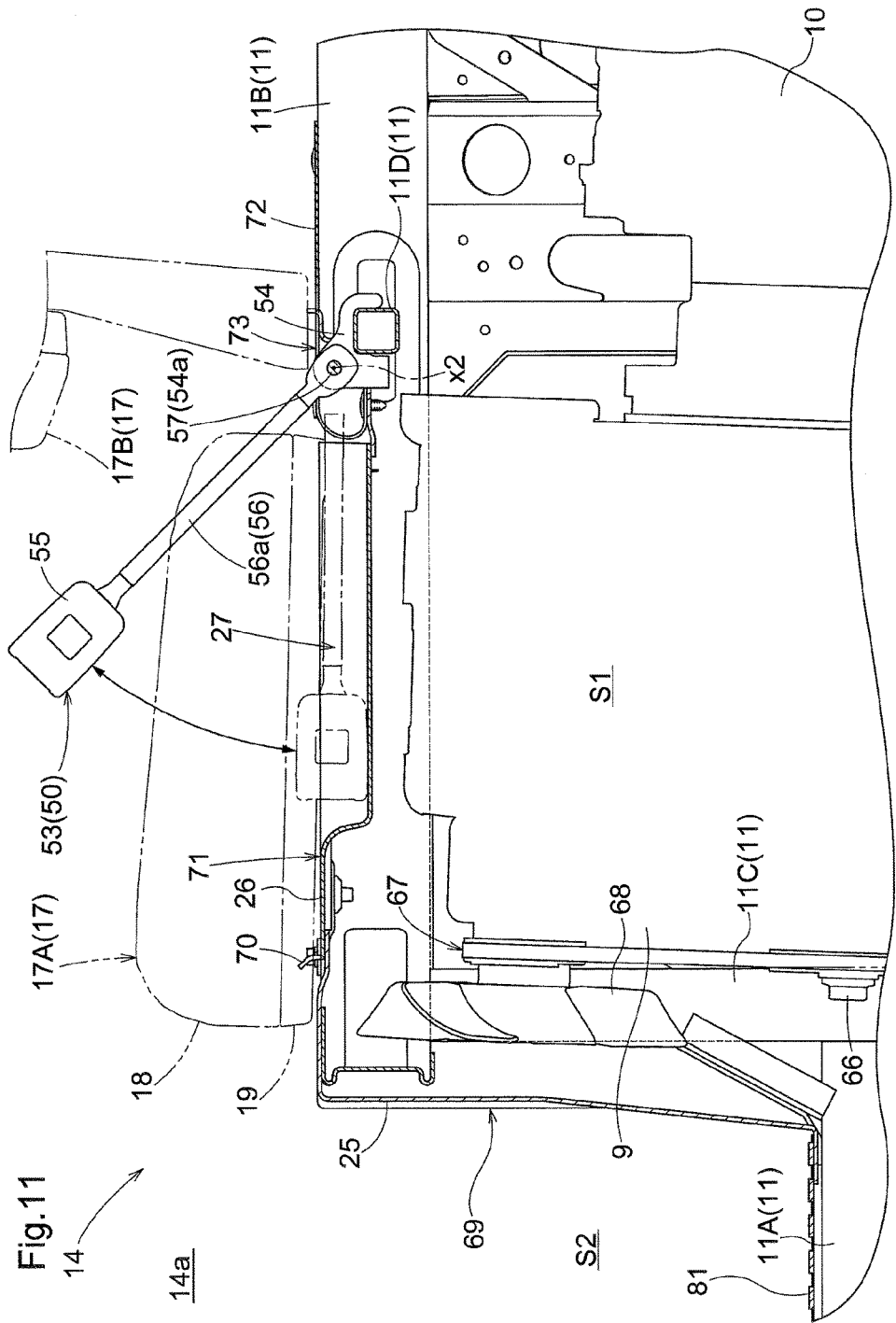
FIG. 11 is a side view showing an area around a seat belt anchor according to the first embodiment.

As shown in FIG. 4, seat belt devices 50, which are able to restrain the body of an occupant seated on the rear seat 17 in position by applying force toward the seat part 17A, are provided in the vicinity of the rear seat 17. Two seat belt devices 50 are provided in the rear boarding section 14. As shown in FIGS. 8, 9 and 11, the seat belt devices 50 are provided with: belt reels 51 that are located on the left and right sides of the rear seat 17; and a pair of belt anchors 53 that are located in a central area of the rear seat 17 in the left-right direction and that are able to separately fix end portions of belt bodies 52 that are respectively drawn out from the left and right belt reels 51. The belt reels 51 are configured to be able to feed and wind the belt bodies 52. The belt anchors 53 are configured to be engageable with hook parts 52a, which are metal end portion fittings having a hole and attached to the belt bodies 52. The belt anchors 53 are configured to be swingable about a swing shaft 57 that is made from a lateral joint bolt that is located below a rear part cover 72 described below.

The belt reels 51 and the belt anchors 53 are each fixed to the vehicle body frame 1 in the following manner. As shown in FIGS. 8, 9 and 11, a lateral frame 11D is fixed to an area between the rear end portion of the rear seat 17 in the in-use position and the front end portion of the load carrying platform 8 in the shortened state in the front-rear direction, along the left and right rear frame parts 11B located below the area.

The lateral frame 11D penetrates through the left and right rear frame parts 11B and extends to the outside of the rear frame parts 11B in both lateral directions. The belt reels 51 are respectively fixed and joined to the left and right end portions of the lateral frame 11D. Each belt reel 51 is orientated such that the belt inlet/outlet direction thereof faces forward and obliquely upward so that the belt bodies 52 can be drawn out in an obliquely forward direction.

The belt anchors 53 are provided with: a pair of anchor stays 54 fixed to the lateral frame 11D; and a pair of buckles 55 that are engageable with end portions of the left and right belt bodies 52. The anchor stays 54 and the buckles 55 are joined to each other by joint members 56, and the belt anchors 53 are configured with the anchor stays 54, the buckles 55, and the joint members 56.

The anchor stays 54 are configured with bracket members that are welded and fixed to a central portion of the lateral frame 11D in the left-right direction. The buckles 55 have a well-known configuration and are able to fix and release hook parts 52a of the belt bodies 52 inserted therein. One end of a rod-shaped part 56a of each joint member 56 is joined to a joint hole 54a formed in the corresponding anchor stay 54, with the swing shaft 57 therebetween, and thus the joint members 56 are configured to be swingable in the top-bottom direction about an axis x2 of the swing shaft 57. A buckle 55 is joined and fixed to the other end of each rod-shaped part 56a.

With this configuration, as shown in FIG. 11, the rod-shaped parts 56a of the joint members 56 can be orientated to face obliquely upward such that the buckles 55 are located forward of the backrest sections 17B above the seat surface of the seat part 17A, at a central position of the rear seat 17 in the in-use state in the left-right direction. Consequently, the belt anchors 53 are brought into a standing and joining position (the solid line shown in FIG. 11) in which the buckles 55 are located forward of and higher than the anchor stays 54.

Also, as shown in FIG. 11, the belt anchors 53 are configured to be able to be brought into a position in which the buckles 55 and the rod-shaped parts 56a of the joint members 56 are embedded into a recessed part 27 formed in a portion of an inspection cover 26, when the rear seat 17 is in the retracted state. Consequently, the buckles 55 can be operated to swing further downward compared to when belt anchors 53 are in the standing and joining position, and the belt anchors 53 can be brought into a laid and retracted position (the two-dot chain line shown in FIG. 11) in which the belt anchors 53 are stored within the recessed part 27.

When the belt anchors 53 are in the laid and retracted position, the rear seat 17 has been brought into the retracted state, and the extension portion of the load carrying platform 8 in the extended state is mounted on the upper side of the recessed part 27 in which the belt anchors 53 in the laid and retracted position are present. When the rear seat 17 is brought into the in-use state from the retracted state, first, the load carrying platform 8 is brought into the shortened state, the belt anchors 53 are brought into the standing and joining position, and then the rear seat 17 is operated to be brought into the in-use state.

Although not described in detail, the front seats 16 are also provided with seat belt devices. The seat belt devices for the front seats 16 are also fixed to a member on the vehicle body frame 1 side.

Separator

Figure 7:
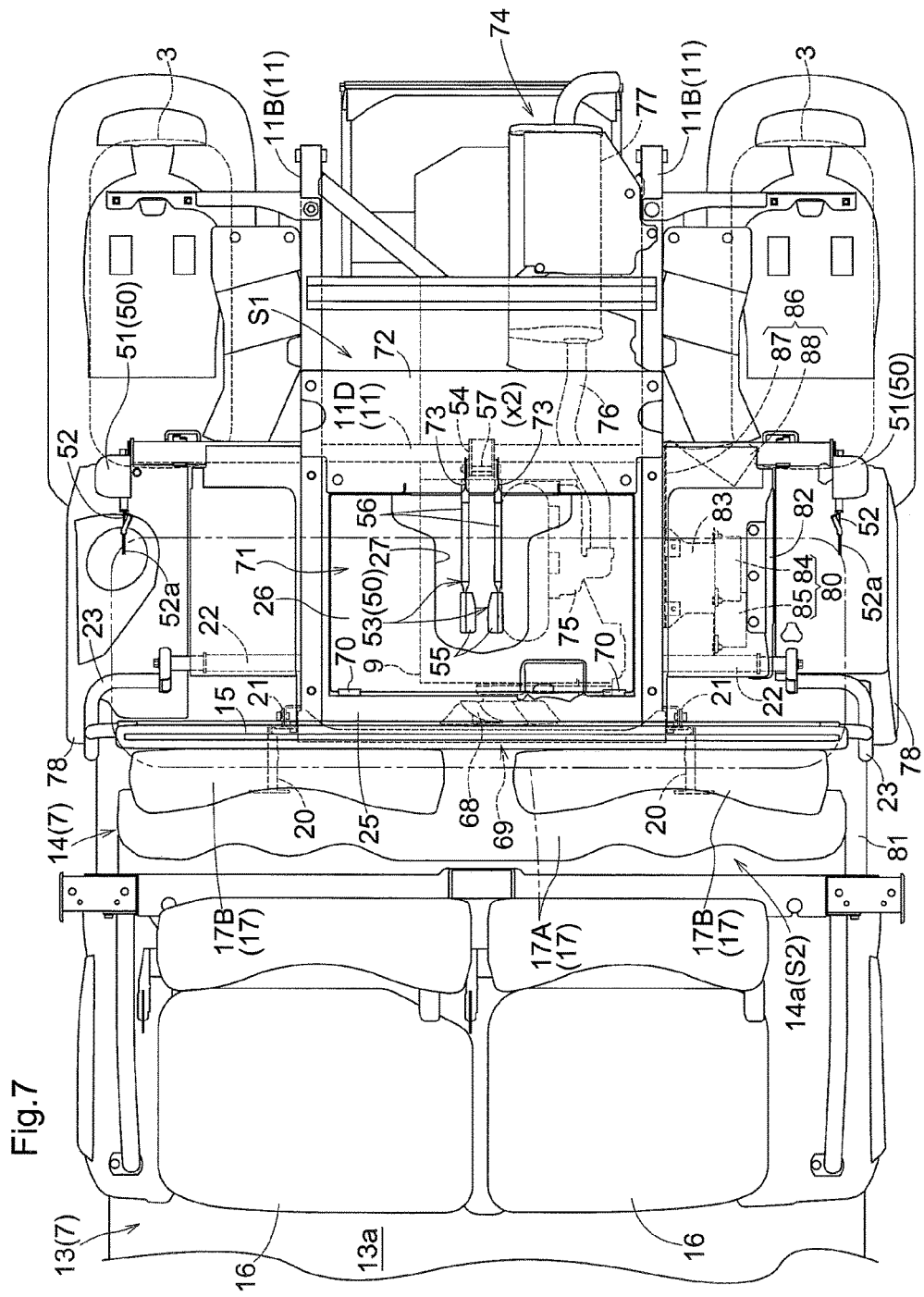
FIG. 7 is a plan view showing a rear part of a travelling vehicle body according to the first embodiment when the rear seat is in the retracted state.
Figure 10:
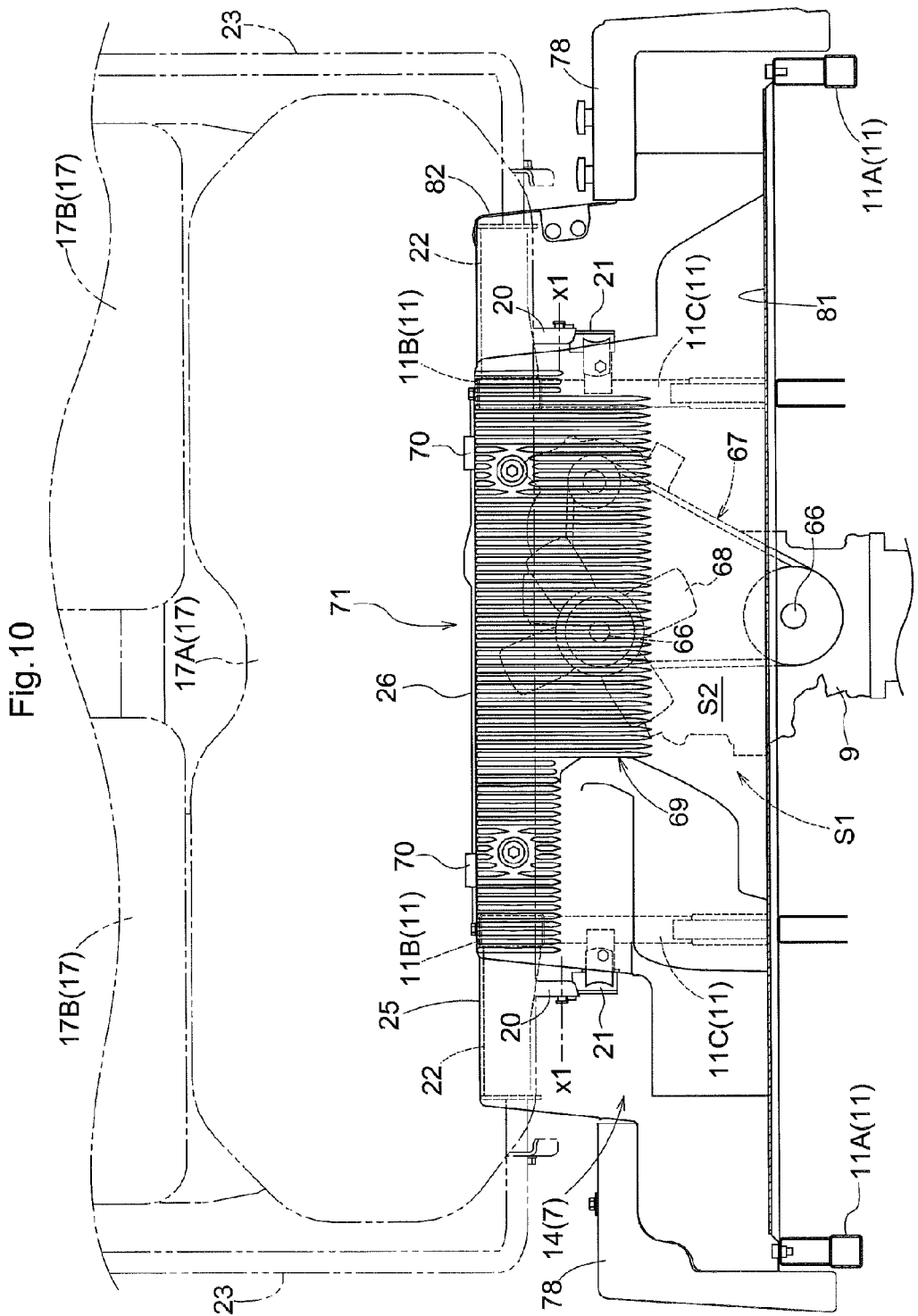
FIG. 10 is a front view showing an area around a foot space of the rear seat according to the first embodiment.

As shown in FIGS. 7 and 10, a separator 25, which is a covering member for thermal insulation, is provided to span the range between the left and right rising frame parts 11C and the rear frame parts 11B of the left and right main frames 11, and to cover an engine room S1 in which the engine 9 is provided.

Figure 13:
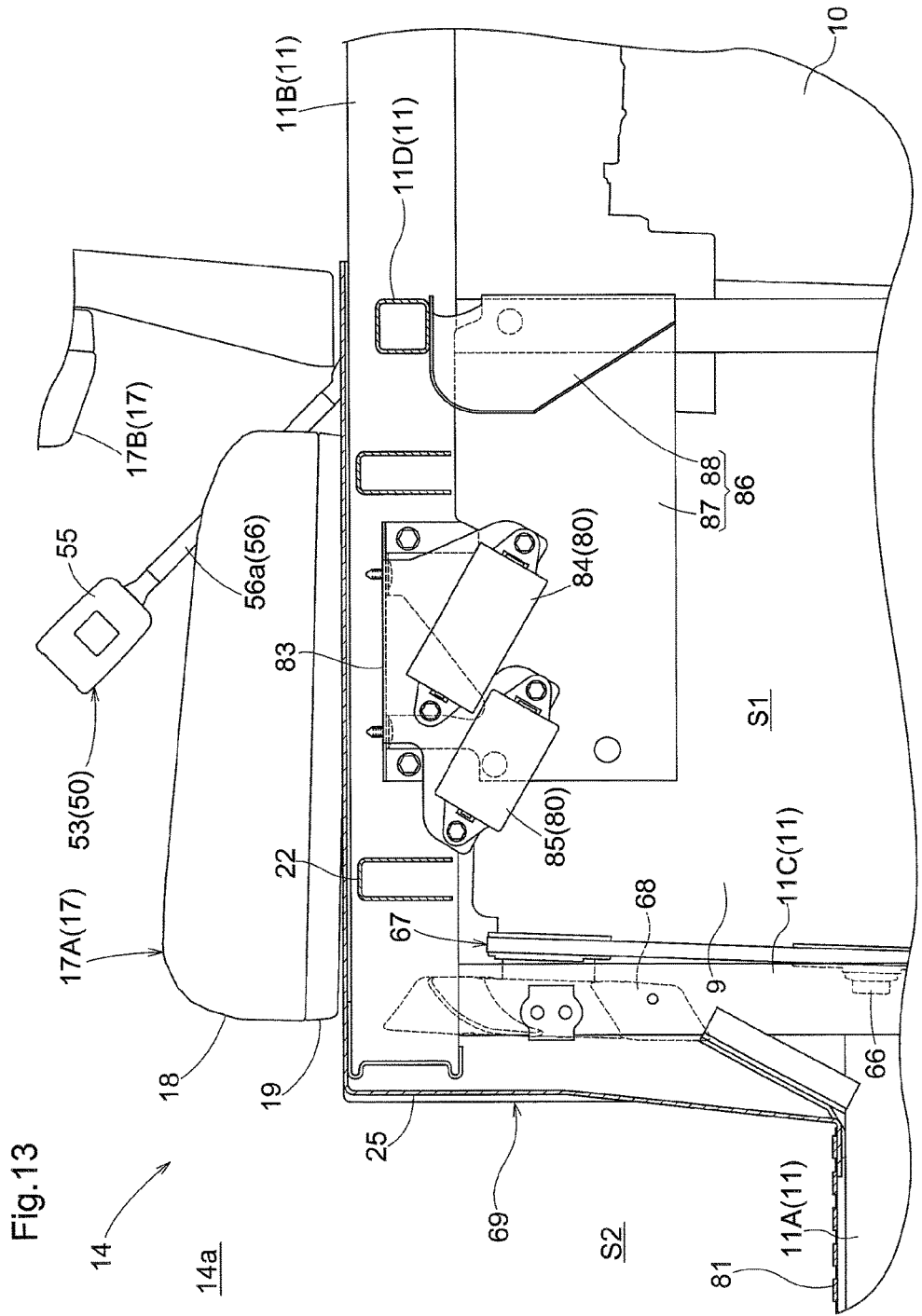
FIG. 13 is a side view showing an area around the electrical components according to the first embodiment.
Figure 14:
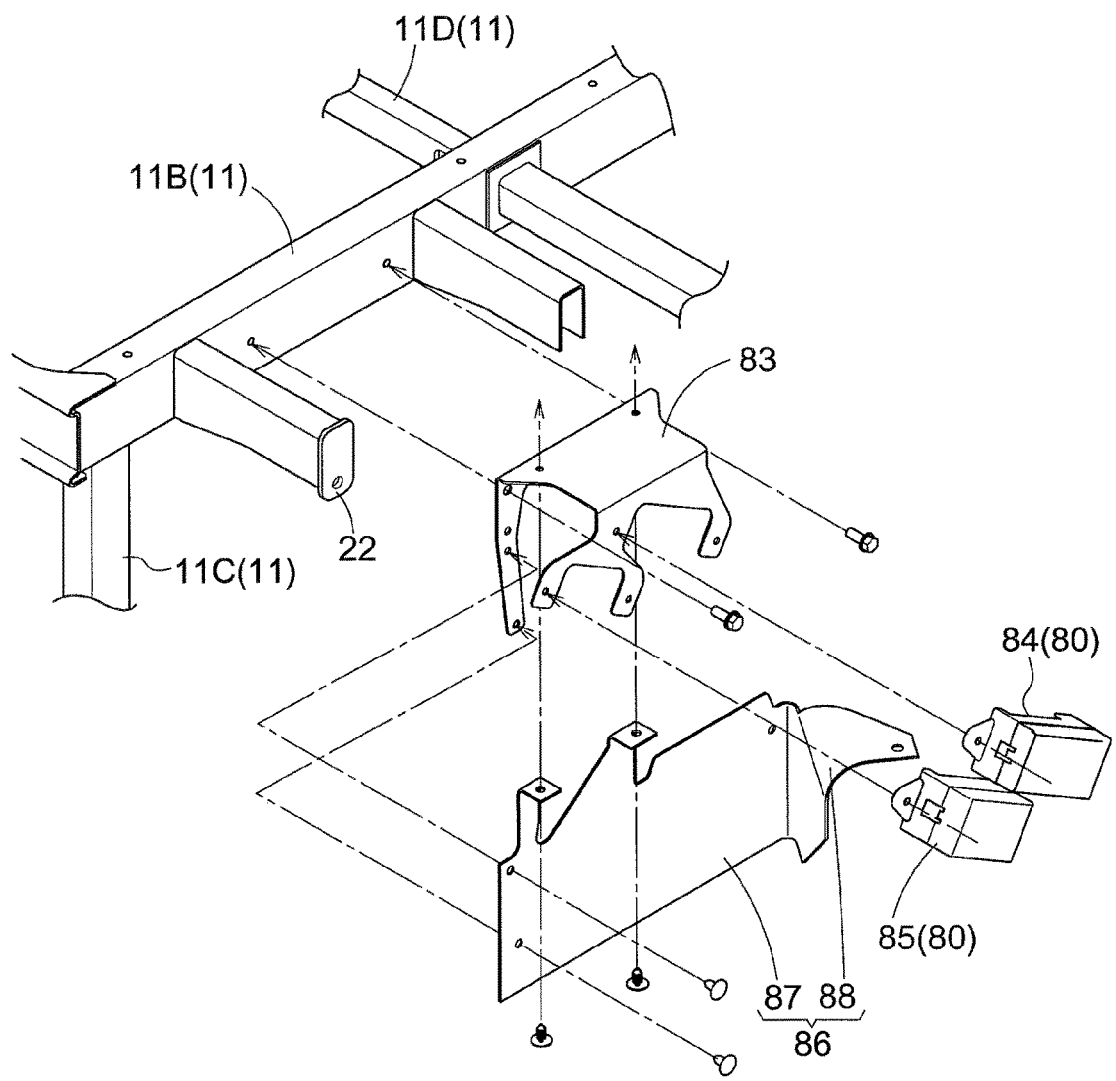
FIG. 14 is an exploded perspective view showing how the electrical components according to the first embodiment are attached.

As shown in FIG. 13 and so on, the separator 25 is provided below the rear seat 17 and above the engine 9. As shown in FIGS. 8, 10, 13 and so on, the separator 25 is provided to be continuous with, and to stand on, a rear end portion of a rear step part 81, on which an occupant seated on the rear seat 17 puts his/her foot. The separator 25 is located below the rear seat 17 in the boarding section 7, and is configured to separate a foot space S2 for an occupant, which is formed forward of the engine 9, and the engine room S1, within which the engine 9 and so on are located, from each other. In other words, the separator 25 is provided between the engine 9 and the foot space S2 of the rear seat 17. The separator 25 is configured to be entirely detachable from the main frames 11. A wide area around the engine 9 is exposed by removing the separator 25.

As shown in FIGS. 7 and 11 to 13, a cooling fan 68 is provided on a front end portion side of the engine 9. The cooling fan 68 is driven by power from the engine 9. The cooling fan 68 is located between the engine 9 and the separator 25. Power from an output shaft 66 of the engine 9 is transmitted to the cooling fan 68 via a belt power transmission mechanism 67. A front lower side of the engine 9 is open downward, and the cooling fan 68 takes air from the outside via the front lower side of the engine 9, and generates wind that flows toward the rear side of the engine 9. In other words, the cooling fan 68 is configured to generate wind that flows from the front side to the rear side.

Radiator Part

As shown in FIGS. 8 to 10, 13 and so on, a radiator part 69 that is configured to radiate heat is formed on the separator 25. In other words, the radiator part 69 of the separator 25 is provided between the foot space S2 of the rear seat 17 and the engine 9. The radiator part 69 is configured with a plurality of protruding members that form a surface of the separator 25 on the foot space S2 side. Specifically, the protruding members are each an elongated rib extending in the vertical direction, and the radiator part 69 is configured by arranging these elongated ribs side by side. In other words, the radiator part 69 is configured to be ribbed. The radiator part 69 is located forward of the front end portion of the seat part 17A of the rear seat 17. The radiator part 69 is formed on the front surface side of the separator 25. As shown in FIG. 10, the range of the radiator part 69 of the separator 25 in the lateral direction of the vehicle body overlaps the range of the seat part 17A of the rear seat 17 in the lateral direction of the vehicle body. As can be understood based on FIGS. 7, 13 and so on, wind generated by the cooling fan 68 strikes the back surface of the radiator part 69.

Inspection Hole and Inspection Cover

As shown in FIGS. 7 to 10 and so on, a portion of the separator 25 corresponding to a section between the left and right rear frame parts 11B is provided with an inspection hole 71 that is open in the top-bottom direction, and is provided with the inspection cover 26 that is switchable between a closing state, in which the inspection cover 26 closes the inspection hole 71, and an opening state, in which the inspection cover 26 opens the inspection hole 71. The inspection cover 26 constitutes a lid cover part that can open or close a portion of the separator 25. The separator 25 including the inspection cover 26 functions as a bonnet that covers an area around the engine 9 (the front side, both lateral sides, and the upper side of the engine 9). The inspection cover 26 is configured to be detachable from the inspection hole 71. The left-right width of the inspection cover 26 is greater than the left-right width of the engine 9. The inspection cover 26 is provided with grips 70 for attaching and detaching the inspection cover 26. The grips 70 are plate-shaped and are configured with a protruding piece that protrudes upward from the upper surface of the inspection cover 26.

As shown in FIG. 1, when the rear seat 17 is in the in-use state and the load carrying platform 8 is in the shortened state, the rear seat 17 is located immediately above the engine 9. As shown in FIG. 2, when the rear seat 17 is in the retracted state and the load carrying platform 8 is in the extended state, the load carrying platform 8 is located above the engine 9. Therefore, the inspection cover 26 that closes the inspection hole 71 is usually hidden below the rear seat 17 or the load carrying platform 8.

In contrast, as shown in FIG. 3, when the rear seat 17 is in the retracted state and the load carrying platform 8 is in the shortened state, the inspection cover 26 in the closing state, in which the inspection cover 26 closes a space immediately above the engine 9, i.e. the inspection cover 26 closes the inspection hole 71, is exposed. In other words, when the seat part 17A of the rear seat 17 or a front portion of the load carrying platform 8 is not present above the inspection cover 26, it is possible to easily inspect or repair the engine 9, the travelling transmission 10 and so on housed within the engine room S1 by operating the grips 70 to remove the inspection cover 26 and open the inspection hole 71 that is provided immediately above the engine 9, as shown in FIGS. 8 and 9.

As shown in FIGS. 7 to 9, 11 and so on, the inspection cover 26 is provided with the recessed part 27 that is able to house the belt anchors 53 of the seat belt devices 50 when the rear seat 17 is in the retracted state. More specifically, the recessed part 27 formed in a portion of the inspection cover 26 of the separator 25 is able to house the belt anchors 53 of the seat belt devices 50 when the belt anchors 53 are in the laid and retracted position.

The separator 25 that has the inspection cover 26 is fixed to the left and right rising frame parts 11C and the left and right rear frame parts 11B so as to be located at a position lower than the seat attachment frame 19 that supports the seat part 17A of the rear seat 17. The metal fitting 20 for rotatably supporting the rear seat 17, and the attachment parts 22 of the left and right link members 23, penetrate the separator 25 and are attached to the left and right main frames 11, so as to be located outside the separator 25.

Rear Part Cover

As shown in FIGS. 7 to 9, 11 and so on, the rear part cover 72 is provided rearward of the inspection cover 26. The inspection cover 26 and the rear part cover 72 constitute a portion of the separator 25. The rear part cover 72 is a part that is located rearward of the inspection cover 26 of the separator 25. The recessed part 27 formed on the upper surface of the separator 25 spans the inspection cover 26 and the rear part cover 72. The swing shaft 57 is located below the rear part cover 72. The belt anchors 53 in the laid and retracted position are located within the recessed part 27 so as to penetrate the rear part cover 72. Specifically, the rod-shaped parts 56a of the joint members 56 of the belt anchors 53 are configured to be inserted into slits 73 that are formed in the rear part cover 72.

The inspection cover 26 covers an area above a rear part of the engine 9. A rear end portion of the inspection cover 26 overlaps a front end portion of the rear part cover 72. The rear part cover 72 is configured with a flexible member, and is made of rubber, for example. The rear part cover 72 is located above an area near the engine 9, the travelling transmission 10, and an exhaust pipe 76 of an exhaust 74. The rear part cover 72 prevents water from entering the engine room S1 from above when the load carrying platform 8 is in the shortened state or the load carrying platform 8 is in the dumping state.

Electrical Components

As shown in FIGS. 7 and 12 to 14, a battery (not shown in the drawings) and electrical components 80 are located in the vicinity of the engine 9. The battery is housed inside rear part side covers 78. A ventilation net is formed in each of the rear part side covers 78 so that air can flow to and from the outside. A relay box 85 and a fuse box 84 are provided as the electrical components 80. The relay box 85 and the fuse box 84 are arranged adjacent to each other in the front-rear direction. The electrical components 80 are attached to the rear frame parts 11B with an attachment bracket 83 made of metal (an example of a bracket) therebetween.

The attachment bracket 83 is formed to have a U-shape that opens downward in front view. The attachment bracket 83 is attached to the rear frame parts 11B, and extends away from the engine 9. The electrical components 80 are attached to an end portion of the attachment bracket 83 located in the direction away from the engine 9. More specifically, an inner vertical part of the attachment bracket 83 is attached to a rear frame part 11B, a horizontal extension part extends outward from an upper end portion of the inner vertical part, and an outer vertical part to which the electrical components 80 are attached extends downward from an outer end portion of the horizontal extension part.

A harness 89 is routed in a space formed by the attachment bracket 83. The harness 89 is connected to the relay box 85, the fuse box 84, the engine 9 and so on. An outer cover 82 that protects the outside of the electrical components 80 in the lateral direction of the vehicle body is attached to the outer right side of the electrical components 80 in the lateral direction of the vehicle body. The outer cover 82 is flexible, and is made of rubber, for example.

Also, as shown in FIG. 7, the exhaust 74 for discharging gas from the engine 9 is connected to the engine 9. The exhaust 74 is provided with: an exhaust manifold 75 that is provided on the left side of the engine 9; the exhaust pipe 76 that extends in the front-rear direction; and a muffler 77 that extends in the front-rear direction. Due to exhaust gas from the engine 9 generated as a consequence of the engine 9 being driven, the exhaust manifold 75, the exhaust pipe 76, and the muffler 77 have a high temperature.

As shown in FIG. 7, the fuse box 84 and the relay box 85, which are the electrical components 80, are located below the seat part 17A of the rear seat 17, on the left side of the engine 9, the exhaust manifold 75, and the exhaust pipe 76, which have a high temperature. An isolation part 87 of an isolation cover 86 is located between: the fuse box 84 and the relay box 85, which are the electrical components 80; and the engine 9, the exhaust manifold 75, and the exhaust pipe 76. In other words, the isolation part 87 of the isolation cover 86 isolates: the engine 9 and the exhaust manifold 75; and the electrical components 80, from each other. Consequently, radiant heat from the engine 9 and the exhaust manifold 75 is unlikely to reach the electrical components 80.

As shown in FIG. 13 and so on, the isolation cover 86, which is flexible and is made of rubber for example, is located between the engine 9 and the electrical components 80. Since the isolation cover 86 is flexible, it is easy to perform replacement work or the like if deterioration or the like occurs. The isolation cover 86 is supported by a rear frame part 11B with the attachment bracket 83 therebetween. The isolation cover 86 includes: the isolation part 87 that isolates the engine 9 and the electrical components 80 from each other, and a rear wind guide part 88 that is provided to be continuous with a rear end portion of the isolation part 87. The rear wind guide part 88 extends from a rear end portion of the isolation part 87 in a direction away from the engine 9.

Spaces on the outer lateral surface side, the inner lateral surface side, the upper surface side, and the rear surface side of the electrical components 80 are covered by the outer cover 82 and the isolation cover 86. In other words, a housing box that houses the electrical components 80 is formed with the outer cover 82, the isolation cover 86, and the separator 25.

Figure 12:
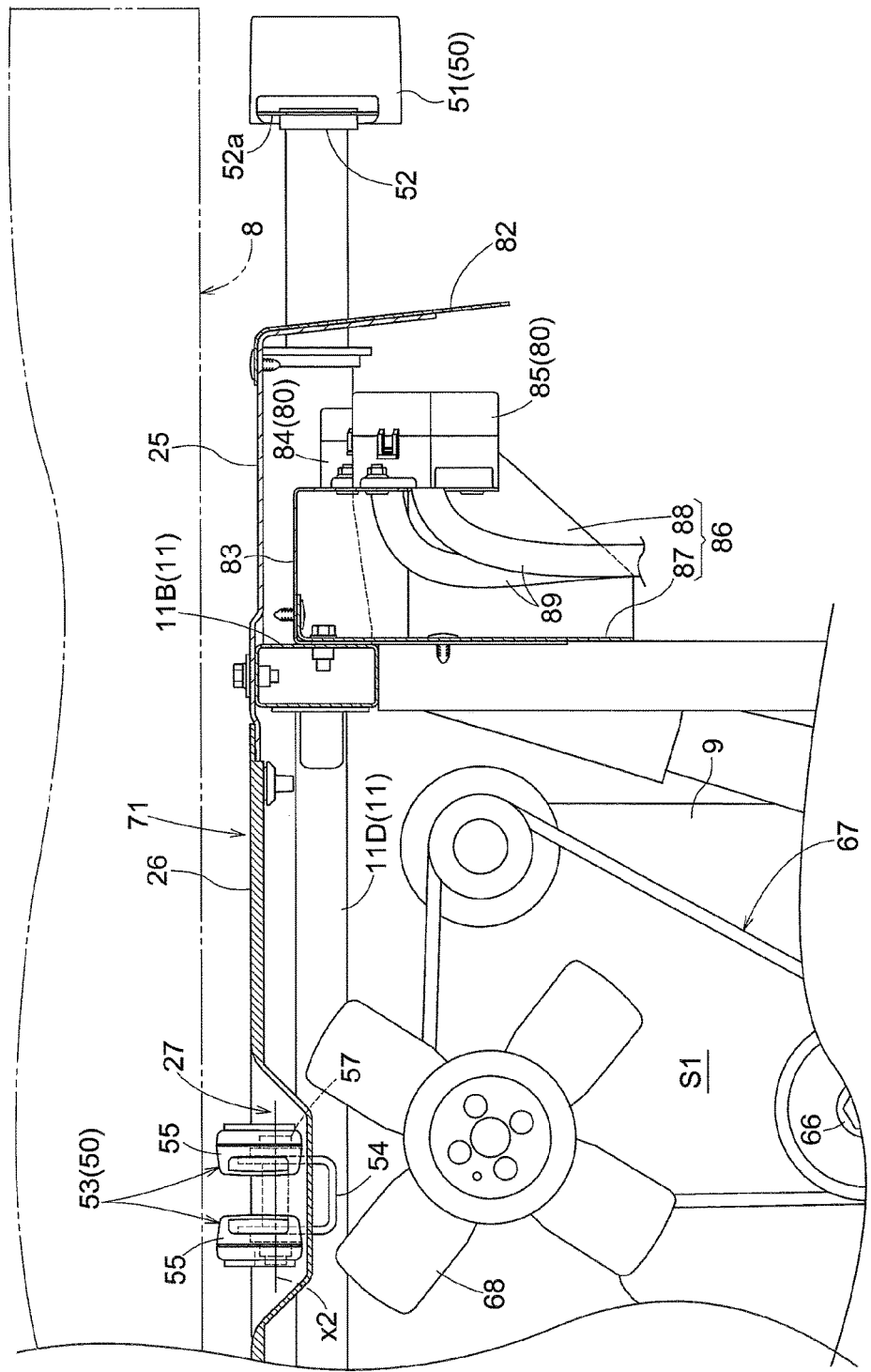
FIG. 12 is a cross-sectional front view showing an area around an engine and electrical components according to the first embodiment.

As shown in FIG. 12 and so on, a front end portion of the isolation part 87 is located rearward of the cooling fan 68. Also, a front end portion of the electrical components 80, that is, a front end portion of the relay box 85, is located rearward of the front end portion of the isolation part 87 of the isolation cover 86. Consequently, wind generated by the cooling fan 68 is divided into a component that flows along a side part of the engine 9 and a component that diverges due to the presence of the isolation part 87 and flows toward the electrical components 80. The wind generated by the cooling fan 68 is guided toward the electrical components 80 by the isolation cover 86, and the electrical components 80 are cooled by the wind generated by the cooling fan 68. In other words, the isolation cover 86 has: a thermal insulation function, which is the function of blocking the heat generated by the engine 9; and a guidance function, which is the function of guiding the wind generated by the cooling fan 68 toward the electrical components 80.

As described above, the isolation cover 86 isolates the electrical components 80 and the engine 9 from each other, and the electrical components 80 are cooled by using wind generated by the cooling fan 68. Therefore, despite the electrical components 80 being located in the vicinity of the engine 9, the electrical components 80 can be protected against heat from the engine 9, and it is possible to appropriately prevent the electrical components 80 from deteriorating.

Other Embodiments Related to First Embodiment

The following describes other embodiments according to the present invention. Two or more of the following embodiments may be combined and applied to the embodiment above as long as there is no inconsistency. Note that the scope of the present invention is not limited to these embodiments.

(1) Although a description has been given of an example in which the isolation cover 86 is provided with the rear wind guide part 88 in the embodiment above, it is acceptable that the isolation cover 86 is not provided with the rear wind guide part 88.

(2) Although a description has been given of an example in which the electrical components 80 are located on the left side of the engine 9 in the embodiment above, the present invention is not limited to such a configuration. For example, the electrical components 80 may be located on the front side, the right side, the rear side, the upper side, or the lower side of the engine 9. In any of these cases, the isolation part 87 of the isolation cover 86 is located so as to isolate the electrical components 80 and the engine 9 from each other.

(3) Although a description has been given of an example in which the relay box 85 and the fuse box 84 are arranged adjacent to each other in the front-rear direction in the embodiment above, the present invention is not limited to such a configuration. For example, the relay box 85 and the fuse box 84 may be arranged adjacent to each other in the top-bottom direction or the left-right direction. Also, the relay box 85 and the fuse box 84 may be located at different positions separated from each other.

(4) Although a description has been given of an example in which the relay box 85 and the fuse box 84 are provided as the electrical components 80 in the embodiment above, the present invention is not limited to such a configuration.

For example, another electrical component such as an electronic control device or the like may be provided.

(5) Although a description has been given of an example in which the cooling fan 68 is provided on the front end portion side of the engine 9 in the embodiment above, the present invention is not limited to such a configuration. For example, the cooling fan 68 may be provided on the side portion side or the rear end portion side of the engine 9. Also, it is acceptable that the cooling fan 68 is not provided.

(6) Although a description has been given of an example in which the radiator part 69 of the separator 25 is located forward of the front end portion of the seat part 17A of the rear seat 17 in the embodiment above, the present invention is not limited to such a configuration. For example, the radiator part 69 of the separator 25 may be located at a substantially same position as the front end portion of the seat part 17A of the rear seat 17 in the front-rear direction, or rearward of the front end portion of the seat part 17A of the rear seat 17.

(7) Although a description has been given of an example in which the front seats 16 and the rear seat 17 are provided and the radiator part 69 is formed within the foot space S2 on the rear seat 17 side in the embodiment above, the present invention is not limited to such a configuration. For example, it is acceptable that only the front seats 16 are provided and the rear seat 17 is not provided. If this is the case, it is preferable that the engine 9 is located immediately below the front seats 16, and the radiator part 69 that is configured to radiate heat is formed on the separator member that separates the foot space of the front seats 16 and the engine 9 from each other.

(8) Although the rear seat 17 configured to be switchable to the in-use state and the retracted state has been described as an example in the embodiment above, the present invention is not limited to such a configuration. For example, another rear seat that is detachable from the main frames 11 may be adopted.

(9) Although a description has been given of an example in which the radiator part 69 is configured with a plurality of protruding members that are each configured with an elongated rib extending in the vertical direction in the embodiment above, the present invention is not limited to such a configuration. Another radiator part that is configured with a plurality of protrusions may be adopted.

(10) Although a description has been given of an example in which the rear part cover 72 is provided rearward of the inspection cover 26 in the embodiment above, the present invention is not limited to such a configuration. For example, it is acceptable that the rear part cover 72 is not provided.

(11) Although a description has been given of an example in which the belt anchors 53 penetrate the rear part cover 72 in the embodiment above, the present invention is not limited to such a configuration. For example, it is acceptable that the belt anchors 53 do not penetrate the rear part cover 72.

(12) Although a description has been given of an example in which the recessed part 27 that spans the inspection cover 26 and the rear part cover 72 and houses the belt anchors 53 is formed in the embodiment above, the present invention is not limited to such a configuration. For example, it is acceptable that the recessed part 27 is not formed in the inspection cover 26 and the rear part cover 72.

(13) Although a description has been given of an example in which the inspection cover 26 is configured to be detachably attached to the inspection hole 71 in the embodiment above, the present invention is not limited to such a configuration. For example, another inspection cover may be adopted which is attached to the separator 25 with a hinge therebetween and is configured to be able to switch the inspection hole 71 to an opening state and a closing state by opening and closing about the hinge.

(14) Although a description has been given of an example in which the inspection cover 26 is provided with the plate-shaped grips 70 in the embodiment above, the present invention is not limited to such a configuration. The inspection cover 26 may be provided with grips of another type, which are U-shaped, for example.

(15) The work vehicle according to one aspect of the present invention is applicable to various work vehicles such as tractors, mowing machines, and combines, in addition to the utility vehicle described as an example in the embodiment above.

Second Embodiment

The following describes a second embodiment with reference to FIGS. 15 to 26.

Note that the "front-rear direction" and the "left-right direction" in the present embodiment are as follows unless otherwise specified. That is, "front" indicates the forward travelling direction (see an arrow F in FIG. 17) of a vehicle to which the present invention is applied, the forward travelling direction being a direction in which the driver's seat faces, "rear" indicates the rearward travelling direction (see an arrow B in FIG. 17) of the utility vehicle, "right" indicates the direction corresponding to the right side of the utility vehicle when the utility vehicle faces forward in terms of the above-described front-rear direction (see an arrow R in FIG. 17), and "left" indicates the direction corresponding to the left side of the utility vehicle under the same condition (see an arrow L in FIG. 17).

Overall Configuration

Figure 15:
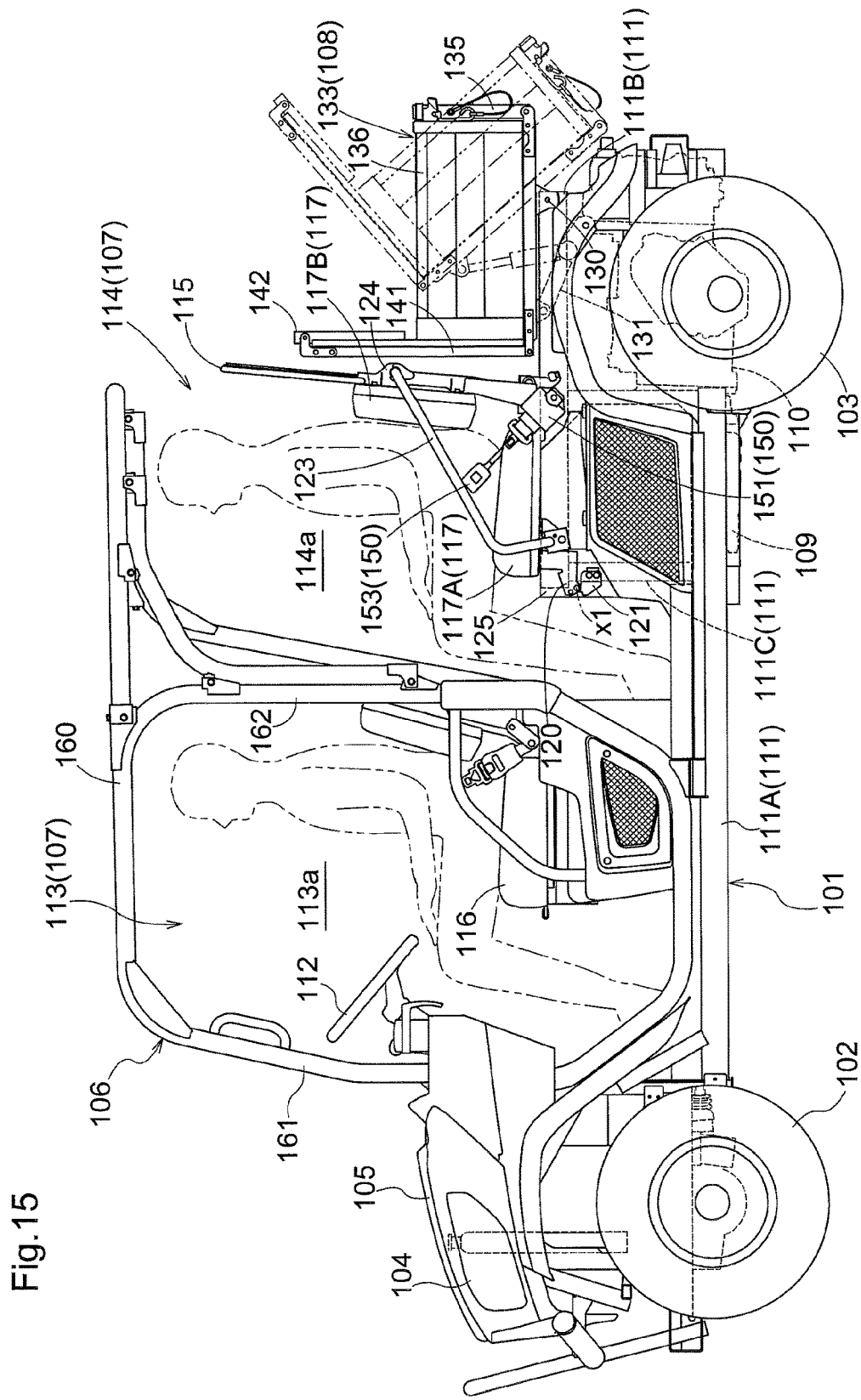
FIG. 15 is an overall side view of a vehicle according to a second embodiment in a two-row seat mode.
Figure 16:
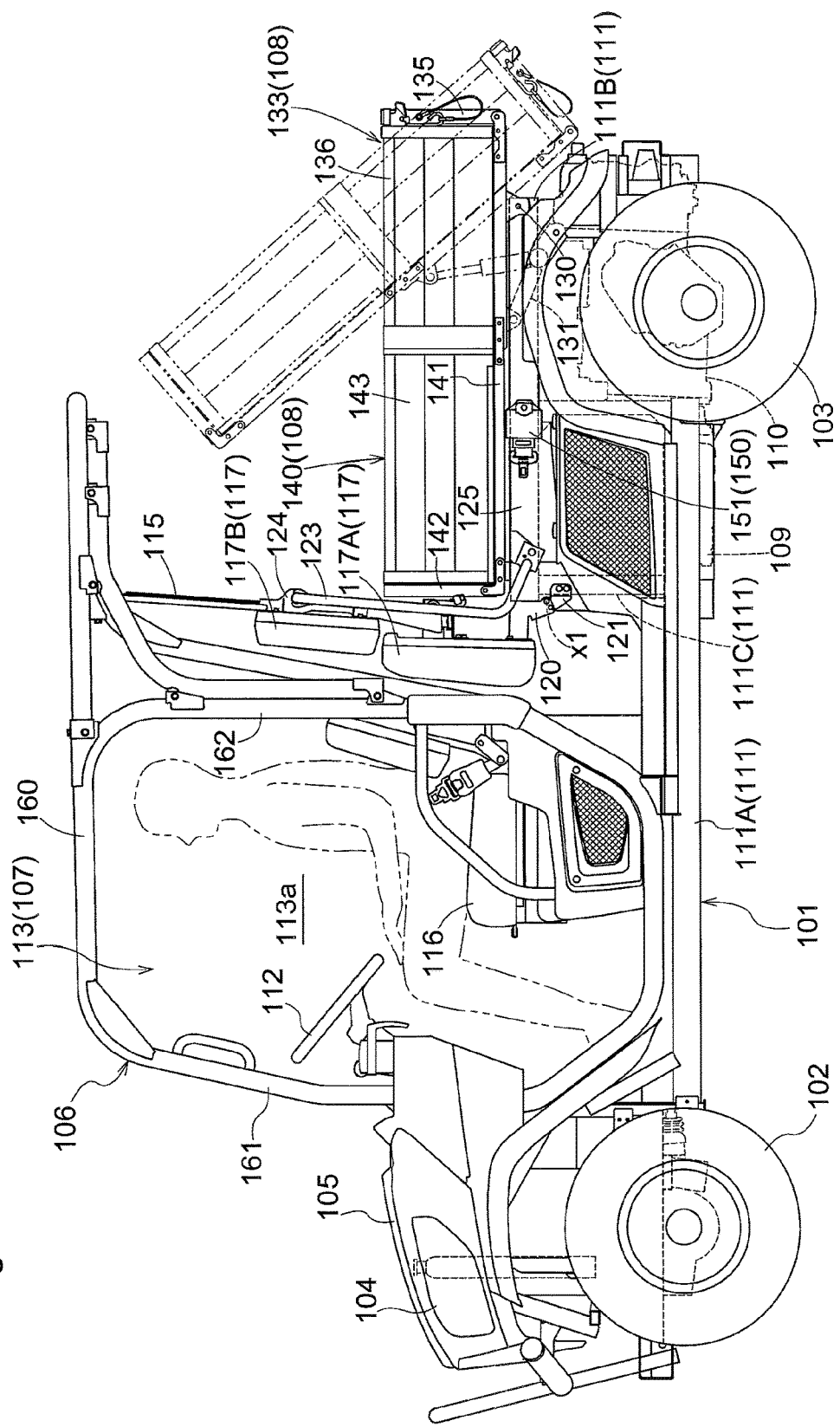
FIG. 16 is an overall side view of the vehicle according to the second embodiment in a one-row seat mode.
Figure 17:
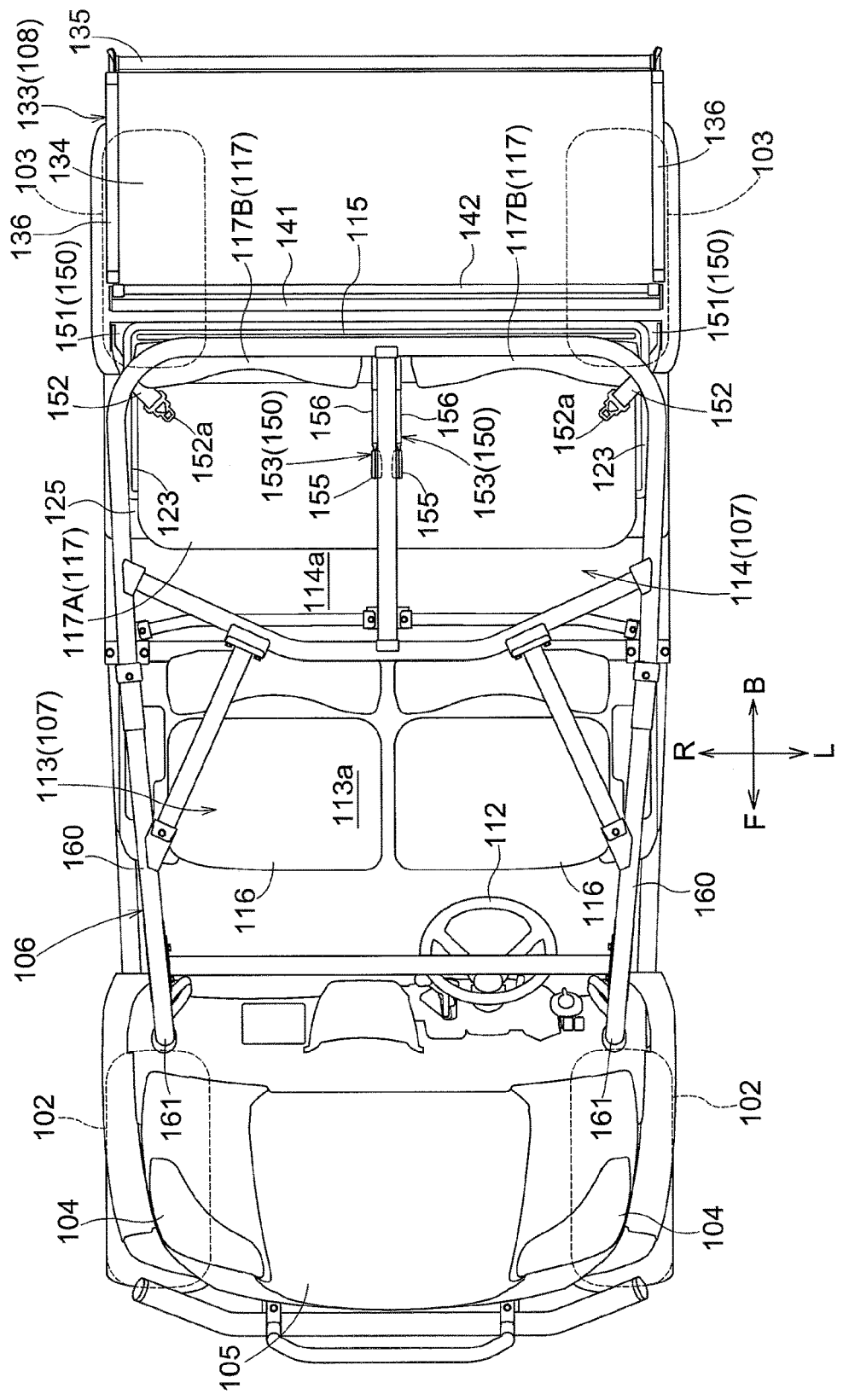
FIG. 17 is an overall plan view of the vehicle according to the second embodiment in the two-row seat mode.

FIGS. 15 to 17 are overall views of a utility vehicle or a work vehicle, which is an example of a vehicle according to one aspect of the present invention. FIG. 15 is an overall side view when the vehicle is in a usage mode in which there are two rows of seats on which occupants can be seated, namely a front row and a rear row, and FIG. 16 is an overall side view when the vehicle is in a usage mode in which there is only one row of seats on which occupants can be seated, which is on the front side. FIG. 17 is an overall plan view when the vehicle is in the usage mode shown in FIG. 15.

As shown in FIGS. 15 to 17, the vehicle is provided with a travelling vehicle body equipped with: left and right front wheels 102 that are steerable and are supported by a front part of a vehicle body frame 101; and left and right rear wheels 103 that are not steerable and are supported by a rear part of the vehicle body frame 101.

A front end portion of the travelling vehicle body is provided with a front cover 105 on which a pair of left and right headlights 104 are provided. A portion of the travelling vehicle body located rearward of the front cover 105 is provided with a boarding section 107 that is provided with a ROPS 106. A load carrying platform 108 that is able to perform a dumping operation is provided in a rear part of the travelling vehicle body.

The boarding section 107 is provided in an intermediate part of the traveling vehicle body in the front-rear direction. The boarding section 107 is configured such that the usage mode of a rear seat 117 is changeable to a two-row seat state that allows an occupant to be seated on front seats 116 and the rear seat 117 (corresponding to the "seat") as shown in FIG. 15 and to a one-row seat state that allows an occupant to be seated on the front seats 116 as shown in FIG. 16. Details of the usage modes are described below.

The load carrying platform 108 that is provided rearward of the boarding section 107 is configured such that the state thereof is changeable to an extended state (corresponding to the "front-side mounting state") and a shortened state (corresponding to the "rear-side mounting state") described below. A separator member 115 that separates the boarding section 107 and the load carrying platform 108 from each other is provided between the boarding section 107 and the load carrying platform 108.

The vehicle body frame 101 of the travelling vehicle body is provided with a pair of left and right main frames 111 that are elongated in the front-rear direction. In the main frames 111, front frame parts 111A that are supported by the front wheels 102 are formed at a lower level, and rear frame parts 111B that are supported by the rear wheels 103 are formed at a higher level. In the main frames 111, rising frame parts 111C are provided at intermediate positions. The rising frame parts 111C connect rear end portions of the front frame parts 111A, which are located at the lower level, and front end portions of the rear frame parts 111B, which are located at the higher level. The main frames 111 are formed to have a stepped shape provided with the front frame parts 111A, the rear frame parts 111B, and the rising frame parts 111C.

Using this stepped shape, an engine 109 is located within a space that is formed below the rear frame parts 111B, rearward of the rising frame parts 111C. Drive force output by the engine 109 is input to a travelling transmission 110, and drive force that has been subjected to transmission shift is transmitted to the front wheels 102 and the rear wheels 103. Thus, a four-wheel drive travelling vehicle body is configured.

The positions of the rising frame parts 111C of the main frames 111 in the front-rear direction are set relative to the front frame parts 111A and the rear frame parts 111B so as to be located near a front end portion of the rear seat 117 in the two-row seat mode and near a front end portion of the load carrying platform 108 in the extended state.

Therefore, as shown in FIG. 15, when the boarding section 107 is in the two-row seat mode, the load carrying platform 108 is in the shortened state, and a seat part 117A (corresponding to the "sitting section") of the rear seat 117 is positioned in the state of being mounted on the rear frame parts 111B that are located at the higher level rearward of the rising frame parts 111C of the main frames 111.

When the boarding section 107 is in the one-row seat mode as shown in FIG. 16, the load carrying platform 108 is in the extended state. The extension portion of the load carrying platform 108 is brought into the state of being mounted on the rear frame parts 111B that are located at the higher level rearward of the rising frame parts 111C of the main frames 111, and the seat part 117A of the rear seat 117 is brought into the state of being folded forward.

Boarding Section

A description is given of the boarding section 107.

The boarding section 107 is provided with the ROPS 106. The ROPS 106 is disposed on a front part of the boarding section 107, and is provided with: a front boarding section 113 (corresponding to the "boarding section for driving") having a front boarding section space 113a; and a rear boarding section 114 having a rear boarding section space 114a.

The ROPS 106 is provided with: upper frames 160 that are located above the front boarding section space 113a and the rear boarding section space 114a and located along the front-rear direction of the vehicle body; a pair of left and right front supporting posts 161 that are located forward of the front boarding section space 113a, respectively on both lateral outer sides of the vehicle body, and that extend in the top-bottom direction; and a pair of left and right rear supporting posts 162 that are located between the front boarding section 113 and the rear boarding section 114, respectively on both lateral outer sides of the vehicle body, and that extend in the top-bottom direction of the vehicle body. The upper frames 160 protrude further rearward than the rear supporting posts 162 at the same level as the rear supporting posts 162.

The front seats 116 are respectively provided on the left and right sides within the front boarding section space 113a of the front boarding section 113, so that two people can be seated in the front boarding section 113.

A steering wheel 112 is provided forward of the front seat 116 in a left area, out of the left and right front seats 116, and the front boarding section 113 is configured as the boarding section for driving. The left and right front seats 116 are configured to be separately slidable in the front-rear direction using guide rails, which are not shown in the drawings.

The rear boarding section 114 is provided with the rear seat 117. The rear seat 117 is configured to be a laterally elongated seat on which two people can be seated, and two people can be seated in the rear boarding section 114. The rear seat 117 is configured such that the state thereof can be switched to the in-use state indicated by the two-dot chain line shown in FIG. 18, and the retracted state indicated by the solid line shown in FIG. 18. Specifically, the rear seat 117 is configured in the following manner.

The rear seat 117 is provided with the laterally elongated seat part 117A (corresponding to the "sitting section") and laterally elongated backrest sections 117B.

The seat part 117A is provided with: a cushion layer 118 that serves as an elastic seat surface; a seat attachment frame 119 that supports the cushion layer 118; and a metal fitting 120 for joining the seat attachment frame 119 to the main frames 111.

The seat attachment frame 119 is configured by combining: a supporting frame 119A that is grid-shaped and supports the cushion layer 118 from below; and a bottom plate 119B that is plate-shaped having holes and supports the supporting frame 119A from further below.

The metal fitting 120 is pivotally joined to a metal supporting fitting 121 that is fixed to the rising frame parts 111C of the main frames 111 so that the metal fitting 120 is swingable in the top-bottom direction about a lateral axis x1 that extends in the left-right direction.

Therefore, the seat attachment frame 119 whose front end portion is joined to the metal fitting 120 rotates about the lateral axis x1, and the position of the seat part 117A of the rear seat 117 is thus switched to the in-use state and the retracted state.

The backrest sections 117B are joined to upper end portions of a pair of left and right link members 123 that are respectively located on the two sides of the rear seat 117 in the lateral direction. The respective lower end portions of the pair of left and right link members 123 are rotatably supported by attachment parts 122 that are integrated with the rear frame parts 111B below the seat part 117A. The respective upper end portions of the pair of left and right link members 123 are relatively rotatably joined to joint members 124 that are provided on the rear side of the backrest sections 117B.

The pair of left and right link members 123 are located so as to be inclined downward in a direction from the rear side to the front side when the backrest sections 117B are in the in-use position, and serve as armrests.

A lower end portion of the separator member 115 is joined to the joint members 124 that are provided on the rear side of the backrest sections 117B. The separator member 115 is provided with: a separator frame that is manufactured by joining a frame body that extends in the lateral direction of the vehicle body and a frame body that extends in the top-bottom direction of the vehicle body; and a netted member that is stretched over the separator frame.

Figure 20:
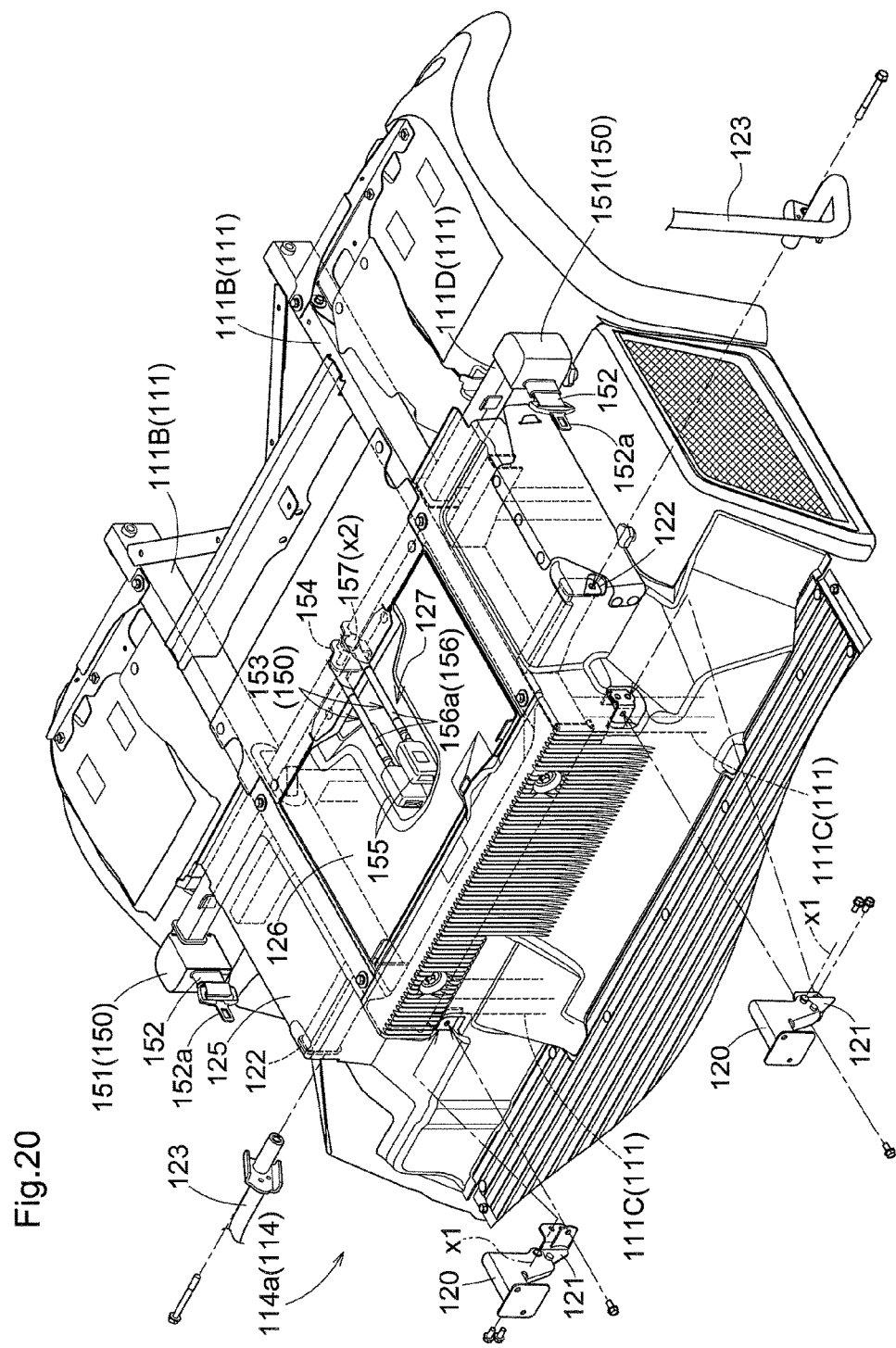
FIG. 20 is a perspective view showing a rear part of a vehicle body according to the second embodiment in a state where a load carrying platform and the rear seat have been removed.
Figure 21:
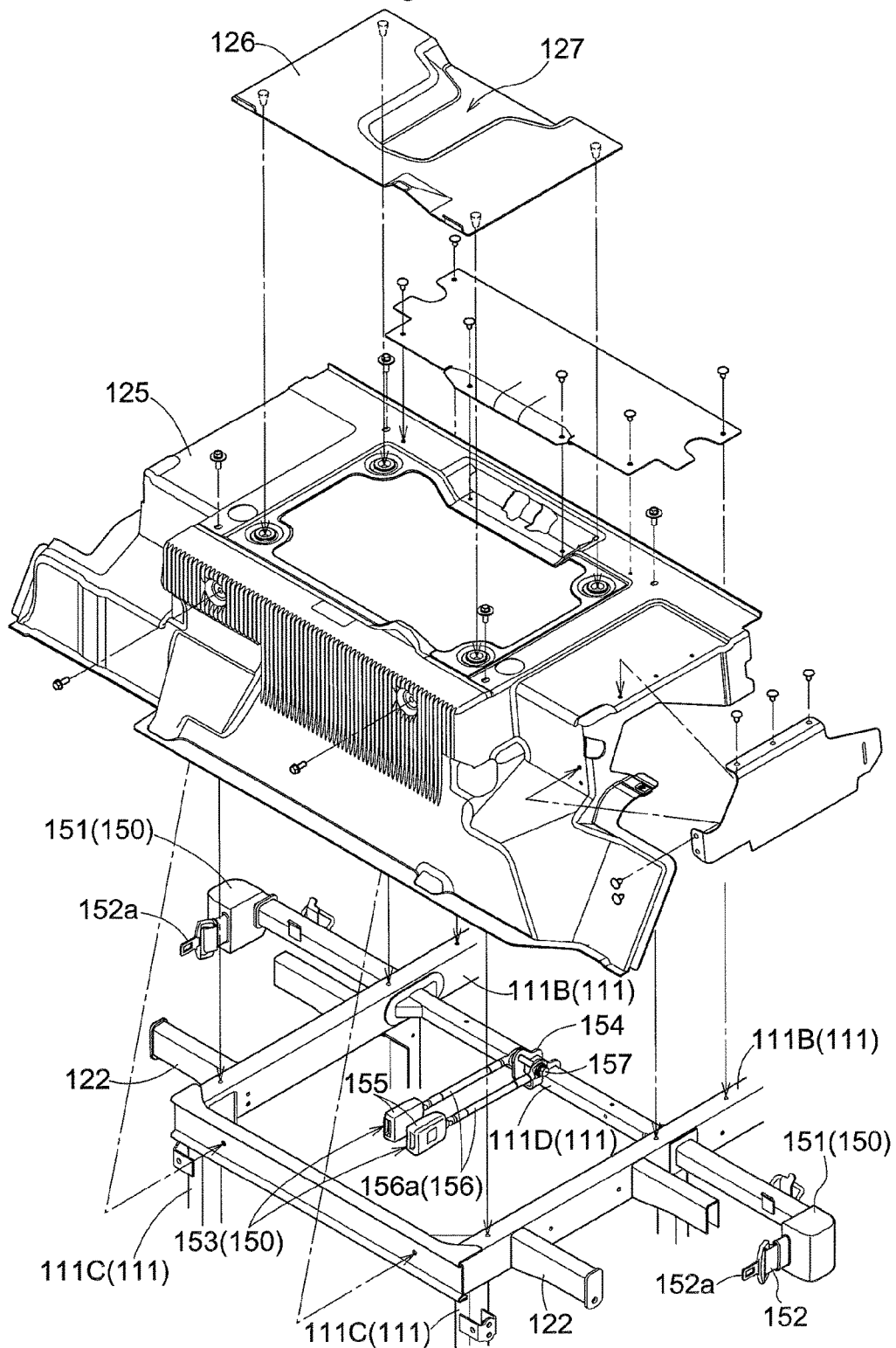
FIG. 21 is an exploded perspective view showing an attachment state of a vehicle body frame and a covering member according to the second embodiment.
Figure 22:
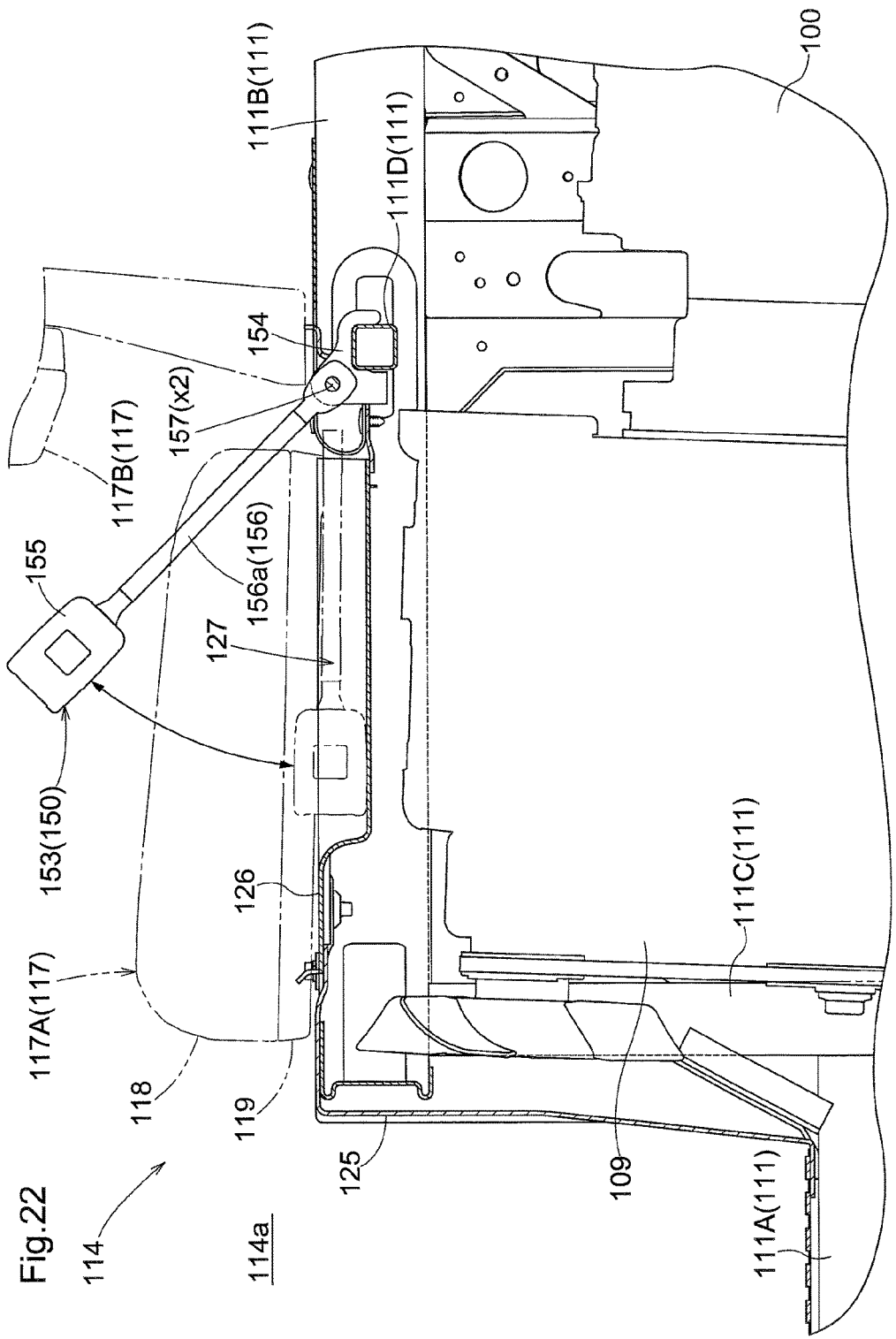
FIG. 22 is a vertical cross-sectional view along a front-rear direction showing a position at which a belt end portion fixture according to the second embodiment is attached.
Figure 23:
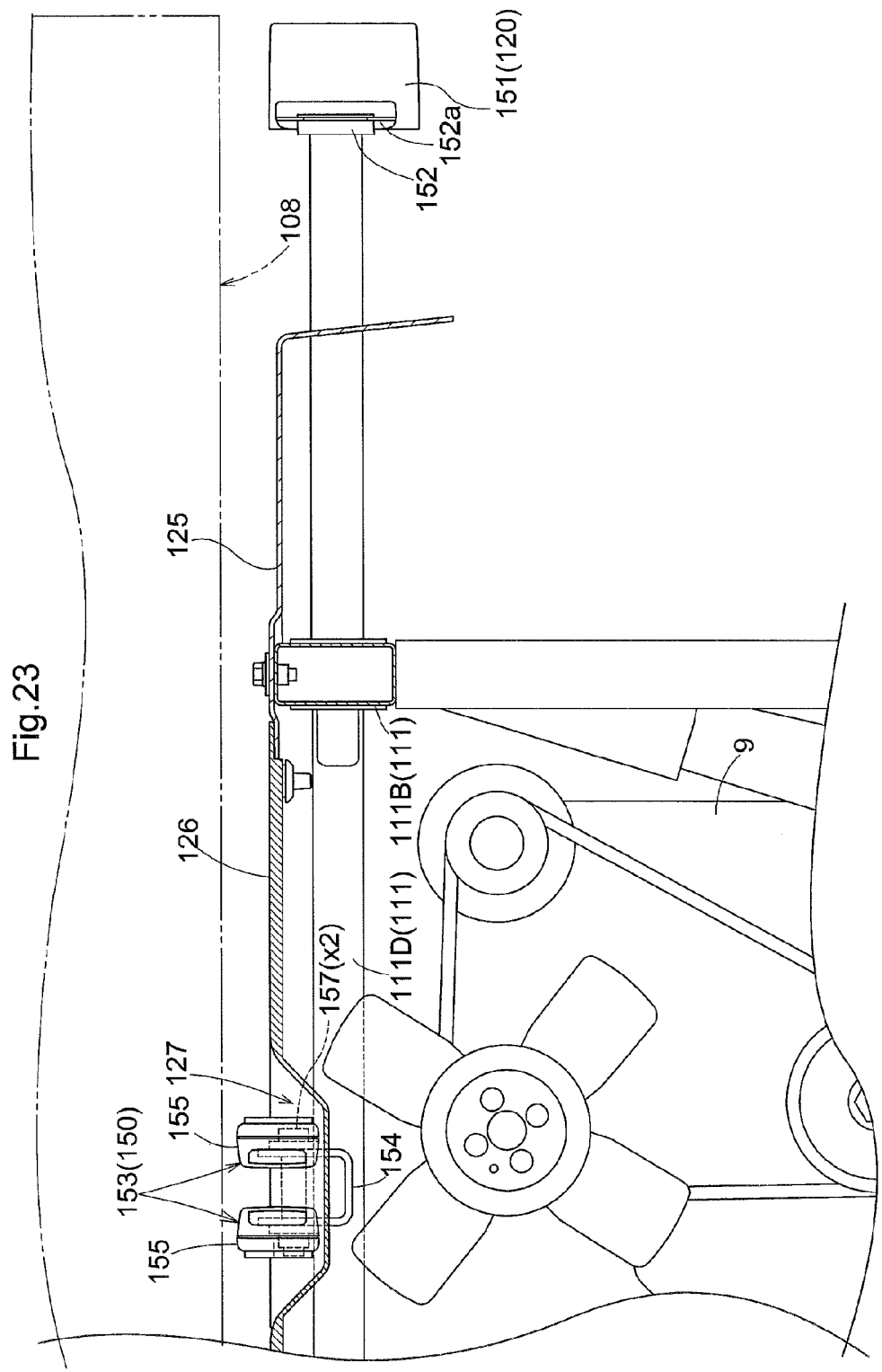
FIG. 23 is a vertical cross-sectional view along the left-right direction showing positions at which the belt end portion fixture and a retractor according to the second embodiment are attached.
Figure 24:
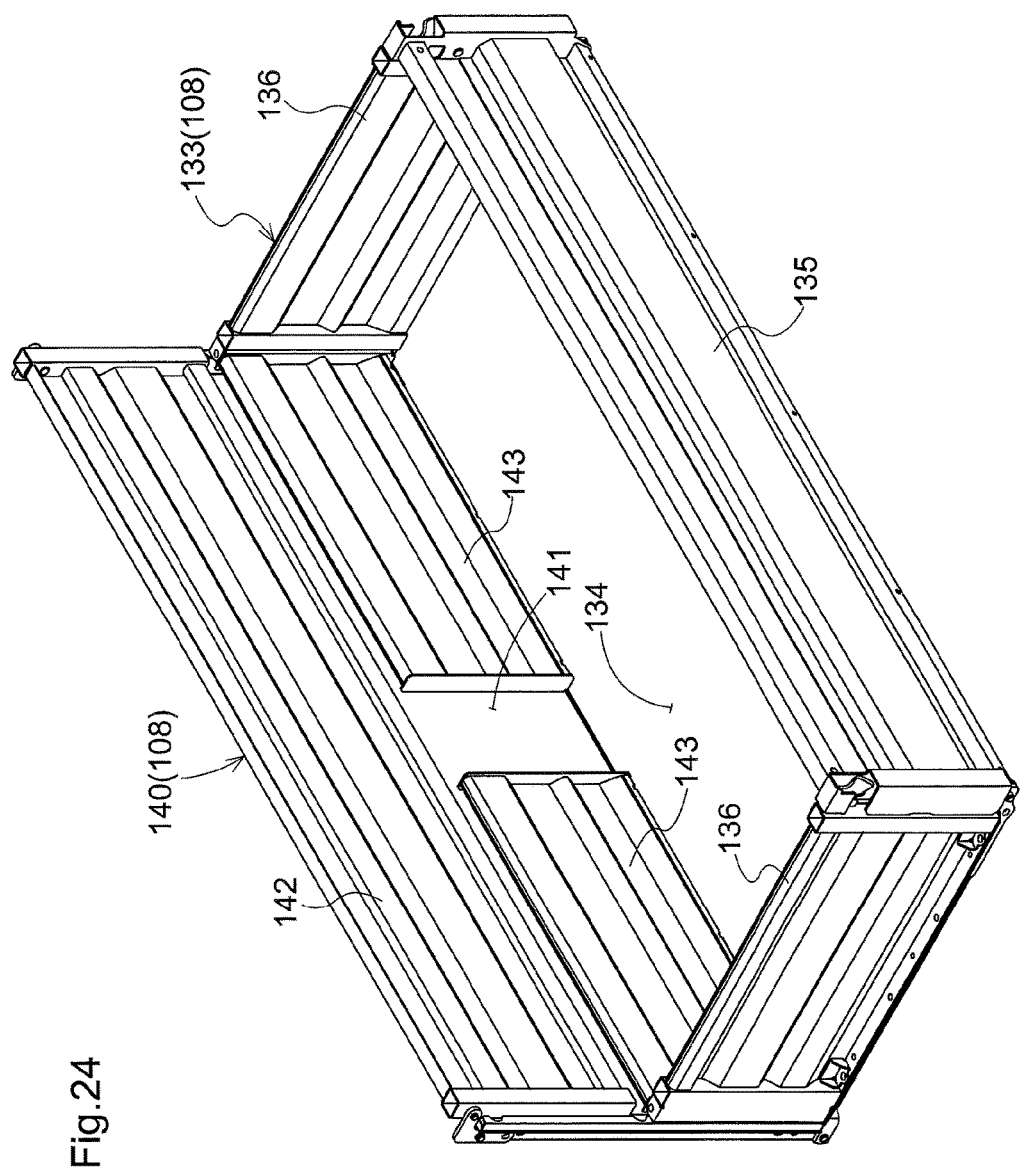
FIG. 24 is a perspective view showing the load carrying platform according to the second embodiment in the two-row seat mode.

As shown in FIGS. 20 to 22, a covering member 125 for thermal insulation is provided to span the range between the left and right rising frame parts 111C and the rear frame parts 111B of the left and right main frames 111, and to cover an engine space in which the engine 109 is provided.

A portion of the covering member 125 corresponding to a section between the left and right rear frame parts 111B is provided with a lid cover part 126 that can open or close a portion of the covering member 125 such that an inspection hole is formed. Therefore, when the seat part 117A of the rear seat 117 or the front part of the load carrying platform 108 is not present, it is possible to inspect or perform repair in the space in which the engine 109 is present, by removing the lid cover part 126 and opening the inspection hole.

Thus, the covering member 125 including the lid cover part 126 functions as an engine bonnet.

A recessed part 127 is formed in a portion of the above-described lid cover part 126. The recessed part 127 is able to house belt end portion fixtures 153 of seat belt devices 150 described below when the belt end portion fixtures 153 are in the retracted position.

The covering member 125 that is provided with the lid cover part 126 is fixed to the left and right rising frame parts 111C and the left and right rear frame parts 111B so as to be located at a position lower than the seat attachment frame 119 that supports the seat part 117A of the rear seat 117. The metal fitting 120 for rotatably supporting the rear seat 117, and the attachment parts 122 of the link members 123, penetrate the covering member 125 and are attached to the left and right main frames 111, so as to be located outside the covering member 125.

Seat Belt Devices

FIGS. 18 and 20 to 23 show seat belt devices 150.

The seat belt devices 150 are provided with: retractors 151 that are respectively located on the left and right sides of the rear seat 117; seat belts 152 that are in the state of respectively being wound around the retractors 151; and the pair of belt end portion fixtures 153 that are located in a central area of the rear seat 117 in the left-right direction and that are able to separately fix end portions of the seat belts 152 that are respectively drawn out from the left and right retractors 151.

The retractors 151 and the belt end portion fixtures 153 are each fixed to the vehicle body frame 101 in the following manner.

As shown in FIGS. 20 and 21, a lateral frame 111D is fixed to an area between the rear end portion of the rear seat 117 in the in-use position and the front end portion of the load carrying platform 108 in the shortened state in the front-rear direction, along the left and right rear frame parts 111B located below the area.

The lateral frame 111D penetrates through the left and right rear frame parts 111B and extends to the outside of the rear frame parts 111B in both lateral directions. The retractors 151 are respectively fixed and joined to the left and right end portions of the lateral frame 111D. Each retractor 151 is orientated such that the belt inlet/outlet direction thereof faces forward and obliquely upward so that the seat belts 152 can be drawn out in an obliquely forward direction.

The belt end portion fixtures 153 are provided with: a pair of seat belt anchors 154 fixed to the lateral frame 111D; and a pair of buckles 155 that are engageable with end portions of the left and right seat belts 152. The seat belt anchors 154 and the buckles 155 are joined to each other by joint members 156, and the belt end portion fixtures 153 are configured with the seat belt anchors 154, the buckles 155, and the joint members 156.

The seat belt anchors 154 are configured with bracket members that are welded and fixed to a central portion of the lateral frame 111D in the left-right direction. The buckles 155 have a well-known configuration and are able to fix and release end portion metal fitting 152a of the seat belts 152 inserted therein.

One end of a rod-shaped part 156a of each joint member 156 is joined to a joint hole 154a formed in the corresponding seat belt anchor 154, with a joint bolt 157 therebetween, and thus the joint members 156 are configured to be swingable in the top-bottom direction about an axis $x2$ of the joint bolt 157. A buckle 155 is joined and fixed to the other end of each rod-shaped part 156a.

Figure 18:
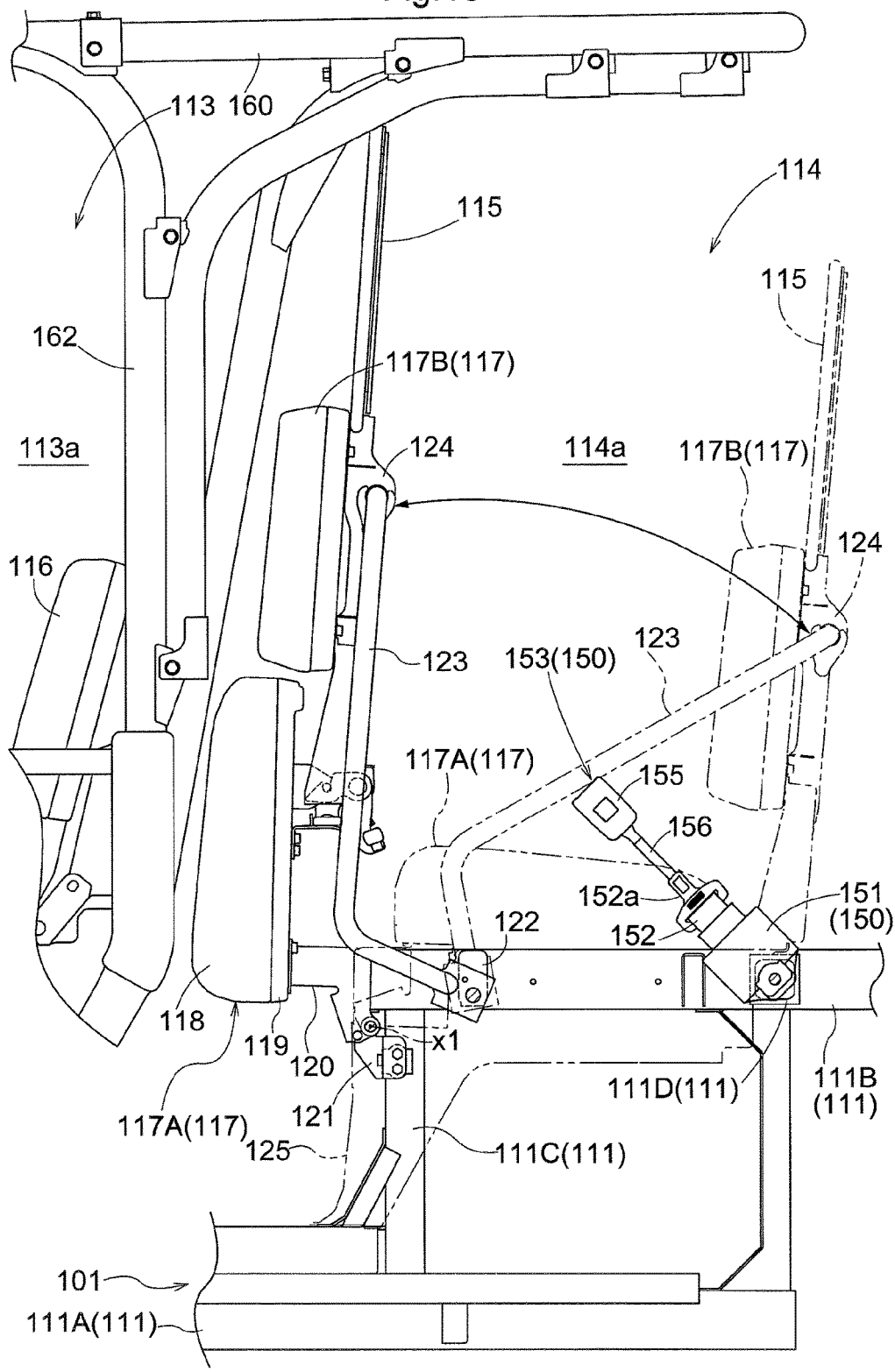
FIG. 18 is a side view showing the changing of a position of a rear seat according to the second embodiment.
Figure 19:
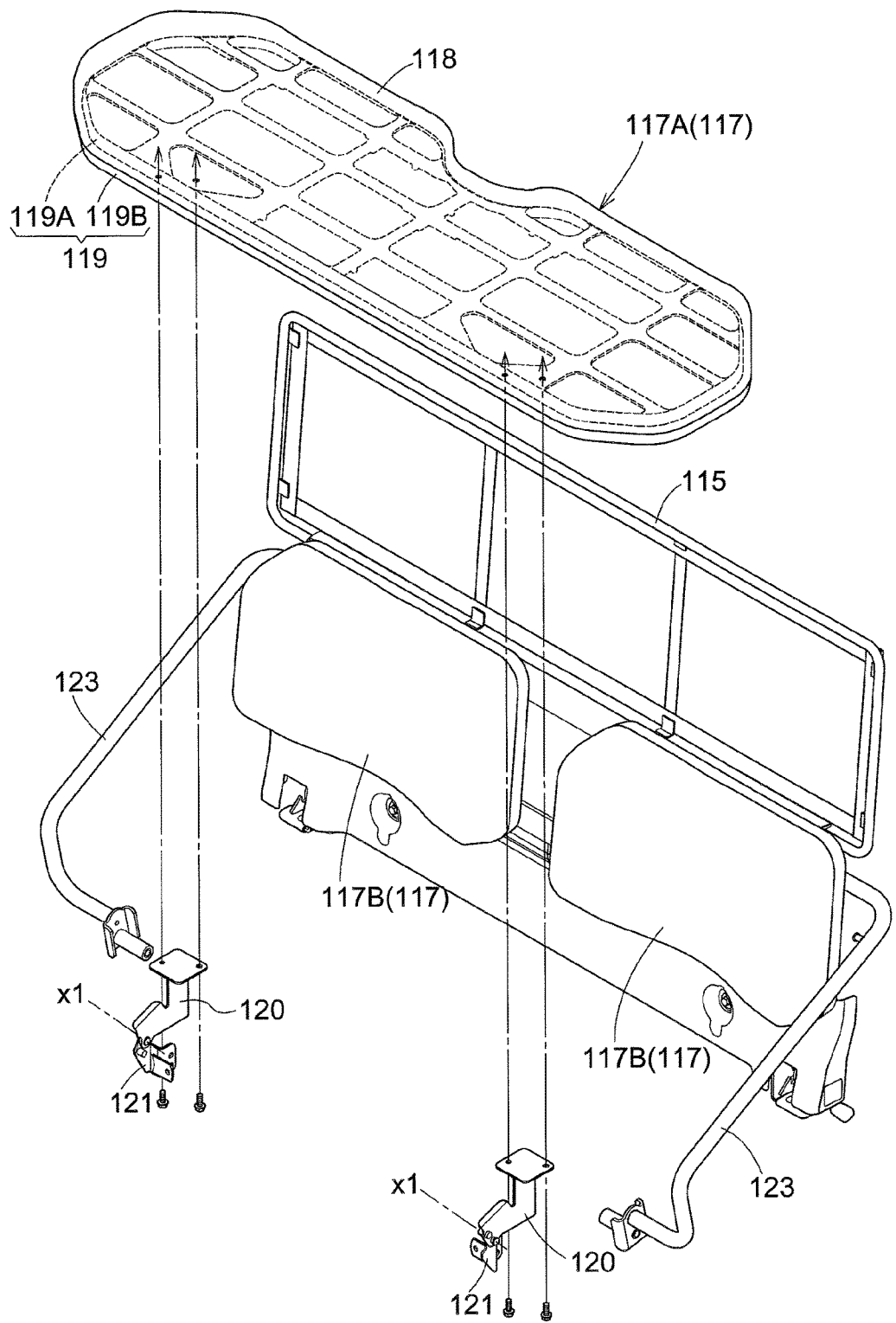
FIG. 19 is an exploded perspective view of a part of the rear seat according to the second embodiment.

With this configuration, as shown in FIGS. 18 and 22, the rod-shaped parts 156a of the joint members 156 can be orientated to face obliquely upward such that the buckles 155 are located forward of the backrest sections 117B above the seat surface of the seat part 117A, at a central position of the rear seat 117 in the in-use state in the left-right direction. Consequently, the belt end portion fixtures 153 are brought into a standing and joining position in which the buckles 155 are located forward of and higher than the seat belt anchors 154. Also, the belt end portion fixtures 153 are configured to be able to be brought into a position in which the buckles 155 and the rod-shaped parts 156a of the joint members 156 are embedded into the recessed part 127 formed in a portion of the lid cover part 126, when the rear seat 117 is in the retracted state.

Thus, the positions of the belt end portion fixtures 153 can be changed to the standing and joining position (indicated by the solid line shown in FIG. 22) in which the buckles 155 and the joint members 156 are out of the recessed part 127, and the laid and retracted position (indicated by the imaginary line shown in FIG. 22, and shown in FIG. 23) in which the buckles 155 are stored within the recessed part 127 by being operated to swing further downward compared to when the buckles 155 are in the standing and joining position.

When the belt end portion fixtures 153 are in the laid and retracted position, the rear seat 117 has been brought into the retracted state, and the extension portion of the load carrying platform 108 in the extended state is mounted on the upper side of the recessed part 127 in which the belt end portion fixtures 153 in the laid and retracted position are present.

When the rear seat 117 is brought into the in-use state from the retracted state, first, the load carrying platform 108 is brought into the shortened state, the belt end portion fixtures 153 are brought into the standing and joining position, and then the rear seat 117 is operated to be brought into the in-use state.

Although not described, the front seats 116 are also provided with seat belt devices. The seat belt devices for the front seats 116 are also fixed to a member on the vehicle body side.

Load Carrying Platform

A description is given of the load carrying platform 108.

As shown in FIGS. 15 and 16, the load carrying platform 108 is supported by the vehicle body with a dump fulcrum shaft 130 therebetween such that the load carrying platform 108 is swingable in the top-bottom direction. The dump fulcrum shaft 130 is located on the rear end side and extends in the lateral direction of the vehicle body. The load carrying platform 108 is able to be operated to be raised and lowered by an up/down cylinder 131 that is attached so as to span the lower surface of the load carrying platform 108 and the vehicle body frame 101, so that the load carrying platform 108 is switchable between a loading position in which the load carrying platform 108 is horizontally or almost horizontally located on the vehicle body, and a dumping position in which a front end side of the load carrying platform 108 is raised high above the vehicle body.

Figure 25:
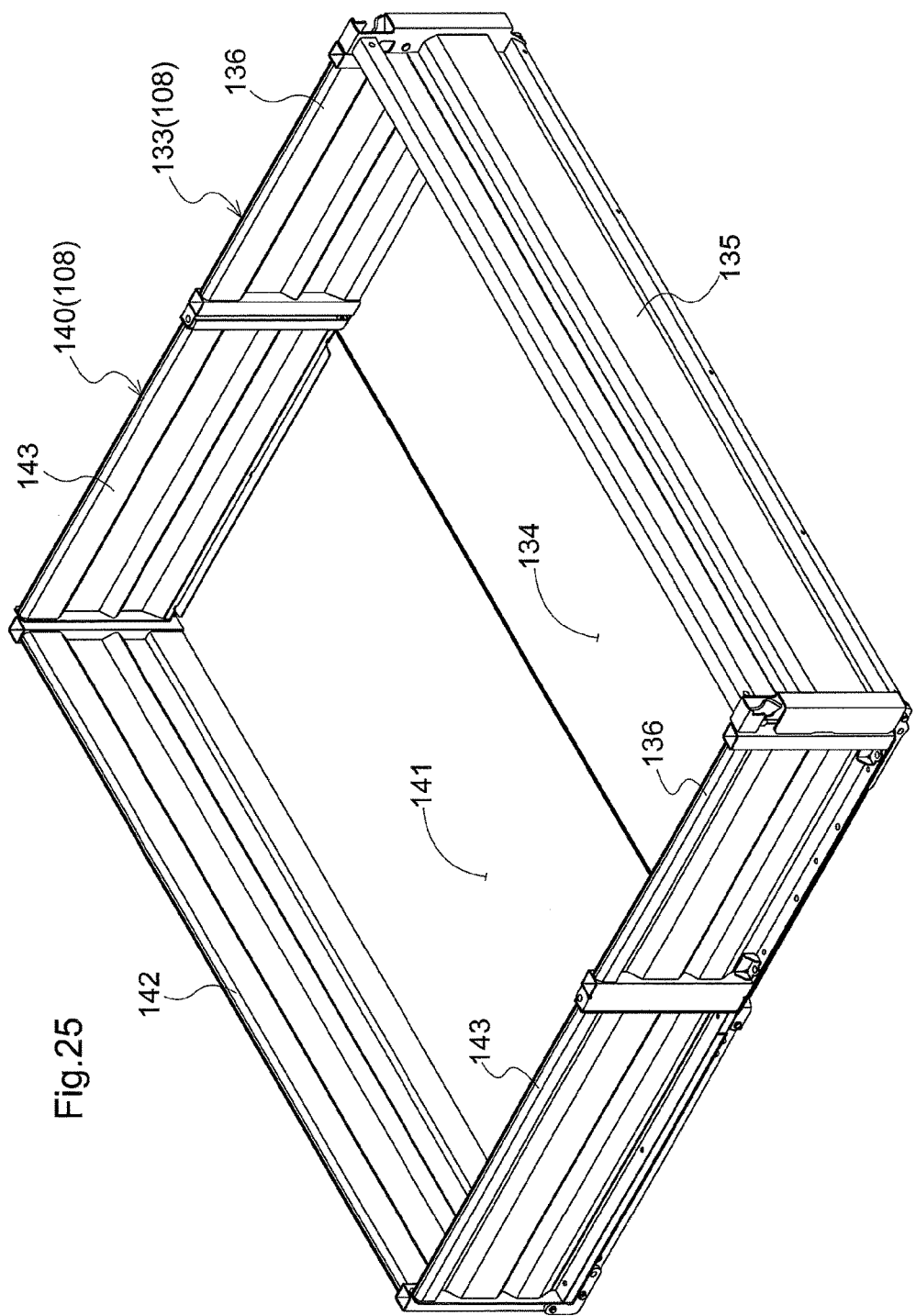
FIG. 25 is a perspective view showing the load carrying platform according to the second embodiment in the one-row seat mode.

As shown in FIGS. 16 and 25, the load carrying platform 108 is provided with: a load carrying platform main body 133 having a bottom plate 134 that has a lower surface to which the up/down cylinder 131 is joined; and an extension load carrying platform part 140 having an extension bottom plate 141 whose rear end portion is joined to a front end portion of the bottom plate 134.

In addition to the bottom plate 134, the load carrying platform main body 133 is also provided with: a rear plate 135 that is joined to a rear end portion of the bottom plate 134; and lateral plates 136 that are respectively joined to side portions of the bottom plate 134.

Figure 26:
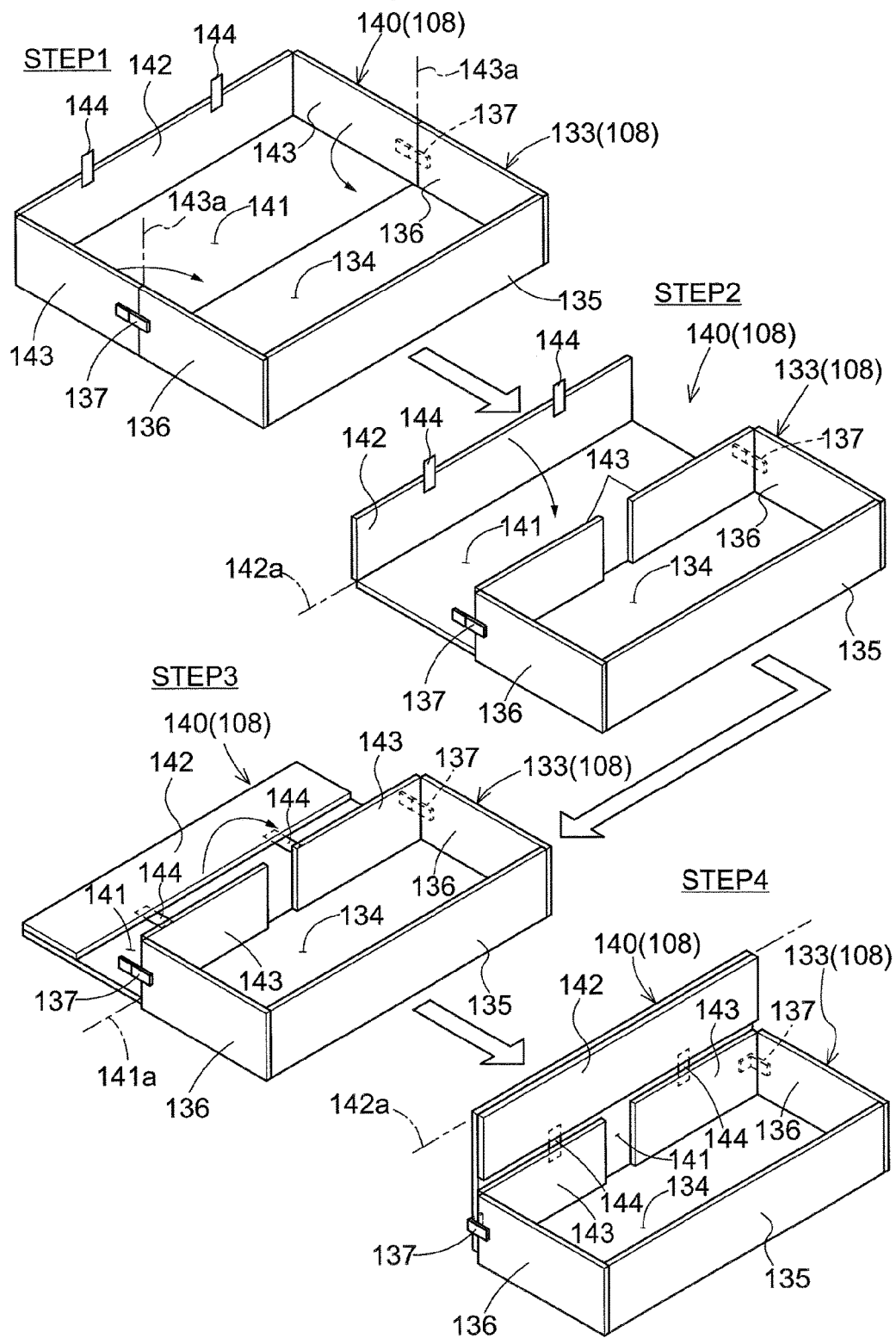
FIG. 26 is a diagram illustrating procedures for the switching of the load carrying platform according to the second embodiment.

As shown in FIG. 26, in addition to the extension bottom plate 141, the extension load carrying platform part 140 is also provided with a front plate 142 that is joined to a front end portion of the extension bottom plate 141 and that swings about an axis 142a extending in the left-right direction so as to stand up or lie down. The respective front end portions of the left and right lateral plates 136 of the load carrying platform main body 133 are provided with extension lateral plates 143 that are joined so as to swing in the lateral direction of the load carrying platform about axes 143a extending in the top-bottom direction. Furthermore, the extension bottom plate 141 is configured to swing about an axis 141a extending in the left-right direction so as to stand up or lie down relative to the bottom plate 134 of the load carrying platform main body 133. Thus, the extension load carrying platform part 140 is configured to be switchable to a folded state shown in FIG. 15 and an expanded state shown in FIG. 16.

FIG. 26 is a diagram illustrating procedures for the switching of the load carrying platform 108.

The extension load carrying platform part 140 shown in STEP 1 in FIG. 26 is the extension load carrying platform part in the expanded state. The extension load carrying platform part 140 shown in STEP 4 in FIG. 26 is the extension load carrying platform part in the folded state.

As shown in STEP 2 in FIG. 26, the left and right extension lateral plates 143 are operated to swing toward the inside of the load carrying platform so that the extension lateral plates 143 are in the folded position in which the extension lateral plates 143 extend along the front edge of the bottom plate 134. Note that the swinging of the left and right extension lateral plates 143 is regulated by restriction members, which are not shown in the drawings, when the extension lateral plates 143 form a right angle or a substantially right angle relative to the lateral plates 136. Next, as shown in STEP 3 in FIG. 26, the front plate 142 is operated to swing toward the upper surface of the extension bottom plate 141 and to lie down, and thus the front plate 142 is brought into the folded position in which the front plate 142 is laid on the upper surface of the extension bottom plate 141.

Next, as shown in STEP 4 in FIG. 26, the extension bottom plate 141 is operated to swing toward the extension lateral plates 143 in the folded position and to stand, and the extension bottom plate 141 is brought into the folded position in which the extension bottom plate 141 is laid on the outer surface of the extension lateral plates 143. The extension load carrying platform part 140 is thus brought into the folded state.

When the extension load carrying platform part 140 is brought into the folded state, the load carrying platform 108 is brought into a first state in which the load carrying platform 108 has a shortened front-rear length due to the extension load carrying platform part 140 being folded. The folded state in which the left and right extension lateral plates 143 are located further inside the load carrying platform than the extension bottom plate 141 is adopted as the folded state of the extension load carrying platform part 140. Therefore, compared to when the folded state in which the left and right extension lateral plates 143 are located outside the extension bottom plate 141 is adopted, the front-rear length of the load carrying platform 108 in the first state can be reduced by an amount that is determined by the plate thickness of the extension lateral plates 143.

Note that, in the present embodiment, as shown in FIG. 26, the load carrying platform 108 is provided with left and right lock mechanisms 137 that fix the extension bottom plate 141 and the left and right lateral plates 136 to each other when the load carrying platform 108 is in the folded state. Also, restriction members 144 are provided on the upper end of the front plate 142. Due to the presence of these restriction members 144, the front plate 142 is restricted from rotating upward about the axis 142a. Specifically, when the front plate 142 is about to rotate upward about the axis 142a, the restriction members 144 come into contact with the front plate 142, and thus the position of the front plate 142 is maintained. With this configuration, due to the lock mechanisms 137 being provided between the extension bottom plate 141 and the left and right lateral plates 136, it is possible to maintain the position of the front plate 142 with a simple configuration, without providing a complicated lock mechanism for maintaining the position of the front plate 142.

As shown in FIGS. 15 and 17, when the load carrying platform 108 is brought into the first state, the front end portion thereof is located rearward of the rear boarding section space 114a and the front-rear length is shortened, and thus the vehicle can be brought into the two-row seat mode.

As shown in STEP 3 in FIG. 26, the extension bottom plate 141 is operated to swing forward and lie down so that the extension bottom plate 141 is brought into the expanded position in which the extension bottom plate 141 is flush with or substantially flush with the bottom plate 134. Next, as shown in STEP 2 in FIG. 26, the front plate 142 is operated to swing to stand up, and is thus brought into the expanded position in which the front plate 142 stands on the front end portion of the extension bottom plate 141. Next, as shown in STEP 1 in FIG. 26, the left and right extension lateral plates 143 are operated to swing toward the outside of the load carrying platform, and are thus brought into the expanded position in which the left and right extension lateral plates 143 are flush with or almost flush with the lateral plates 136. Consequently, the extension load carrying platform part 140 is brought into the expanded state.

As a consequence of the extension load carrying platform part 140 being brought into the expanded state, the load carrying platform 108 is brought into a second state in which the front-rear length is expanded, due to the expansion of the extension load carrying platform part 140.

As shown in FIG. 16, the front end portion of the load carrying platform 108 brought into the second state enters the rear boarding section space 114*a* due to the front-rear length having been extended. Here, in order to allow the front end portion of the load carrying platform 108 to enter the rear boarding section space 114*a*, the rear seat 117 has been brought into the retracted state, and the separator member 115 has been moved to a front separation position for realizing the one-row seat mode. The front end portion of the load carrying platform 108 enters a seat space within the rear boarding section space 114*a* (where the rear seat 117 in the in-use state was present), which is now empty due to the rear seat 117 having been brought into the retracted state. When the backrest sections 117B are in the retracted position, the link members 123 are each in an L-shaped position in side view, in which first parts of the link members 123 extend forward from the vehicle body and second parts of the link members 123 extend upward from front end portions of the first parts. Then, the front end portion of the load carrying platform 108 enters an L-shaped space formed by the first parts and the second parts of the link members 123. In this way, even if the width of the load carrying platform 108 is larger than the width of the link members 123 (see FIG. 17), the total length of the vehicle body can be reduced by moving the load carrying platform 108 forward.

Other Embodiments Related to Second Embodiment (1) In the embodiment above, the belt end portion fixtures 153 of the seat belt devices 150 are fixed to the lateral frame 111D that spans the rear frame parts 111B of the left and right main frames 111 of the vehicle body frame 101. However, the present invention is not limited to such a configuration, and, although not shown in the drawings, a configuration may be adopted in which the lateral frame 111D is fixed to a bracket member or the like that is provided separately from the lateral frame 111D, for example.

Regarding other configurations, the same configurations as those in the above-described embodiment may be adopted.

(2) Although a description has been given of an example in which the seat belt devices 150 are configured such that the retractors 151 are located on the left and right sides of the rear seat 117 and the pair of belt end portion fixtures 153 are located in a central area of the rear seat 117 in the left-right direction in the embodiment above, the present invention is not limited to such a configuration.

For example, although not shown in the drawings, a configuration may be adopted in which the pair of belt end portion fixtures 153 are located on the left and right sides of the rear seat 117, and the pair of retractors 151 are located in a central area of the rear seat 117 in the left-right direction.

Alternatively, a configuration may be adopted in which one of the pair of belt end portion fixtures 153 and one of the pair of retractors 151 are located on the left and right sides of the rear seat 117, and the other of the pair of belt end portion fixtures 153 and the other of the pair of retractors 151 are located in a central area of the rear seat 117 in the left-right direction.

Regarding other configurations, the same configurations as those in the above-described embodiment may be adopted.

(3) Although a description has been given of an example in which the belt end portion fixtures 153 are configured such that the seat belt anchors 154 and the buckles 155 are joined to each other by the joint members 156 each having a rod-shaped part 156*a* in the embodiment above, the present invention is not limited to such a configuration.

For example, the joint members 156 are not limited to those having the rod-shaped part 156*a*, and the seat belt anchors 154 and the buckles 155 may be configured with plate-shaped joint members 156. In other words, any configuration may be adopted as long as the buckles 155 are supported by the joint members 156, and the belt end portion fixtures 153 are configured such that the entire belt end portion fixtures 153 are swingable to stand up or lie down about the lateral axis on the seat belt anchors 154 side.

Regarding other configurations, the same configurations as those in the above-described embodiment may be adopted.

(4) Although a description has been given of an example in which the load carrying platform 108 is configured to be switchable to the extended state and the shortened state and the length thereof in the front-rear direction can be changed in the embodiment above, the present invention is not limited to such a configuration.

For example, a configuration may be adopted in which the length of the load carrying platform 108 in the front-rear direction is constant, and the entire load carrying platform 8 can be moved in the front-rear direction.

Regarding other configurations, the same configurations as those in the above-described embodiment may be adopted.

(5) The vehicle according to one aspect of the present invention is applicable to various vehicles with seats, such as tractors and construction machines, in addition to transport vehicles and the utility vehicle described as examples in the embodiment above.

Third Embodiment

The following describes a third embodiment with reference to FIGS. 27 to 38.

Note that the "front-rear direction" and the "left-right direction" in the present embodiment are as follows unless otherwise specified. That is, "front" indicates the forward travelling direction (see an arrow F in FIG. 29) of a vehicle to which the present invention is applied, the forward travelling direction being a direction in which the driver's seat faces, "rear" indicates the rearward travelling direction (see an arrow B in FIG. 29) of the utility vehicle, "right" indicates the direction corresponding to the right side of the utility vehicle when the utility vehicle faces forward in terms of the above-described front-rear direction (see an arrow R in FIG. 29), and "left" indicates the direction corresponding to the left side of the utility vehicle under the same condition (see an arrow L in FIG. 29).

Overall Configuration

Figure 27:
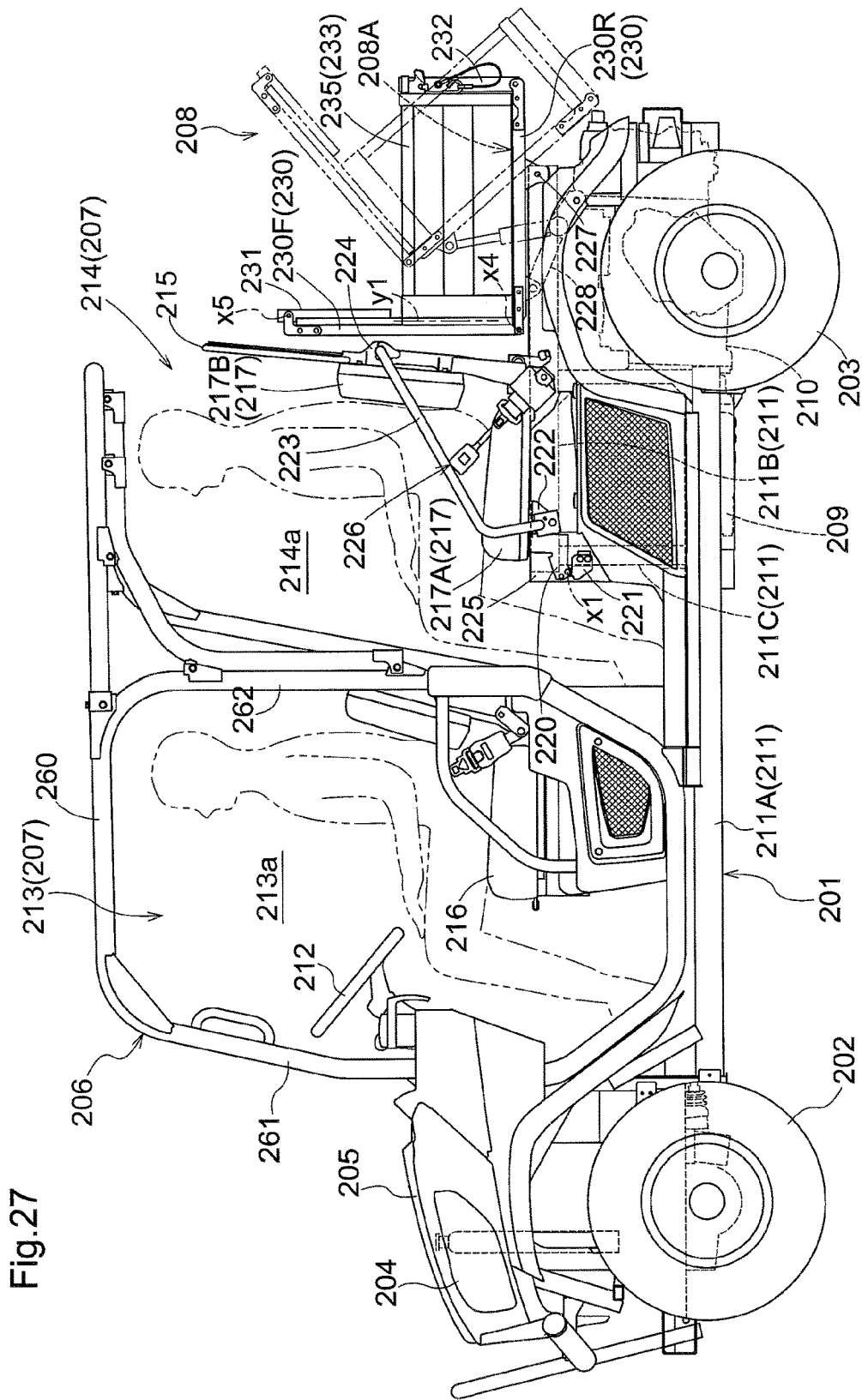
FIG. 27 is an overall side view of a vehicle according to a third embodiment in a two-row seat mode.
Figure 28:
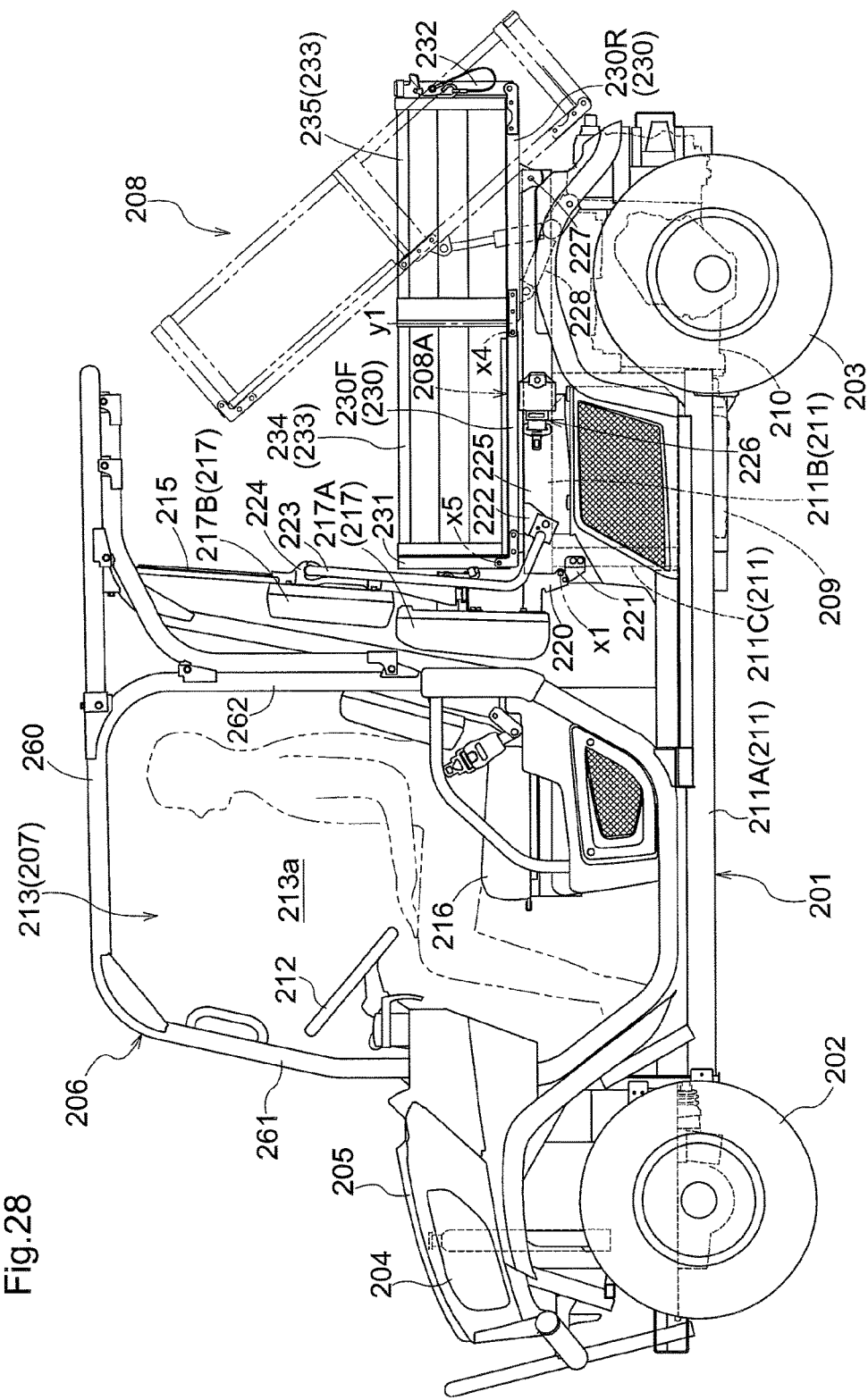
FIG. 28 is an overall side view of the vehicle according to the third embodiment in a one-row seat mode.
Figure 29:
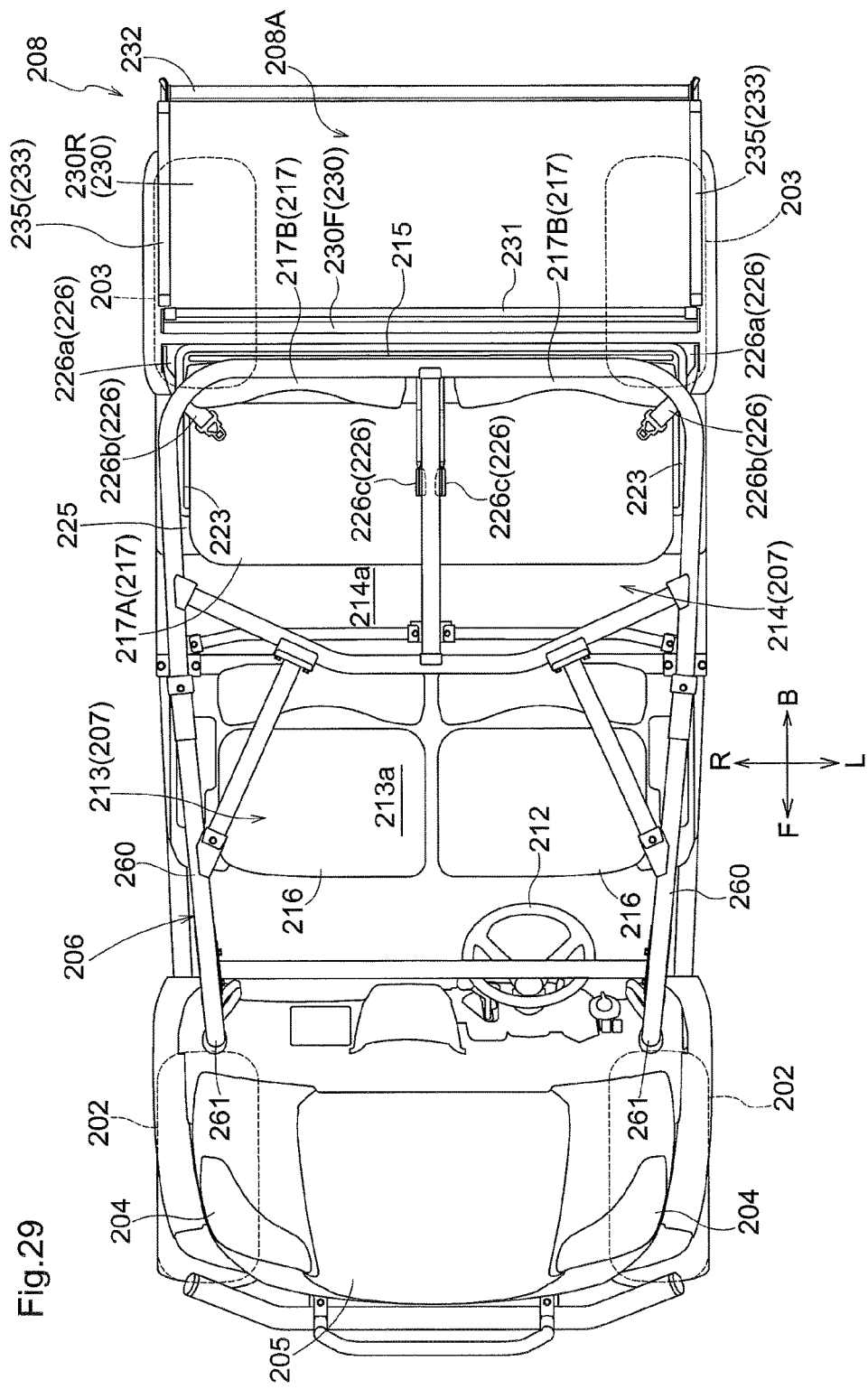
FIG. 29 is an overall plan view of the vehicle according to the third embodiment in the two-row seat mode.

FIGS. 27 to 29 are overall views of a utility vehicle, which is an example of a vehicle according to one aspect of the present invention. FIG. 27 is an overall side view when the vehicle is in a usage mode in which there are two rows of seats on which occupants can be seated, namely a front row and a rear row, and FIG. 28 is an overall side view when the vehicle is in a usage mode in which there is only one row of seats on which occupants can be seated, which is on the front side. FIG. 29 is an overall plan view when the vehicle is in the usage mode shown in FIG. 27.

As shown in FIGS. 27 to 29, the vehicle is provided with a travelling vehicle body equipped with: left and right front wheels 202 that are steerable and are supported by a front part of a vehicle body frame 201; and left and right rear wheels 203 that are not steerable and are supported by a rear part of the vehicle body frame 201.

A front end portion of the travelling vehicle body is provided with a front cover 205 on which a pair of left and right headlights 204 are provided. A portion of the travelling vehicle body located rearward of the front cover 205 is provided with a boarding section 207 that is provided with a ROPS 206. A load carrying platform 208 that is able to perform a dumping operation is provided in a rear part of the travelling vehicle body.

The boarding section 207 is provided in an intermediate part of the traveling vehicle body in the front-rear direction. The boarding section 207 is configured such that the usage mode of a rear seat 217 is changeable to a two-row seat state that allows an occupant to be seated on front seats 216 and the rear seat 217 as shown in FIG. 27 and to a one-row seat state that allows an occupant to be seated on the front seats 216 as shown in FIG. 28. Details of the usage modes are described below.

The load carrying platform 208 that is provided rearward of the boarding section 207 is configured such that the state thereof is changeable to an expanded position (corresponding to the "front-side mounting state") and a shortened position (corresponding to the "rear-side mounting state") described below. A separator member 215 that separates the boarding section 207 and the load carrying platform 208 from each other is provided between the boarding section 207 and the load carrying platform 208.

The vehicle body frame 201 of the travelling vehicle body is provided with a pair of left and right main frames 211 that are elongated in the front-rear direction. In the main frames 211, front frame parts 211A that are supported by the front wheels 202 are formed at a lower level, and rear frame parts 211B that are supported by the rear wheels 203 are formed at a higher level. In the main frames 211, rising frame parts 211C are provided at intermediate positions. The rising frame parts 211C connect rear end portions of the front frame parts 211A, which are located at the lower level, and front end portions of the rear frame parts 211B, which are located at the higher level. The main frames 211 are formed to have a stepped shape provided with the front frame parts 211A, the rear frame parts 211B, and the rising frame parts 211C.

Using this stepped shape, an engine 209 is located within a space that is formed below the rear frame parts 211B, rearward of the rising frame parts 211C. Drive force output by the engine 209 is input to a travelling transmission 210, and drive force that has been subjected to transmission shift is transmitted to the front wheels 202 and the rear wheels 203. Thus, a four-wheel drive travelling vehicle body is configured.

The positions of the rising frame parts 211C of the main frames 211 in the front-rear direction are set relative to the front frame parts 211A and the rear frame parts 211B so as to be located near a front end portion of the rear seat 217 in the two-row seat mode and near a front end portion of the load carrying platform 208 in the expanded position.

Therefore, as shown in FIG. 27, when the boarding section 207 is in the two-row seat mode, the load carrying platform 208 is in the shortened position, and a seat part 217A (corresponding to the "sitting section") of the rear seat 217 is positioned in the state of being mounted on the rear frame parts 211B that are located at the higher level rearward of the rising frame parts 211C of the main frames 211.

When the boarding section 207 is in the one-row seat mode as shown in FIG. 28, the load carrying platform 208 is in the expanded position. The extension portion of the load carrying platform 208 is brought into the state of being mounted on the rear frame parts 211B that are located at the higher level rearward of the rising frame parts 211C of the main frames 211, and the seat part 217A of the rear seat 217 is brought into the state of being folded forward.

A front portion of the vehicle body frame 201 is supported by the left and right front wheels 202, and a rear portion of the vehicle body frame 201 is supported by the left and right rear wheels 203. The vehicle body frame 201 is supported by the left and right front wheels 202 and the left and right rear wheels 203 with a suspension mechanism therebetween (not shown in the drawings).

In order to prevent the shock-absorbing function of the suspension mechanism from being impaired even when a heavy object is mounted on the load carrying platform 208 provided above a rear part of the vehicle body frame 201, the suspension mechanism is configured such that a part thereof on the rear wheel 203 side has strong spring force.

Therefore, when nothing is mounted on the load carrying platform 208 provided above the vehicle body frame 201 or when a light object is mounted on the load carrying platform 208, a load mounting surface 208A of the load carrying platform 208 is inclined relative to a horizontal surface such that the front part thereof is slightly lower.

Boarding Section

A description is given of the boarding section 207.

The boarding section 207 is provided with the ROPS 206. The ROPS 206 is disposed on a front part of the boarding section 207, and is provided with: a front boarding section 213 (corresponding to the "boarding section for driving") having a front boarding section space 213a; and a rear boarding section 214 having a rear boarding section space 214a.

The ROPS 206 is provided with: upper frames 260 that are located above the front boarding section space 213a and the rear boarding section space 214a and located along the front-rear direction of the vehicle body; a pair of left and right front supporting posts 261 that are located forward of the front boarding section space 213a, respectively on both lateral outer sides of the vehicle body, and that extend in the top-bottom direction; and a pair of left and right rear supporting posts 262 that are located between the front boarding section 213 and the rear boarding section 214, respectively on both lateral outer sides of the vehicle body, and that extend in the top-bottom direction of the vehicle body. The upper frames 260 protrude further rearward than the rear supporting posts 262 at the same level as the rear supporting posts 262.

The front seats 216 are respectively provided on the left and right sides within the front boarding section space 213a of the front boarding section 213, so that two people can be seated in the front boarding section 213.

A steering wheel 212 is provided forward of the front seat 216 in a left area, out of the left and right front seats 216, and the front boarding section 213 is configured as the boarding section for driving. The left and right front seats 216 are configured to be separately slidable in the front-rear direction using guide rails, which are not shown in the drawings.

The rear boarding section 214 is provided with the rear seat 217. The rear seat 217 is configured to be a laterally elongated seat on which two people can be seated, and two people can be seated in the rear boarding section 214. The rear seat 217 is configured such that the state thereof can be switched to the in-use state indicated by the two-dot chain line shown in FIG. 30, and the retracted state indicated by the solid line shown in FIG. 30. Specifically, the rear seat 217 is configured in the following manner.

The rear seat 217 is provided with the laterally elongated seat part 217A (corresponding to the "sitting section") and laterally elongated backrest sections 217B.

The seat part 217A is provided with: a cushion layer 218 that serves as an elastic seat surface; a seat attachment frame 219 that supports the cushion layer 218; and a metal fitting 220 for joining the seat attachment frame 219 to the main frames 211.

The metal fitting 220 is pivotally joined to a metal supporting fitting 221 that is fixed to the rising frame parts 211C of the main frames 211 so that the metal fitting 220 is swingable in the top-bottom direction about a lateral axis x1 that extends in the left-right direction.

Therefore, the seat attachment frame 219 whose front end portion is joined to the metal fitting 220 rotates about the lateral axis x1, and the position of the seat part 217A of the rear seat 217 is thus switched to the in-use state and the retracted state.

The backrest sections 217B are joined to upper end portions of a pair of left and right link members 223 that are respectively located on the two sides of the rear seat 217 in the lateral direction. The respective lower end portions of the pair of left and right link members 223 are rotatably supported by attachment parts 222 that are integrated with the rear frame parts 211B below the seat part 217A. The respective upper end portions of the pair of left and right link members 223 are relatively rotatably joined to joint members 224 that are provided on the rear side of the backrest sections 217B.

The pair of left and right link members 223 are located so as to be inclined downward in a direction from the rear side to the front side when the backrest sections 217B are in the in-use position, and serve as armrests.

A lower end portion of the separator member 215 is joined to the joint members 224 that are provided on the rear side of the backrest sections 217B. The separator member 215 is provided with: a separator frame that is manufactured by joining a frame body that extends in the lateral direction of the vehicle body and a frame body that extends in the top-bottom direction of the vehicle body; and a netted member that is stretched over the separator frame.

A covering member 225 for thermal insulation is provided to span the range between the left and right rising frame parts 211C and the rear frame parts 211B of the left and right main frames 211, and to cover an engine space in which the engine 209 is provided.

Figure 30:
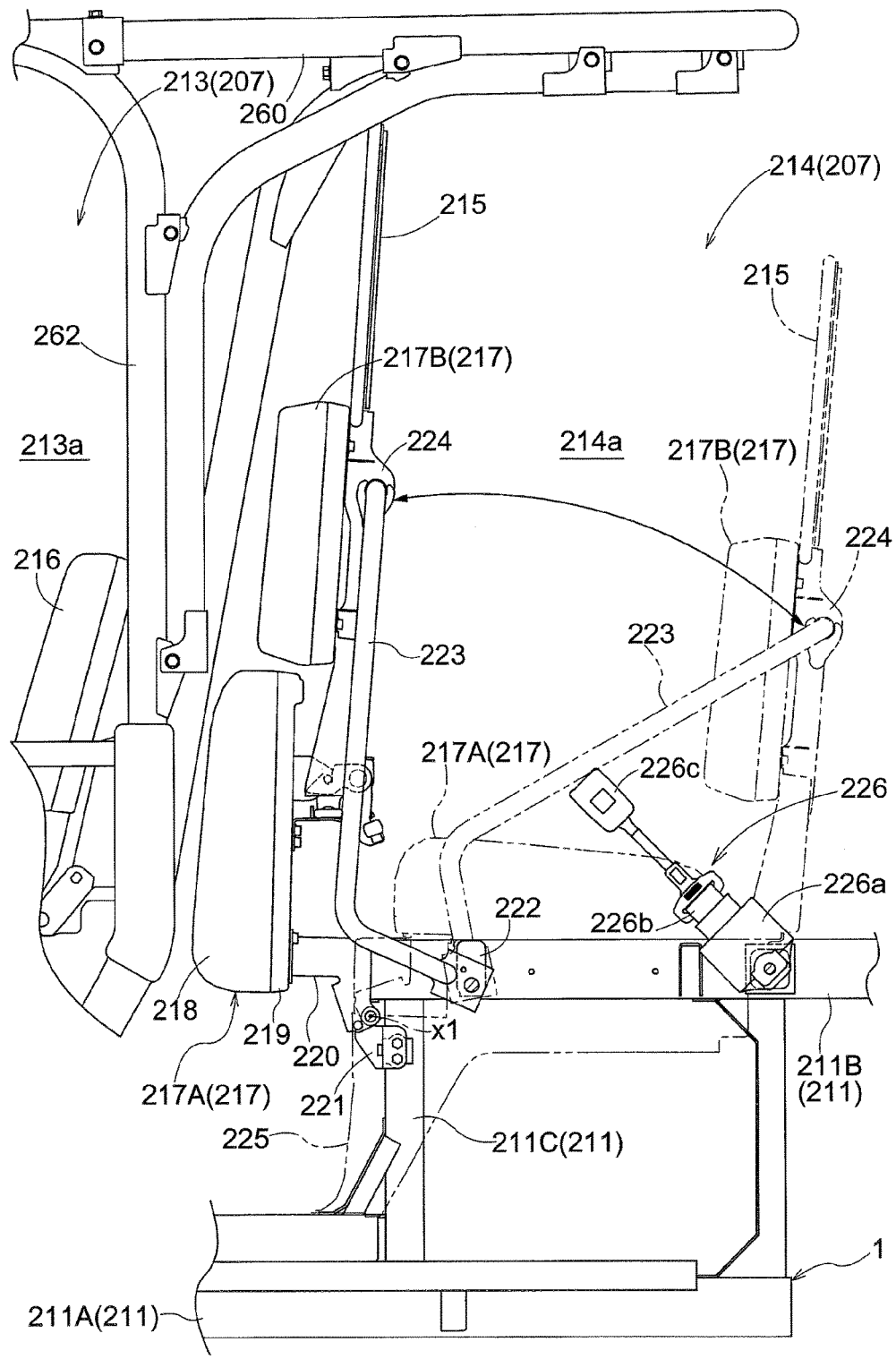
FIG. 30 is a side view showing the changing of the position of the rear seat according to the third embodiment.

As shown in FIGS. 29 and 30, the rear seat 217 is provided with seat belt devices 226 that are provided with: retractors 226a that are respectively located on the left and right sides of the rear seat 217; seat belts 226b that are in the state of respectively being wound around the retractors 226a; and the pair of belt end portion fixtures 226c that are located in a central area of the rear seat 217 in the left-right direction and that are able to separately fix end portions of the seat belts 226b that are respectively drawn out from the left and right retractors 226a. Although not described, the front seats 216 are also provided with the seat belt devices 226.

Load Carrying Platform

A description is given of the load carrying platform 208.

As shown in FIGS. 27 and 28, the load carrying platform 208 is supported by the vehicle body with a dump fulcrum shaft 227 therebetween such that the load carrying platform 208 is swingable in the top-bottom direction. The dump fulcrum shaft 227 is located on the rear end side and extends in the lateral direction of the vehicle body. The load carrying platform 208 is configured to be able to be operated to swing and stand up or lie down by an up/down cylinder 228 that is attached so as to span the lower surface of the load carrying platform 208 and the vehicle body frame 201, so that the load carrying platform 208 is switchable between a loading position in which the load carrying platform 208 is horizontally or almost horizontally located on the vehicle body, and a dumping position in which a front end side of the load carrying platform 208 is raised high above the vehicle body.

Figure 31:
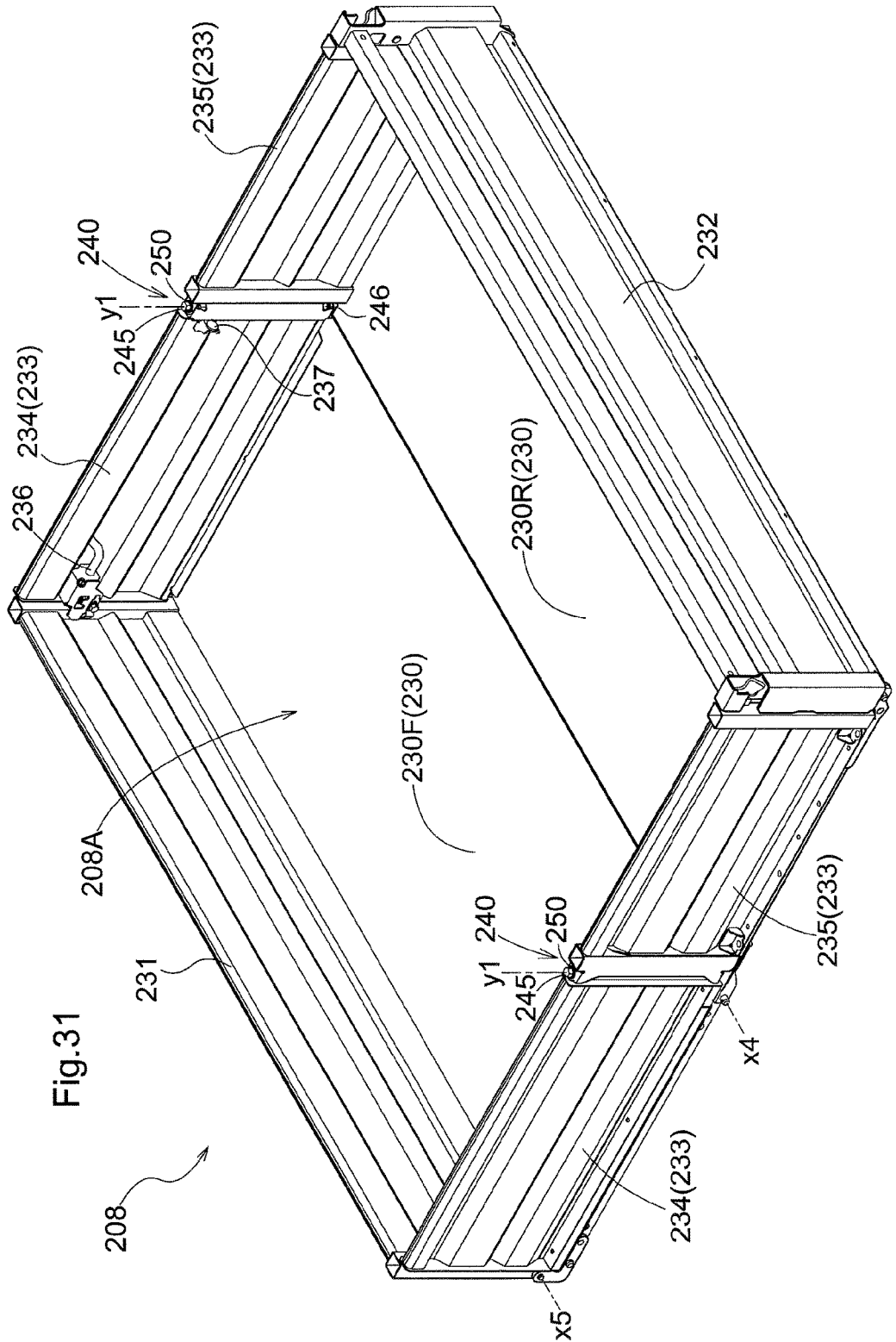
FIG. 31 is a perspective view of a load carrying platform according to the third embodiment in an expanded position.
Figure 32:
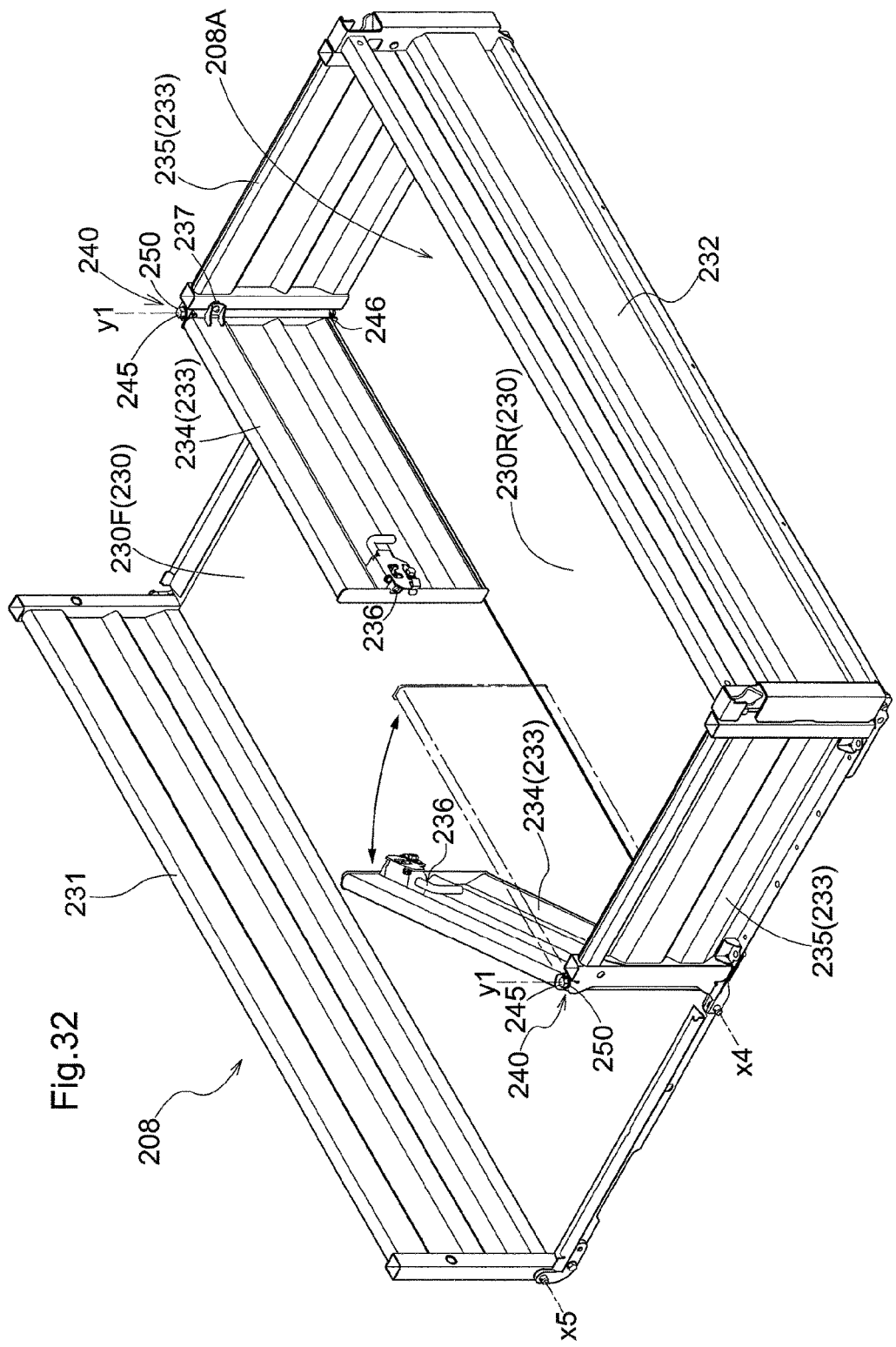
FIG. 32 is a perspective view of the load carrying platform according to the third embodiment showing a process in which the position is changed from the expanded position to a shortened position.
Figure 33:
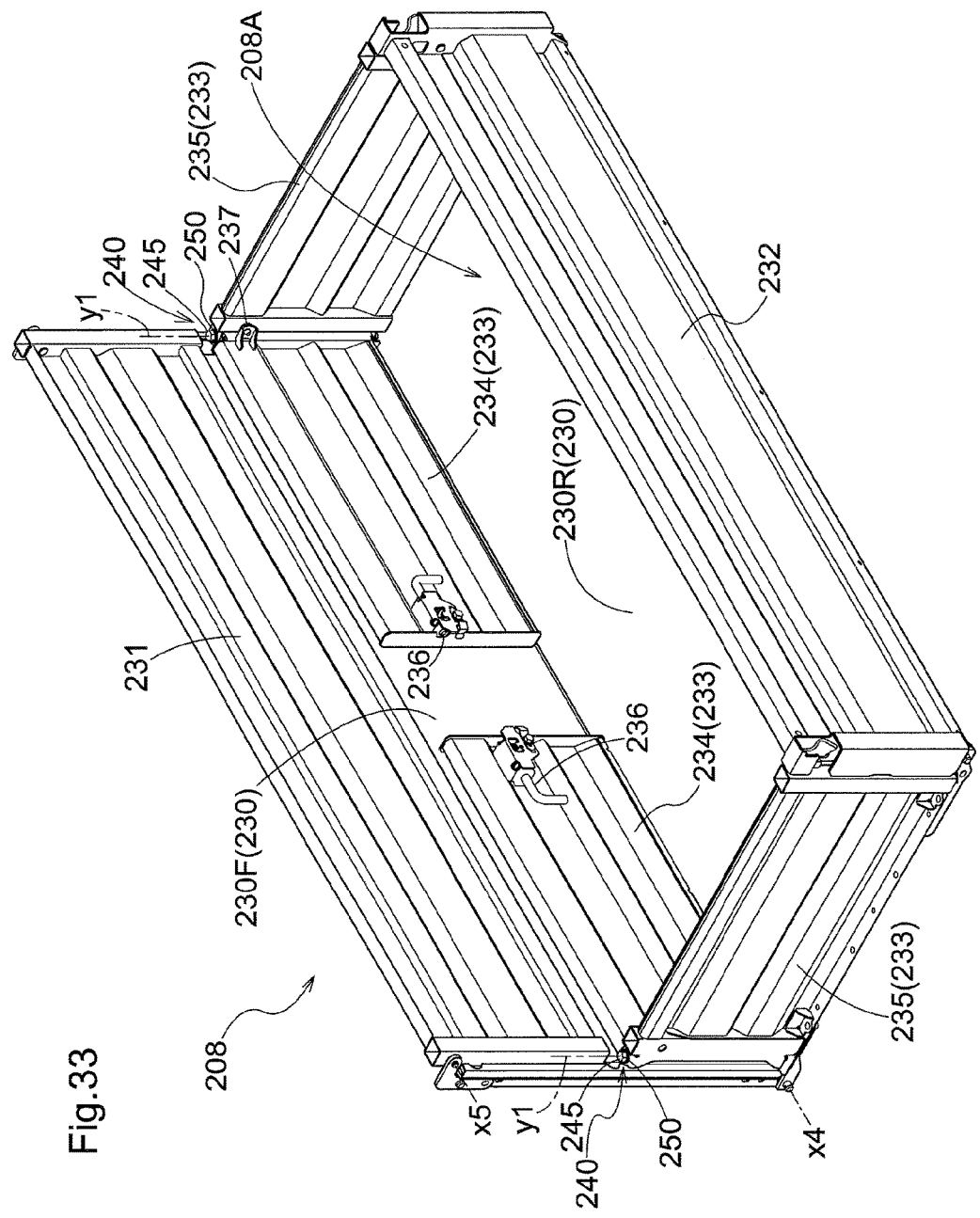
FIG. 33 is a perspective view of the load carrying platform according to the third embodiment in the shortened position.

As shown in FIGS. 31 to 33, the load carrying platform 208 is provided with: a bottom plate 230 that is provided with the load mounting surface 208A; a front plate 231 that stands on a front part of the bottom plate 230 along a direction that intersects the load mounting surface 208A; a rear plate 232 that stands on a rear part of the bottom plate 230 along a direction that intersects the load mounting surface 208A (the top-bottom direction); and a pair of left and right lateral plates 233 that respectively stand on left and right side portions of the bottom plate 230 along a direction that intersects the load mounting surface 208A (the top-bottom direction). Thus, the load carrying platform 208 is formed to have a rectangular box shape that opens upward.

The lateral plates 233 respectively located on the left and right side portions of the load mounting surface 208A are each configured with the combination of a front lateral plate 234 that is provided near the front side of the load carrying platform 208 and a rear lateral plate 235 that is provided rearward of the front lateral plate 234.

As shown in FIGS. 31 to 33 and 36, the rear lateral plates 235, together with the rear plate 232, are fixed to the rear part of the bottom plate 230, and rear end portions of the front lateral plates 234 are joined to and supported by front end portions of the rear lateral plates 235 such that the front lateral plates 234 are swingable about swing axes y1 extending in a direction that intersects the load mounting surface 208A (the top-bottom direction).

The front end portions of the front lateral plates 234 are configured to be engageable with the front plate 231 with joint operation members 236 therebetween, and are configured such that the front lateral plates 234 are swingable about the swing axes y1 when engagement with the front plates 231 is released.

The front plate 231 is joined to the front end portion of the bottom plate 230 so as to swing to stand up or lie down about a lateral axis x5 that extends in the left-right direction. The bottom plate 230 is configured with the combination of a front bottom plate 230F that constitutes a front part of the load mounting surface 208A, and a rear bottom plate 230R that constitutes a rear part of the load mounting surface 208A. The rear edge of the front bottom plate 230F is joined to the front edge of the rear bottom plate 230R such that the front bottom plate 230F swings about a lateral axis x4 that extends in the left-right direction along the front edge of the rear bottom plate 230R.

Figure 36:
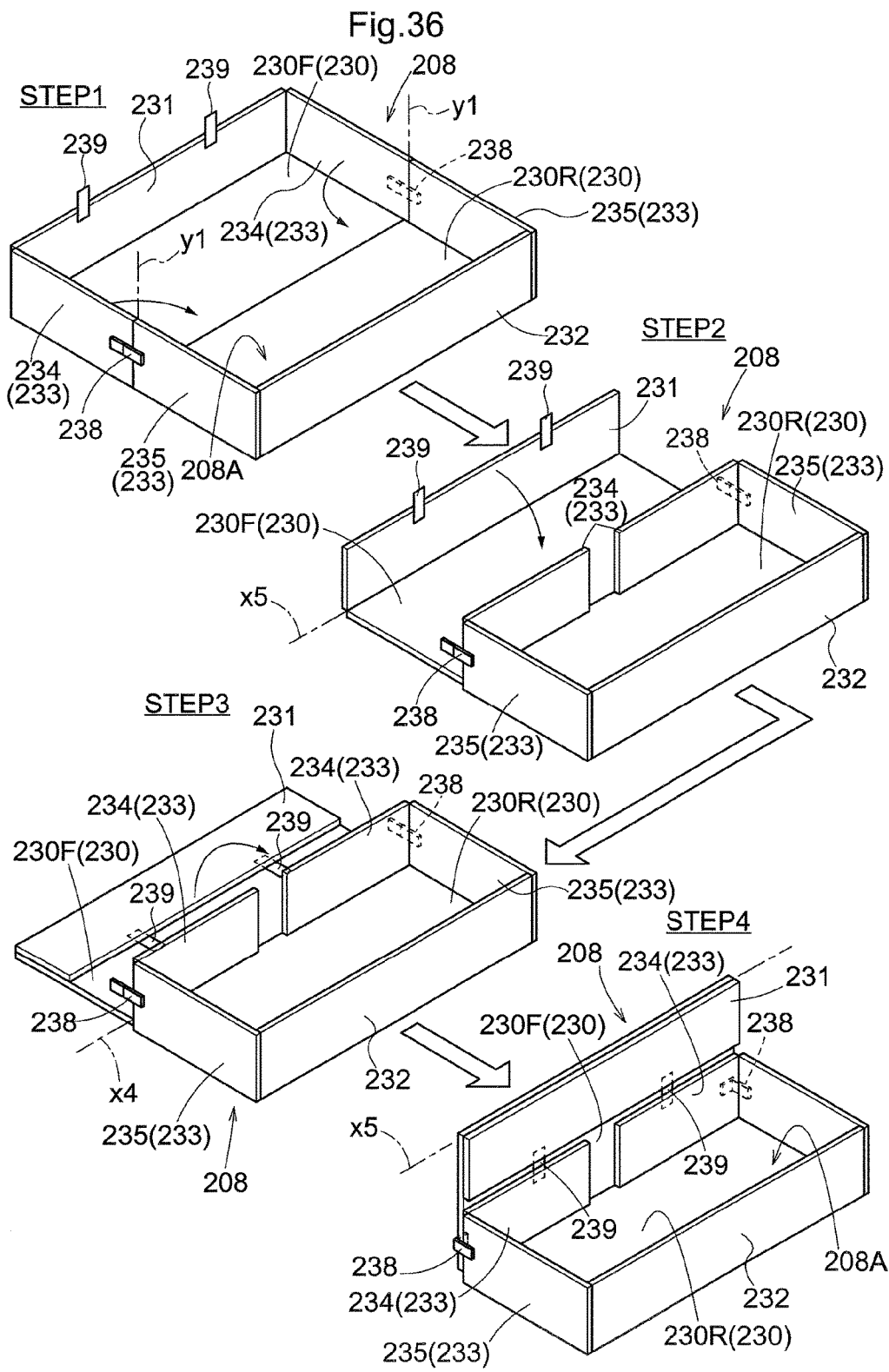
FIG. 36 is a diagram illustrating procedures for changing a front-rear length of the load carrying platform according to the third embodiment.

With this configuration, as shown in FIGS. 33 and 36, the position of the load carrying platform 208 can be switched such that the load carrying platform 208 is brought into the state where the front plate 231 has been rotated about the lateral axis x5 and has been folded to the front bottom plate 230F side, and the front bottom plate 230F has been rotated about the lateral axis x4 and stands on the rear bottom plate 230R.

In this way, the positions of the front plate 231 and the front bottom plate 230F are switched to the standing position, and the positions of the front lateral plates 234 are switched due to the front lateral plates 234 swinging about the swing axes y1 so as to be aligned with the front edge of the rear bottom plate 230R. Consequently, the front-rear length of the load carrying platform 208 becomes shorter compared to before the front bottom plate 230F is raised, and the load carrying platform 208 is brought into the shortened position in which the load mounting surface 208A is present only on the upper side of the rear bottom plate 230R.

The operation to change the front-rear length of the load carrying platform 208 is performed according to the procedures shown in FIG. 36.

The load carrying platform 208 shown in STEP 1 in FIG. 36 is in the expanded position in which the length of the load mounting surface 208A in the front-rear direction is at the maximum. The load carrying platform 208 shown in STEP 4 in FIG. 36 is in the shortened position in which the length of the load mounting surface 208A in the front-rear direction is at the minimum.

As shown in STEP 2 in FIG. 36, the left and right front lateral plates 234 are operated to swing toward the inside of the load carrying platform so that the front lateral plates 234 are in the folded position in which the front lateral plates 234 extend along the front edge of the rear bottom plate 230R. Note that the rearward swinging of the left and right front lateral plates 234 is regulated by limiting stoppers 237 (see FIGS. 31 to 33) provided on the rear lateral plates 235 when the front lateral plates 234 are located to form a right angle or a substantially right angle relative to the rear lateral plates 235.

Next, as shown in STEP 3 in FIG. 36, the front plate 231 is operated to swing toward the upper surface of the front bottom plate 230F and lie down, and thus the front plate 231 is brought into the folded position in which the front plate 231 is laid on the upper surface of the front bottom plate 230F.

Next, as shown in STEP 4 in FIG. 36, the front bottom plate 230F is operated to swing toward the front lateral plate 234 in the folded position, and to stand up, and the front bottom plate 230F is brought into the folded position in which the front bottom plate 230F is laid on the outer surface of the front lateral plate 234. The load carrying platform 208 is thus brought into the shortened position.

The folded state in which the left and right front lateral plates 234 are located further inside the load carrying platform than the front bottom plate 230F is adopted as the shortened position of the load carrying platform 208. Therefore, compared to when the folded state in which the left and right front lateral plates 234 are located outside the load carrying platform than the front bottom plate 230F is adopted, the front-rear length of the load carrying platform 208 in the shortened position can be reduced by the plate thickness of the front lateral plates 234.

Note that, in the present embodiment, as shown in FIG. 36, the load carrying platform 208 is provided with left and right lock mechanisms 238 that fix the front bottom plate 230F and the left and right rear lateral plates 235 to each other when the load carrying platform 208 is in the folded state. Also, restriction members 239 are provided on the upper end of the front plate 231. Due to the presence of these restriction members 239, the front plate 231 is restricted from rotating upward about the axis x3. Specifically, when the front plate 231 is about to rotate upward about the axis x3, the restriction members 239 come into contact with the front plate 231, and thus the position of the front plate 231 is maintained. Using this configuration, in which the lock mechanisms 238 are provided between the front bottom plate 230F and the left and right rear lateral plates 235, it is possible to maintain the position of the front plate 231 with a simple configuration without using a lock mechanism having a complicated configuration for maintaining the position of the front plate 231.

As shown in FIGS. 27 and 29, when the load carrying platform 208 is brought into the shortened position, the front end portion thereof is located rearward of the rear boarding section space 214a and the front-rear length is shortened, and thus the vehicle can be brought into the two-row seat mode.

In order to switch the load carrying platform 208 to the expanded position, the above-described procedures for switching to the shortened position are performed in reverse order.

Specifically, as shown in STEP 3 in FIG. 36, the front bottom plate 230F is operated to swing forward and lie down so that the front bottom plate 230F is brought into the expanded position in which the front bottom plate 230F is flush with or almost flush with the rear bottom plate 230R. Next, as shown in STEP 2 in FIG. 36, the front plate 231 is operated to swing to stand up, and is thus brought into the expanded position in which the front plate 231 stands on the front end portion of the front bottom plate 230F. Next, as shown in STEP 1 in FIG. 36, the left and right front lateral plates 234 are operated to swing toward the outside of the load carrying platform, and are thus brought into the expanded position in which the left and right front lateral plates 234 are flush with or almost flush with the rear lateral plates 235. Consequently, the entire load carrying platform 208 is brought into the expanded position in which the front-rear length thereof is extended.

As shown in FIG. 28, the front end portion of the load carrying platform 208 brought into the expanded position enters the rear boarding section space 214a due to the front-rear length having been extended. Here, in order to allow the front end portion of the load carrying platform 208 to enter the rear boarding section space 214a, the rear seat 217 has been brought into the retracted state, and the separator member 215 has been moved to a front separation position for realizing the one-row seat mode. The front end portion of the load carrying platform 208 enters a seat space within the rear boarding section space 214a (where the rear seat 217 in the in-use state was present), which is now empty due to the rear seat 217 having been brought into the retracted state.

Swing Resistance Mechanisms

Swing resistance mechanisms 250 are provided at positions where the front lateral plates 234 and the rear lateral plates 235 are joined to each other. The swing resistance mechanisms 250 are able to apply a light load acting against the swinging of the front lateral plates 234 in order to restrict the front lateral plates 234, which have been unjoined from the front plate 231, from swinging due to their own weight.

Figure 34:
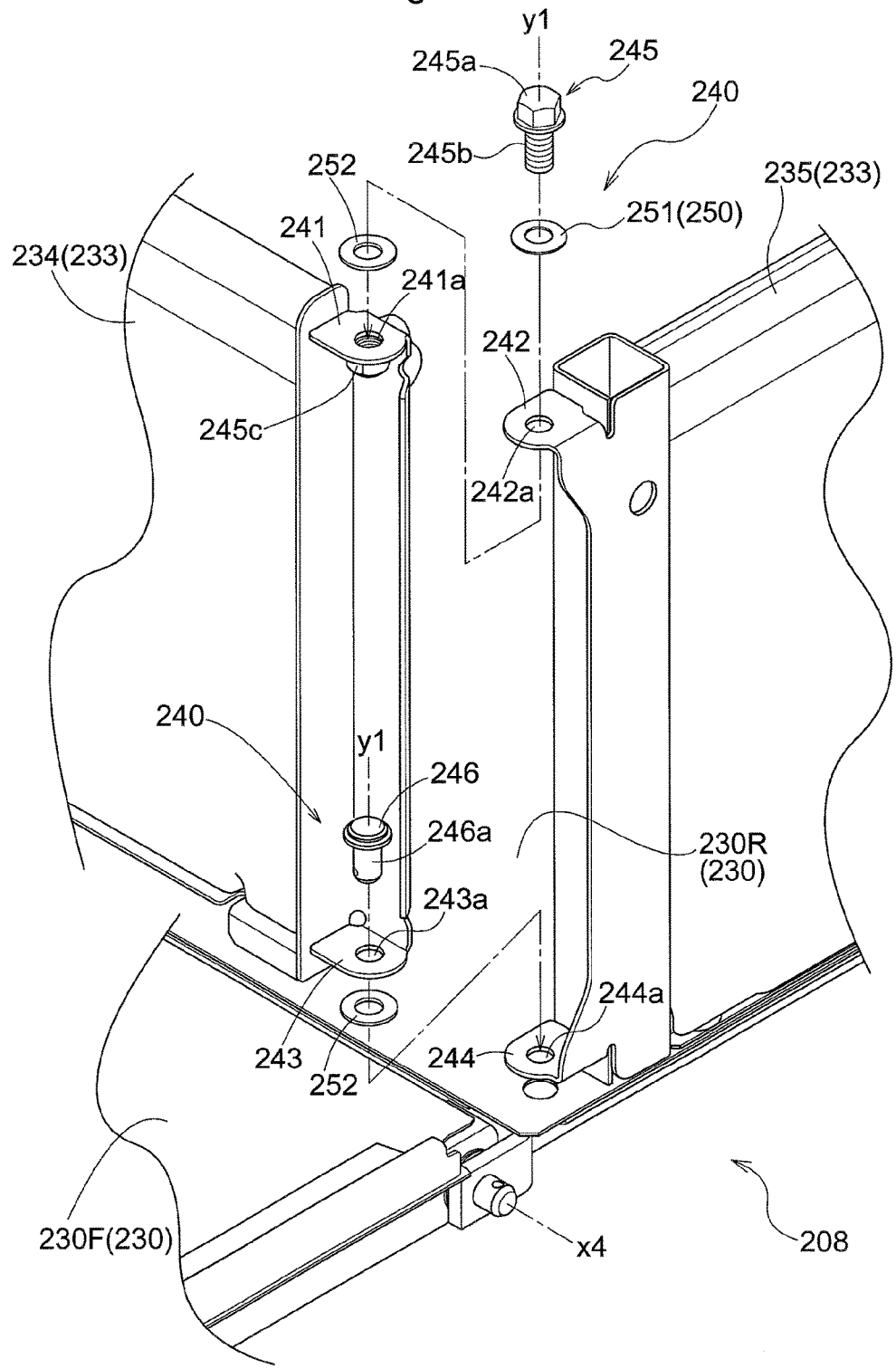
FIG. 34 is an exploded perspective view of a hinge joint according to the third embodiment, showing a position where a front lateral plate and a rear lateral plate are joined to each other.
Figure 35:
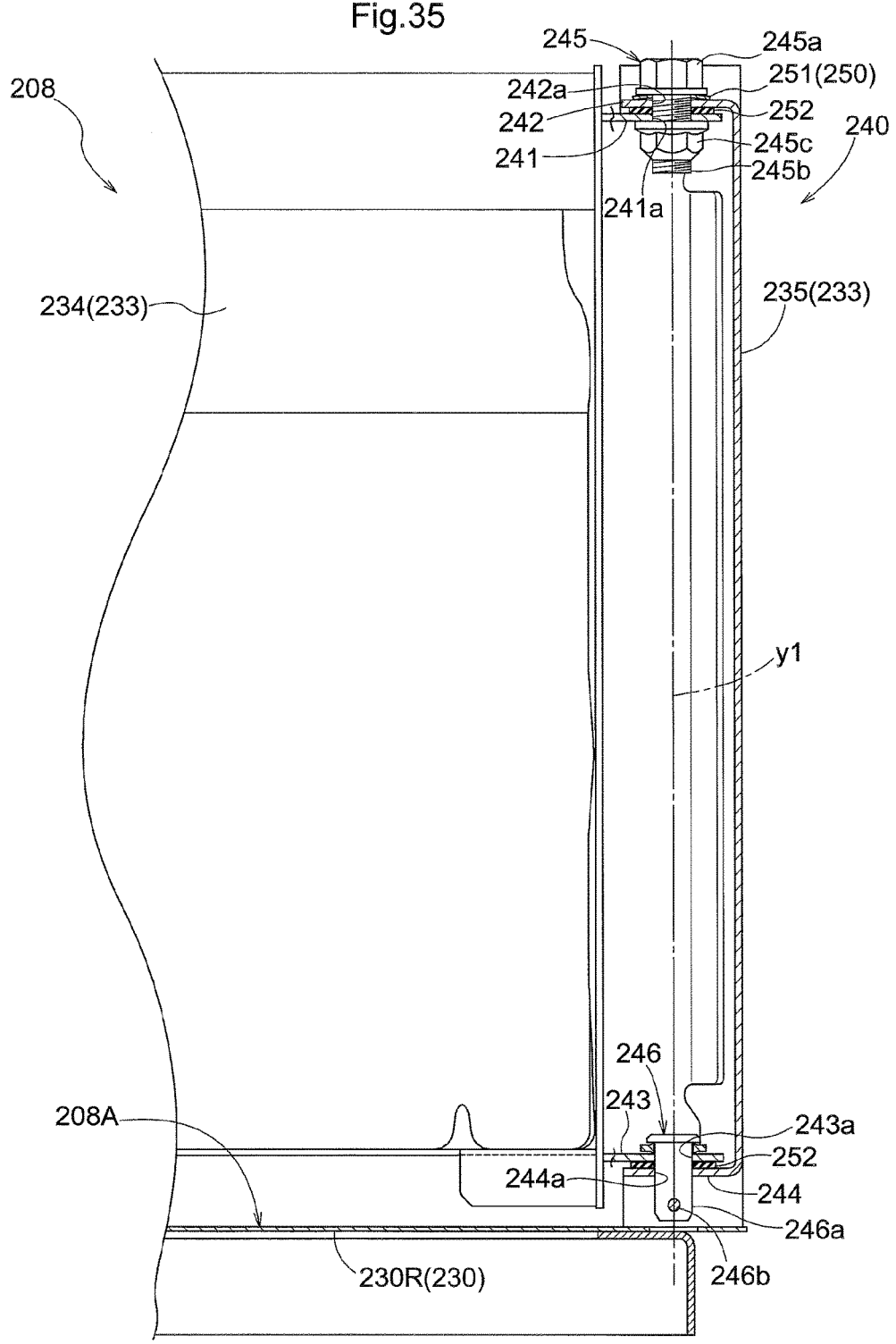
FIG. 35 is a vertical cross-sectional view of the hinge joint according to the third embodiment along a left-right direction, showing a position where the front lateral plate and the rear lateral plate are joined to each other.

As shown in FIGS. 34 and 35, the swing resistance mechanisms 250 are provided at hinge joints 240, which are provided at facing end portions where the rear end portions of the front lateral plates 234 and the front end portions of the rear lateral plates 235 face each other.

The hinge joints 240 are provided with: hinge protrusion pieces 241 and 243 that are provided on the rear end portion of the corresponding front lateral plate 234; hinge protrusion pieces 242 and 244 that are provided on the front end portion of the corresponding rear lateral plate 235; and fulcrum pins 245 and 246 that penetrate through pivot support holes 241a, 242a, 243a, and 244a respectively formed in the hinge protrusion pieces 241, 242, 243, and 244. The hinge protrusion pieces 241, 242, 243, and 244 and the fulcrum pins 245 and 246 are located at either one of two positions along a top-bottom direction, namely positions at upper end portions and lower end portions of the front lateral plate 234 and the rear lateral plate 235. The upper and lower fulcrum pins 245 and 246 are located on a shared axis line, which coincides with the swing axis y1 of the front lateral plate 234.

The fulcrum pin 245 out of the fulcrum pins 245 and 246, which is provided on the uppermost hinge joint 240, is configured with a bolt nut that is provided with: a head 245a; a screw shaft 245b; and a stopper nut 245c that is screwed onto the screw shaft 245b. The bolt nut is provided such that the head 245a, which serves as an operation part, is exposed from the upper side of the hinge joint 240. Thus, the bolt nut is located such that it is easy to perform an operation to adjust the degree of fastening the bolt nut.

The fulcrum pin 246 provided on the lower hinge joint 240 is configured with a pin with a head, and is configured such that a shaft 246a thereof penetrates through the pivot support holes 243a and 244a formed in the hinge protrusion pieces 243 and 244 of the lower hinge joint 240, and a portion of the shaft 246a that protrudes from the lower side of the pivot support holes 243a and 244a is fixed with a stopper pin 246b (see FIG. 35), which is β pin for example.

Each swing resistance mechanism 250 is configured with a disc spring 251 that is inserted between the hinge protrusion piece 242 of the corresponding upper hinge joint 240 and the head 245a of the corresponding fulcrum pin 245.

Specifically, it is possible to apply low resistance against the rotation of the front lateral plate 234 about the swing axis y1 by performing an operation to fasten the bolt nut constituting the fulcrum pin 245, and thereby compressing and deforming the disc spring 251 inserted between the hinge protrusion piece 242 and the head 245a of the fulcrum pin 245. Due to the rotational resistance applied by the disc spring 251, it is possible to efficiently perform the operation to change the position of the front lateral plate 234.

Specifically, when the load carrying platform 208 is empty, it is likely that the rear part of the vehicle body frame 201 is raised to be higher than the front part thereof due to the action of suspension springs on the rear wheels 203 side (not shown in the drawings), and accordingly the load carrying platform 208 is brought into a front-low inclined position, in which the rear part of the bottom plate 230 is raised to be higher than the front part thereof. Accordingly, when the load carrying platform 208 is empty, the swing axes y1 of the front lateral plates 234 are in a forward-inclined position, in which the upper side of the swing axes y1 are slightly inclined forward compared to the lower side. Consequently, when the load carrying platform 208 in the expanded position is to be brought into the shortened position, the front lateral plates 234 that rotate about the swing axes y1 in the forward-inclined position tend to be subjected to returning force generated by their own weight, by which the front lateral plates 234 return to the expanded position.

However, according to one aspect of the present invention, the swing resistance mechanisms 250 apply rotational resistance to the front lateral plates 234, and therefore it is easy to avoid such a problem.

Specifically, when bringing the load carrying platform 208 in the expanded position into the shortened position, the operator first performs an operation to swing the left-side front lateral plate 234 clockwise about the corresponding swing axis y1 as indicated by the imaginary line shown in FIG. 32, in order to bring it into the shortened position in which the front lateral plate 234 intersects the rear lateral plate 235, and then turns around the rear side of the load carrying platform 208 and performs an operation to swing the right-side front lateral plate 234 counterclockwise about the corresponding swing axis y1. In this regard, even though the left-side front lateral plate 234 has been bent first, there are cases in which the left-side front lateral plate 234 spontaneously returns to the original position due to its own weight, as indicated by the solid line in the same drawing. This is because the swing axes y1 are in the forward-inclined position when the load carrying platform 208 is empty, and the left-side front lateral plate 234 is subjected to returning force generated by its own weight, by which the left-side front lateral plate 234 swings counterclockwise about the corresponding swing axis y1. Since the rotation resistance generated by the swing resistance mechanisms 250 effectively acts against the returning force, it is easy to avoid the problem of the left-side front lateral plate 234 spontaneously returning to the expanded position.

Reference numeral 252 shown in FIGS. 34 and 35 indicates a collar member configured with a vibration absorption rubber or the like, which suppresses vibrations of the hinge joint 240. The collar member 252 also serves to apply a certain degree of rotational resistance against the front lateral plate 234 when the disc spring 251 of the swing resistance mechanism 250 is fastened.

As shown in FIGS. 31 to 33, the limiting stoppers 237 are provided on the inner surfaces of the rear lateral plates 235 near the front end portions thereof. The limiting stoppers 237 restrict the front lateral plates 234 from swinging further rearward from the positions at which the front lateral plates 234 form a right angle or a substantially right angle relative to the rear lateral plates 235.

The front lateral plates 234 restricted by the limiting stoppers 237 from swinging rearward are located along the front edge of the rear bottom plate 230R, and are in the state of facing the front bottom plate 230F that is standing up as shown in FIG. 33.

Although FIGS. 31 to 33 show a configuration in which one limiting stopper 237 is provided on the inner surface of the right-side rear lateral plate 235 near the front end portion thereof, a limiting stopper 237 having the same configuration is provided on the inner surface of the left-side rear lateral plate 235 near the front end portion thereof as well, at the position corresponding to the limiting stopper 237 on the right side.

Also, although FIG. 31 shows a configuration in which one joint operation member 236 for the front plate 231 is provided on the inner surface of the right-side front lateral plate 234 near the front end portion thereof, as shown in FIGS. 32-33, another joint operation member 236 having the same configuration is provided on the inner surface of the left-side front lateral plate 234 as well, near the front end portion thereof, at the position corresponding to the joint operation members 236 on the right side.

Other Embodiments Related to Third Embodiment (1) Although structures configured with the disc springs 251 have been described as examples of the swing resistance mechanisms 250 in the embodiment above, the present invention is not limited to such structures.

For example, although not shown in the drawings, coil springs, or friction plates that are elastic and change their volume within a certain range, may be used instead of the disc springs 251.

Regarding other configurations, the same configurations as those in the above-described embodiment may be adopted.

(2) Although structures configured to apply resistance using friction, such as the disc springs 251, have been described as examples of the swing resistance mechanisms 250 in the embodiment above, the present invention is not limited to such structures.

Figure 37:
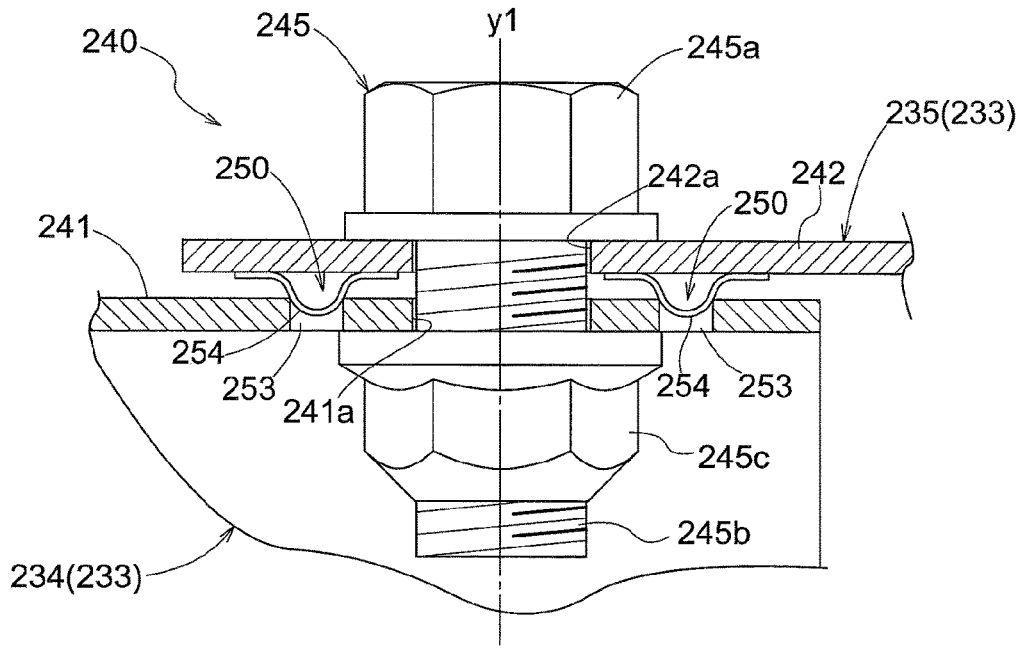
FIG. 37 is a cross-sectional view of an anti-swing mechanism according to another embodiment.
Figure 38:
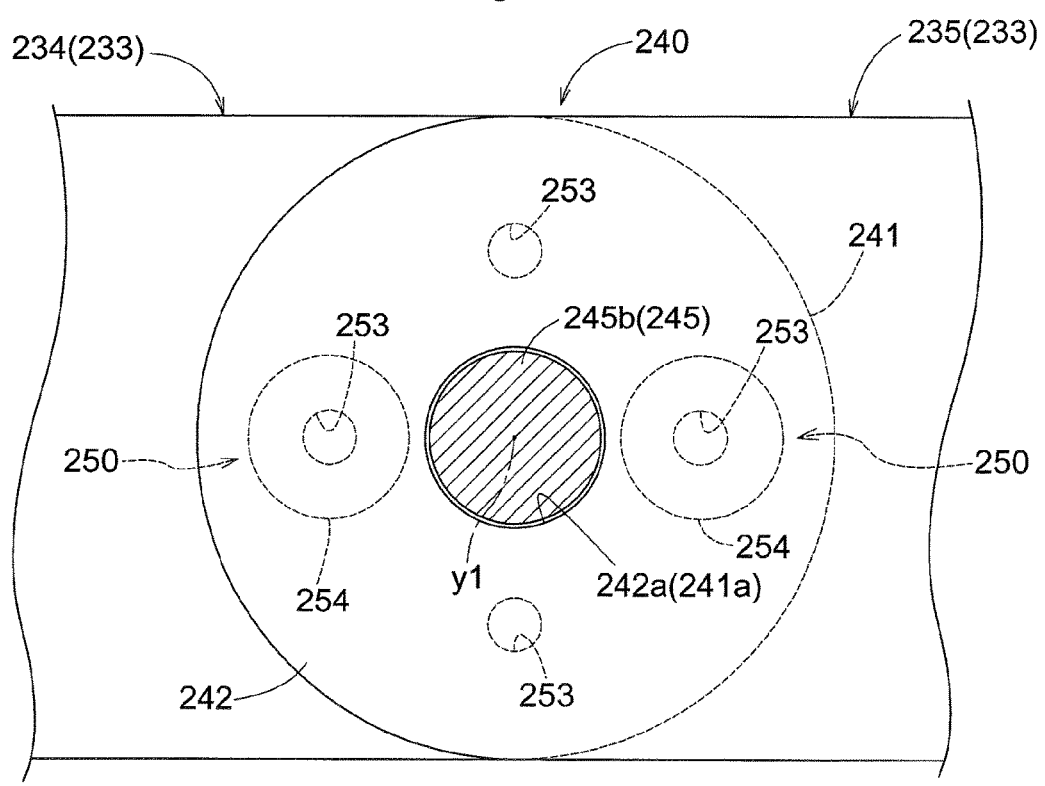
FIG. 38 is a plan view of the anti-swing mechanism according to the other embodiment.

For example, as shown in FIGS. 37 and 38, a configuration may be adopted in which either the hinge protrusion pieces 241 of the front lateral plates 234 or the hinge protrusion pieces 242 of the rear lateral plates 235 of the hinge joints 240 are provided with engagement holes 253 respectively located at four positions shifted by 90 degrees from one another in the circumferential direction of the fulcrum pins 245, the others are provided with protrusion members 254 that are made of sheet metal and engageable with two of the engagement holes 253, and the two protrusion members 254 engage with two engagement holes 253 selected from the engagement holes 253 located at the four positions.

With this configuration, the swing resistance applied to the front lateral plates 234 is high at the positions where the engagement holes 253 and the protrusion members 254 engage with each other, and the swing resistance applied to the front lateral plates 234 is lower at the positons where the engagement holes 253 and the protrusion members 254 do not engage with each other, compared to when they engage with each other. Therefore, this configuration archives the functions of the swing resistance mechanisms 250, which allow the front lateral plates 234 to be operated to swing, and prevent the front lateral plates 234 from swinging due to their own weight.

Regarding other configurations, the same configurations as those in the above-described embodiment may be adopted.

(3) Although a structure in which the swing resistance mechanisms 250 are provided on the uppermost hinge joints 240 is described as an example in the embodiment above, the present invention is not limited to such a structure.

For example, the swing resistance mechanisms 250 may be provided for hinge joints 240 located below the uppermost hinge joints 240.

Also, the hinge joints 240 are not necessarily provided at two positions on the upper part and the lower part. Instead, each hinge joint 240 may be configured to have an elongated shape along a top-bottom direction. Alternatively, the hinge joints 240 may be provided at three or more positions.

Regarding other configurations, the same configurations as those in the above-described embodiment may be adopted.

(4) Although a structure in which the swing resistance mechanisms 250 are provided on the hinge joints 240 is described as an example in the embodiment above, the present invention is not limited to such a structure.

An appropriate structure may be adopted in which friction members are provided to be continuous with lower parts of the front lateral plates 234, at positions apart from the hinge joints 240, for example.

Regarding other configurations, the same configurations as those in the above-described embodiment may be adopted.

(5) The vehicle according to one aspect of the present invention is applicable to various vehicles with a load carrying platform such as the load carrying platform 208, in addition to transport vehicles and the utility vehicle described as examples in the embodiment above.

What is claimed is:

1. A vehicle comprising:
a vehicle body frame;
a seat mounted on the vehicle body frame, the seat being provided with a sitting section, and the seat being configured to be of a foldable type and switchable to a seating position in which a seat surface of the sitting section faces upward, and to a non-use position in which the seat surface stands up and faces forward;
a seat attachment frame that is provided so as to be changeable in a position relative to the vehicle body frame, the sitting section being supported by the seat attachment frame, and the sitting section being switched to the seating position and the non-use position as a consequence of the seat attachment frame being changed in the position thereof relative to the vehicle body frame;
a seat belt device for an occupant seated on the sitting section; and
a belt end portion fixture configured to fix a seat belt end portion of the seat belt device, the belt end portion fixture being removably secured to the vehicle body frame, wherein the belt end portion fixture remains in a fixed posture relative to the vehicle body frame during switching of the seat between the seating position and the non-use position.

2. The vehicle according to claim 1, wherein
the seat is a rear seat located rearward of a front seat,
the rear seat is provided with a backrest section, and
the rear seat is configured to be movable to a rear side of the front seat with the sitting section being brought into a standing position, and is configured to be movable to the rear side of the front seat with the backrest section remaining in a standing position.

3. The vehicle according to claim 1, wherein
the belt end portion fixture is provided with a seat belt anchor that is fixed to the vehicle body frame, a buckle that is engageable with the seat belt end portion, and a joint member that joins the buckle to the seat belt anchor and supports the buckle, and
the belt end portion fixture is configured to be changeable to a standing and joining position in which the buckle is located forward of and higher than the seat belt anchor, and to a laid and retracted position in which the buckle is located at a lower position compared to when the belt end portion fixture is in the standing and joining position, as a consequence of the joint member swinging about a lateral axis that passes through the seat belt anchor.

4. The vehicle according to claim 3, wherein the vehicle body frame is provided with a covering member that is located at a position lower than a lower surface of the seat attachment frame, and a recessed part that allows the belt end portion fixture in the laid and retracted position to be embedded therein is formed in an upper surface of the covering member.

5. The vehicle according to claim 4, wherein a load carrying platform is mounted on a rear part of the vehicle body frame, and the load carrying platform is configured to be changeable to a rear-side mounting state in which a front end portion thereof is located rearward of the recessed part in a front-rear direction of the vehicle body, and to a front-side mounting state in which the front end portion is located forward of the recessed part and a bottom surface of the load carrying platform is located to cover an upper side of the recessed part.

6. A vehicle comprising:

a vehicle body frame;

a seat mounted on the vehicle body frame, the seat being provided with a sitting section, and the seat being configured to be of a foldable type and switchable to a seating position in which a seat surface of the sitting section faces upward, and to a non-use position in which the seat surface stands up and faces forward;

a seat attachment frame that is provided so as to be changeable in a position relative to the vehicle body frame, the sitting section being supported by the seat attachment frame, and the sitting section being switched to the seating position and the non-use position as a consequence of the seat attachment frame being changed in the position thereof relative to the vehicle body frame;

a seat belt device for an occupant seated on the sitting section; and a belt end portion fixture configured to fix a seat belt end portion of the seat belt device, the belt end portion fixture being installed to the vehicle body frame;

wherein the belt end portion fixture is provided with a seat belt anchor that is fixed to the vehicle body frame, a buckle that is engageable with the seat belt end portion, and a joint member that joins the buckle to the seat belt anchor and supports the buckle, and the belt end portion fixture is configured to be changeable to a standing and joining position in which the buckle is located forward of and higher than the seat belt anchor, and to a laid and retracted position in which the buckle is located at a lower position compared to when the belt end portion fixture is in the standing and joining position, as a consequence of the joint member swinging about a lateral axis that passes through the seat belt anchor.

7. The vehicle according to claim 6, wherein the seat is a rear seat located rearward of a front seat, the rear seat is provided with a backrest section, and the rear seat is configured to be movable to a rear side of the front seat with the sitting section being brought into a standing position, and is configured to be movable to the rear side of the front seat with the backrest section remaining in a standing position.

8. The vehicle according to claim 6, wherein the vehicle body frame is provided with a covering member that is located at a position lower than a lower surface of the seat attachment frame, and a recessed part that allows the belt end portion fixture in the laid and retracted position to be embedded therein is formed in an upper surface of the covering member.

9. The vehicle according to claim 8, wherein a load carrying platform is mounted on a rear part of the vehicle body frame, and the load carrying platform is configured to be changeable to a rear-side mounting state in which a front end portion thereof is located rearward of the recessed part in a front-rear direction of the vehicle body, and to a front-side mounting state in which the front end portion is located forward of the recessed part and a bottom surface of the load carrying platform is located to cover an upper side of the recessed part.

* * * * *